(12) United States Patent
Halbert et al.

(10) Patent No.: US 10,620,304 B2
(45) Date of Patent: Apr. 14, 2020

(54) RADAR SYSTEM AND ASSOCIATED APPARATUS AND METHODS

(71) Applicant: AVEILLANT LIMITED, Reading, Berkshire (GB)

(72) Inventors: Max Peter Halbert, Cambridge (GB); Mohammed Jahangir, Cambridge (GB); Gordon Oswald, Cambridge (GB)

(73) Assignee: AVEILLANT LIMITED, Reading, Berkshire (GB)

( * ) Notice: Subject to any disclaimer, the term of this patent is extended or adjusted under 35 U.S.C. 154(b) by 153 days.

(21) Appl. No.: 15/507,201

(22) PCT Filed: Feb. 24, 2015

(86) PCT No.: PCT/GB2015/050526
§ 371 (c)(1),
(2) Date: Feb. 27, 2017

(87) PCT Pub. No.: WO2016/030656
PCT Pub. Date: Mar. 3, 2016

(65) Prior Publication Data
US 2017/0285158 A1  Oct. 5, 2017

(30) Foreign Application Priority Data
Aug. 28, 2014 (WO) ................ PCT/GB2014/052612

(51) Int. Cl.
*G01S 13/00*  (2006.01)
*G01S 13/72*  (2006.01)
(Continued)

(52) U.S. Cl.
CPC ............ *G01S 13/003* (2013.01); *G01S 7/003* (2013.01); *G01S 7/414* (2013.01); *G01S 7/415* (2013.01);
(Continued)

(58) Field of Classification Search
CPC ...... G01S 13/003; G01S 7/415; G01S 13/524; G01S 13/5244; G01S 13/726; G01S 13/878; G01S 7/003; G01S 7/023; G01S 7/414
(Continued)

(56) References Cited

U.S. PATENT DOCUMENTS 4,499,468 A  2/1985  Montana et al.
5,252,980 A  10/1993  Gray et al.
(Continued)

FOREIGN PATENT DOCUMENTS

WO  2008/145993 A2  12/2008
WO  2009/144435 A1  12/2009
WO  2010/016029 A1  2/2010

OTHER PUBLICATIONS

International Search Report and Written Opinion for PCT/GB2015/050526, dated Jul. 1, 2015.
(Continued)

*Primary Examiner* — Timothy X Pham
(74) *Attorney, Agent, or Firm* — Merchant & Gould P.C.

(57) ABSTRACT

A radar system provides information relating to a three-dimensional field of surveillance (FoS) having a volume exceeding one cubic kilometre. The radar system includes a radar transmitter and radar receiver arranged to provide persistent surveillance of the FoS. Each radar return signal received within a sequence of time periods is processed. An associated signal information is stored in a memory in association with information identifying at least one of a respective beam in which that return signal was received and a respective receiver element at which that respective return signal was received.

21 Claims, 22 Drawing Sheets

(51) Int. Cl.
    *G01S 7/00*            (2006.01)
    *G01S 7/41*            (2006.01)
    *G01S 13/87*          (2006.01)
    *G01S 13/524*        (2006.01)
    *G01S 7/02*            (2006.01)

(52) U.S. Cl.
    CPC ........ *G01S 13/524* (2013.01); *G01S 13/5244* (2013.01); *G01S 13/726* (2013.01); *G01S 13/878* (2013.01); *G01S 7/023* (2013.01)

(58) Field of Classification Search
    USPC .......................................................... 342/126
    See application file for complete search history.

(56) References Cited

U.S. PATENT DOCUMENTS

| | | | |
|---|---|---|---|
| 5,264,855 A | 11/1993 | Lammers et al. | |
| 5,268,698 A | 12/1993 | Smith et al. | |
| 5,448,243 A | 9/1995 | Bethke et al. | |
| 7,619,556 B1* | 11/2009 | McCusker | G01S 13/913 342/33 |
| 8,314,733 B1* | 11/2012 | Malakian | G01S 13/726 342/104 |
| 8,416,123 B1 | 4/2013 | Mitchell et al. | |
| 8,654,002 B2 | 2/2014 | Lesturgie | |
| 8,742,977 B1 | 6/2014 | Piesinger | |
| 9,081,092 B1* | 7/2015 | Friesel | G01S 13/726 |
| 2004/0075605 A1 | 4/2004 | Bradford et al. | |
| 2004/0090363 A1 | 5/2004 | Barrick et al. | |
| 2006/0238407 A1 | 10/2006 | Bourdelais et al. | |
| 2008/0102756 A1 | 5/2008 | Lehtinen | |
| 2010/0079330 A1 | 4/2010 | Venkatachalam et al. | |
| 2010/0164785 A1* | 7/2010 | Gebert | G01S 13/9035 342/25 F |
| 2010/0265122 A1 | 10/2010 | Oswald | |
| 2011/0140949 A1 | 6/2011 | Lee | |
| 2011/0215961 A1 | 9/2011 | Moruzzis et al. | |
| 2011/0241928 A1 | 10/2011 | Oswald et al. | |
| 2011/0260907 A1 | 10/2011 | Rpche | |
| 2011/0260908 A1 | 10/2011 | New et al. | |
| 2012/0019407 A1 | 1/2012 | Lesturgie | |
| 2012/0056772 A1 | 3/2012 | Jaffer | |
| 2012/0105272 A1 | 5/2012 | Moruzzis et al. | |
| 2012/0127024 A1* | 5/2012 | Takashima | G01S 13/428 342/146 |
| 2012/0268314 A1* | 10/2012 | Kuwahara | G01S 3/74 342/147 |
| 2012/0306686 A1 | 12/2012 | Millet et al. | |
| 2013/0176161 A1 | 7/2013 | Derham et al. | |
| 2014/0253368 A1 | 9/2014 | Holder | |
| 2015/0061916 A1* | 3/2015 | Sinclair | G01S 13/426 342/41 |
| 2017/0031013 A1 | 2/2017 | Halbert et al. | |

OTHER PUBLICATIONS

International Search Report and Written Opinion for PCT/GB2014/052612, dated Jan. 28, 2015.

UK Search Report for GB 1315309.3, dated Feb. 28, 2014.

\* cited by examiner

Array / Doppler Frames

Beam / Doppler Frames

Figure 5

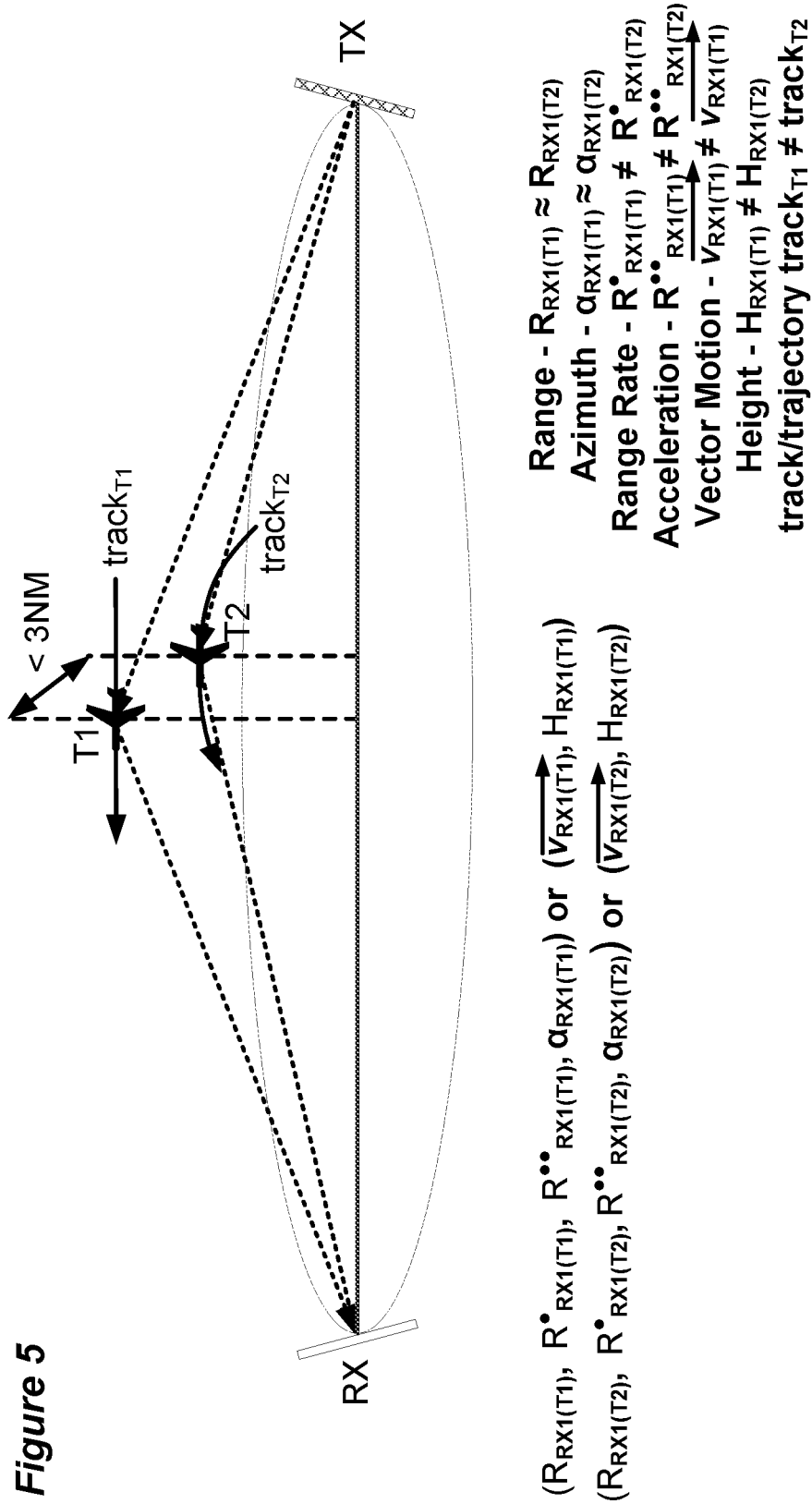

$T1 \rightarrow (R_{RX1(T1)}, R^{\bullet}_{RX1(T1)}, R^{\bullet\bullet}_{RX1(T1)}, \alpha_{RX1(T1)})$ or $(\overrightarrow{v_{RX1(T1)}}, H_{RX1(T1)})$ $T2 \rightarrow (R_{RX1(T2)}, R^{\bullet}_{RX1(T2)}, R^{\bullet\bullet}_{RX1(T2)}, \alpha_{RX1(T2)})$ or $(\overrightarrow{v_{RX1(T2)}}, H_{RX1(T2)})$ Range - $R_{RX1(T1)} \approx R_{RX1(T2)}$
Azimuth - $\alpha_{RX1(T1)} \approx \alpha_{RX1(T2)}$
Range Rate - $R^{\bullet}_{RX1(T1)} \neq R^{\bullet}_{RX1(T2)}$
Acceleration - $R^{\bullet\bullet}_{RX1(T1)} \neq R^{\bullet\bullet}_{RX1(T2)}$
Vector Motion - $\overrightarrow{v_{RX1(T1)}} \neq \overrightarrow{v_{RX1(T1)}}$
Height - $H_{RX1(T1)} \neq H_{RX1(T1)}$
track/trajectory $track_{T1} \neq track_{T2}$

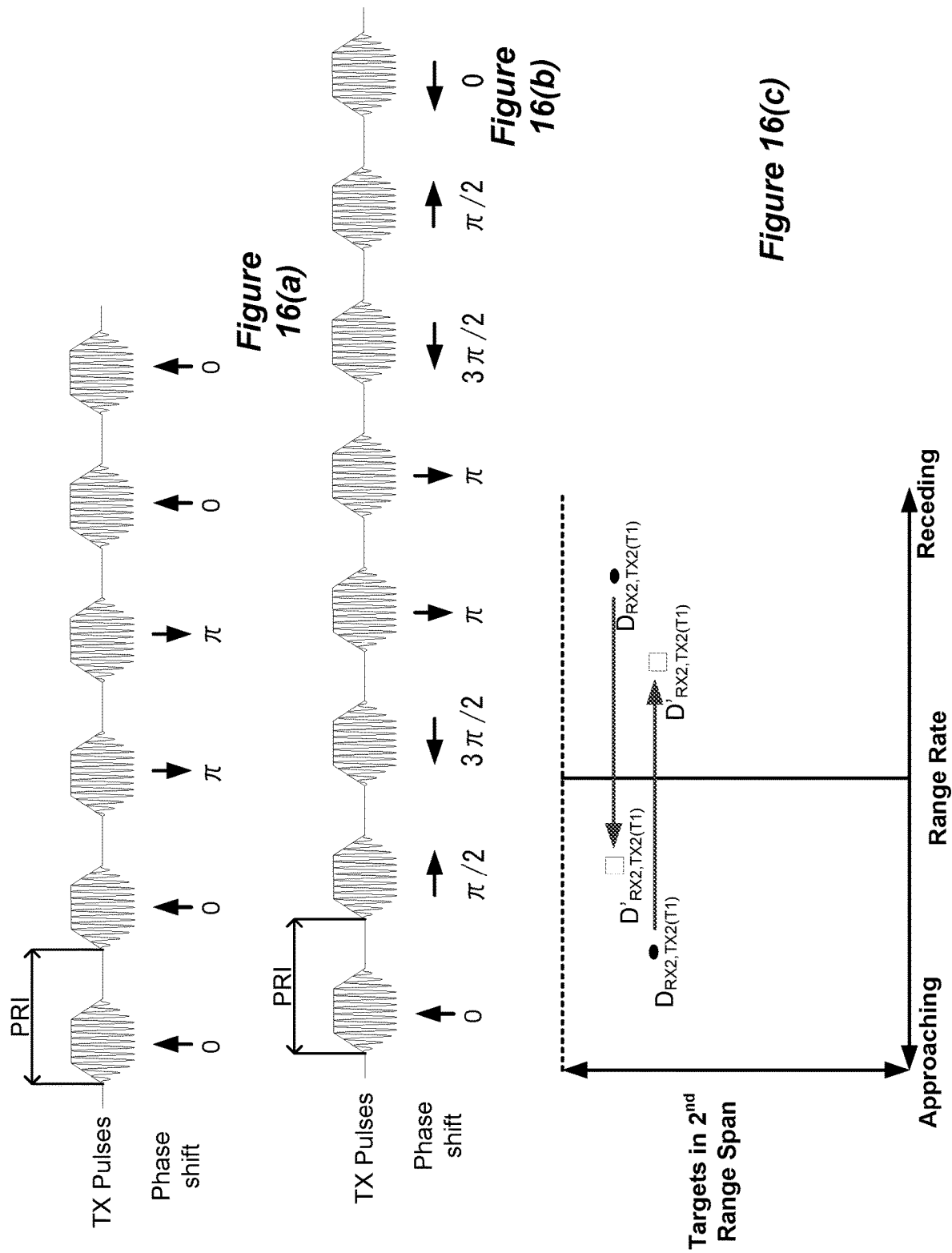

RADAR SYSTEM AND ASSOCIATED APPARATUS AND METHODS

This application is a National Stage of PCT/GB2015/050526, filed 24 Feb. 2015, which claims benefit of PCT/GB2014/052612, filed 28 Aug. 2014 in Great Britain, which applications are incorporated herein by reference. To the extent appropriate, a claim of priority is made to each of the above disclosed applications.

BACKGROUND OF THE INVENTION

The present invention relates to a radar system and to associated apparatus and methods. The invention has particular although not exclusive relevance to the application of new capabilities of persistent radar technology to enhance several aspects of wide area surveillance and achieve new services and new service features within a Field of Surveillance.

The technological background to the present invention lies in the so-called 'Holographic'™ radar technology disclosed in the International Patent Application having publication number WO2008/145993 and the International Patent Application having publication number WO2009/144435. In these applications a so called Holographic radar system was disclosed in which persistent illumination (without interruption by electronic or mechanical scanning) of a volume of interest, by a monostatic array, was beneficially used to allow accurate and reliable discrimination between targets of interest such as aircraft or the like and clutter having moving (and in particular rotating) parts.

Key to a particularly successful application of the Holographic radar system was the realisation that a practical radar system could be implemented in which the radar was deliberately constrained to operate substantially within the so-called Holographic limit, within which both the range and the range-rate of targets of interest would generally be inherently unambiguous. This contrasted with the prevailing view, at the time, that some form of inherent ambiguity, in at least one of range and range rate, was always necessary in any practical radar system because of the trade-off between unambiguous range and unambiguous range rate. Specifically, it was believed that in a radar system designed to have a sufficiently high pulse repetition frequency to determine range rate of a fast moving target unambiguously the coverage area represented by that unambiguous range would be impractically small and vice versa. Accordingly, much work in the art was directed at resolving such ambiguities in range and/or range rate from the inherently ambiguous target data.

Following the UK Government's involvement in a Spectrum Release Programme to release parts of the reserved communication spectrum for use by other users and related investigations into possible reductions in spectrum occupancy by primary surveillance radar used for air traffic control purposes a further development of the radar technology was proposed. Specifically, in response to the general need for radar technology which allows the spectrum used by existing primary surveillance radar (typically in the so called 'S' band—2 GHz to 4 GHz) to be released, without materially reducing air surveillance capability, a multi-static radar system was proposed in which persistent illumination of a volume of interest was used beneficially, without the same requirement to operate inherently ambiguously, to provide a low bandwidth solution whilst, at the same time providing significant improvements in surveillance performance. This technology was described in the application from which this application claims priority.

In the multi-static radar system for providing surveillance, the radar system included a plurality of radar receivers and a plurality of radar transmitters arranged in a multi-static configuration to form at least one radar cell to provide an area of radar coverage within that cell. Each of the radar transmitters was a static transmitter that persistently illuminated a respective radar cell with a radar signal and that was synchronised or controlled as a part of the radar system. Each radar receiver was a static receiver operable to receive radar signals from within a respective radar cell, including radar return signals echoed from any object as a result of illumination by one or more corresponding radar transmitters. The respective radar signals received at each radar receiver were then processed to determine information relating to the position of a detected object and/or the motion of that object.

The inventors have realised more recently that the underlying feature of persistent illumination has a significantly further reaching than previously considered. In more detail the inventors have conceived of a number of new applications that have become enabled by use of persistent illumination in radar technology and have conceived a number of significant improvements to existing radar applications, beyond that currently believed possible with such technology.

SUMMARY OF THE INVENTION

The radar technology described in the application from which this application claims priority is also described herein, for completeness, because at least some of the features of the radar network technology, and related features, can be used to provide further advantage in the applications/implementations described herein.

According to one aspect of the invention there is provided a radar system for providing information relating to a three-dimensional field of surveillance (FoS) having a volume exceeding one cubic kilometre, the radar system comprising: at least one radar transmitter operable to persistently illuminate said FoS (e.g. effectively without movement of the region of illumination by electronic or mechanical scanning) with a sequence of pulses at a pulse repetition frequency (PRF); at least one radar receiver arranged to persistently monitor said FoS (e.g. effectively without movement of the monitored region by electronic or mechanical scanning) to receive radar return signals returned from objects within the FoS, as a result of said persistent illumination of said FoS by the at least one radar transmitter; and at least one processor configured to: process each radar return signal received within a first time period of predetermined length to acquire respective signal information; store the acquired signal information for each of at least a majority of radar return signals received from within the entire FoS within the first time period, in a memory in association with information identifying at least one of a respective beam in which that return signal was received and a respective receiver element at which that respective return signal was received; process each radar return signal received within a second time period of predetermined length, contiguous with said first time period, to acquire respective further signal information; store the acquired further signal information for each of at least a majority of radar return signals received from within the entire FoS within the second time period, in said memory in association with information identifying at least one of a respective beam in which that return signal was received and a respective receiver element at which that return signal was received, whilst said signal information acquired during said first time period is still retained in said memory (e.g. to be available for concatenation and coherent processing or for successive coherent processing); and analyse the stored signal information and/or further signal information to detect a target and to extract and/or refine target information for said target relating to at least one of a position and a characteristic of said target.

The at least one processor may be configured to store respective signal information acquired for each time period in association with at least one of: information identifying a range of an object from which the return signal that resulted in the acquisition of that signal information was reflected; information identifying a Doppler frequency extracted from the return signal that resulted in the acquisition of that signal information; and/or information identifying a time period within which was transmitted a transmitter pulse from which the return signal that resulted in the acquisition of that signal information originated. The at least one processor may be configured to analyse the stored signal information to individually detect each of a plurality of targets and to extract and/or refine target information for each said target relating to at least one of a respective position and a respective characteristic of said target, even when each of said plurality of targets share a common range and a common azimuth within a range/azimuth resolution of the radar system. The at least one processor may be configured to analyse the stored signal information to individually detect and distinguish between each of the plurality of said targets that share a common range and a common azimuth within a range/azimuth resolution of the radar system based on at least one of a difference in the elevation of said plurality of targets and a difference in range rate (or Doppler shift) of said targets (for example, where Doppler resolution is made sufficient by means of an extended dwell time). The at least one processor may be configured to analyse the stored signal information to individually detect (and optionally track) each of a multitude of targets (e.g. 100 or more targets, or even 150, 250, 500 or 1000 or 10,000 or more targets) that are simultaneously located in said FoS, and to extract and/or refine target information for each said target relating to at least one of a respective position and a respective characteristic of said target (such information may, for example, be represented in memory locations corresponding to more than 2 million, more than 10 million, more than 100 million, more than 500 million or more than 2 billion resolved range, azimuth, elevation and Doppler values, updated at least once per second). The at least one processor may be configured to analyse the stored signal information to individually detect (and optionally track) each of a plurality of targets that are simultaneously located in said FoS, and to extract and/or refine target information for each said target relating to at least one of a respective position and a respective characteristic of said target, even when each of said plurality of targets are within 3 NM (or within 2 NM, 1 NM or 0.5 NM) of one another.

The radar receiver may be arranged to receive radar return signals returned from objects within an FoS that extends, relative to the radar receiver, at least one of: 90° or greater in azimuth; 6° or greater in elevation; and 5 km in range.

The radar system may be capable of acquiring and storing signal information for each of at least a majority of radar return signals received from within the entire FoS, wherein the FoS has a volume exceeding 3 cubic km, 5 cubic km, 10 cubic km, 100 cubic km, or even 500 cubic km.

The at least one processor may be configured to respectively process complex radar return signals received within each of a sequence of several contiguous time periods of predetermined length, including said first and second time period, to acquire and store respective signal information for each said time period.

The radar system may be capable of acquiring and storing complex signal information for each of at least a majority of radar return signals received from within the entire FoS, and for each of said sequence of several contiguous time periods of predetermined length, for a continuous surveillance period exceeding 10 seconds, exceeding 30 seconds, exceeding 1 minute, exceeding 2 minutes, exceeding 5 minutes, or even exceeding 10 minutes.

The at least one processor may be configured for analysing stored signal information, retrospectively following detection of a target, and for refining extracted target information for a detected target based on signal information stored before a signal frame in which that target was detected. The at least one processor may be configured for refining extracted target information for a detected target based on stored signal information acquired following detection of that target. The at least one processor may be configured to respectively process radar return signals received within each of a sequence of several contiguous time periods of predetermined length, including said first and second time period, to acquire and store respective signal information for each said time period;

and to analyse the stored respective signal information for each said time period to extract and/or refine target information for any detected.

Each said time period may have a predetermined length equal to an initial dwell time length (which may, for example, be defined for each resolution element in range, azimuth or elevation) for said radar system.

The at least one processor may be configured for concatenating signal information acquired within a plurality of said time periods to provide concatenated signal information for a modified dwell time (e.g. an dwell time of extended length and/or a dwell time that is offset in time compared to the initial dwell time). The at least one processor may be configured for analysing said concatenated signal information (e.g. in the frequency domain) for the modified dwell time and for refining extracted target information for a detected target based on said analysis. The at least one processor may be configured for extracting information relating to performance of at least one of a pilot and an aircraft with respect to at least one performance criterion and wherein said radar system is configured for providing said information relating to performance of at least one of a pilot and an aircraft to a user. The at least one processor may be configured for extracting information relating to behaviour of at least one of a pilot and an aircraft with respect to at least one behavioural criterion comprising at least one of the following: a flight safety criterion; an Air Traffic Control request compliance criterion; a criterion indicating operation of an automatic pilot facility; a fuel efficiency criterion; a criterion indicating behaviour affected by another airborne object; a criterion indicating compliance, or lack of compliance, with an aviation regulation. The at least one processor may be configured for providing target information relating to each of a plurality of detected targets located at a respective three-dimensional real-space position within said FoS for output, via a three-dimensional visualisation system, or at a respective three-dimensional virtual-space position corresponding to the three-dimensional real-space position of that detected target.

The radar system may further comprise said three-dimensional visualisation system, means for receiving an input from an operator of said three-dimensional visualisation system to move a view of said operator within a virtual representation of said FoS, and means for controlling said virtual representation of said FoS based on said input.

The at least one processor may be configured for extracting target information relating to a detected target using a plurality of different extraction methods, wherein each extraction method is tailored to a different respective surveillance function. The plurality of different extraction methods may include a respective extraction method tailored to each of at least two of the following different respective surveillance functions: a high frequency (HF) over the horizon surveillance function for surveillance of at least one of aircraft, ships, missiles and sea clutter; an air defence surveillance function for at least one of long range (e.g. over 140 NM) low rate surveillance; and medium range (<140 NM) medium rate surveillance; an air defence surveillance function; a weapons control surveillance function; a battlefield radar surveillance function; an air traffic control radar surveillance function; a non-cooperative target recognition surveillance function; an electronic countermeasures surveillance function; a weather radar surveillance function; a surveillance function for detecting dismount and/or docking activities; a surveillance function for detecting disintegration events; a surveillance function for monitoring pilot compliance with one or more behavioural criterion; an overhead airspace monitoring surveillance function; a surveillance function for the detection, tracking and/or analysis of low, small and/or slow targets (e.g. drones); and/or an inverse aperture synthesis surveillance function.

The at least one processor may be configured for analysing acquired signal information to extract target information relating to the position or movement of the target within the FoS and separate target information relating to a smaller part of the target (e.g. a part that is moving relative to another part of the target such as wing tips or nose and tail during a turn, or control surfaces). The at least one processor may be configured for acquired signal information to extract information relating to the rotational movement of a rotating part (e.g. a propeller) of the target (for example a rotational speed of the rotating part). The at least one processor may be configured for analysing acquired signal information to extract at least one of: the number of moving parts of a particular type (e.g. propellers); and a characteristic of a moving part (e.g. number of blades for a propeller). The at least one processor may be configured for using said extracted information relating to part of the target in the identification and/or classification of the target. The at least one processor may be configured for defining a sub-volume of said FoS in which an enhanced surveillance procedure is to be applied, for analysing signal information for radar returns reflected from within said sub-volume of said FoS in accordance with said enhanced surveillance procedure, for analysing signal information for radar returns reflected from outside said sub-volume of said FoS in accordance with another surveillance procedure that is different to said enhanced surveillance procedure. The at least one processor may be configured for analysing acquired signal information to extract target information relating to surface (e.g. land borne and/or water borne) targets.

The radar system may be a non-cooperative radar system.

According to one aspect of the invention there is provided a radar receiver configured to perform the function of the radar receiver of the radar system.

According to one aspect of the invention there is provided a radar transmitter configured to perform the function of the radar transmitter of the radar system.

According to one aspect of the invention there is provided a method of operating a radar system to provide information relating to a three-dimensional field of surveillance (FoS) having a volume exceeding one cubic kilometre, the method comprising: persistently illuminating said FoS (e.g. effectively without movement of the region of illumination by electronic or mechanical scanning) with a sequence of pulses at a pulse repetition frequency (PRF); persistently monitoring said FoS (e.g. effectively without movement of the monitored region by electronic or mechanical scanning) to receive radar return signals returned from objects within the FoS, as a result of said persistent illumination of said FoS by the at least one radar transmitter; and processing each radar return signal received within a first time period of predetermined length to acquire respective signal information; storing the acquired signal information for each of at least a majority of radar return signals received from within the entire FoS within the first time period, in a memory in association with information identifying at least one of a respective beam in which that return signal was received and a respective receiver element at which that respective return signal was received; processing each radar return signal received within a second time period of predetermined length, contiguous with said first time period, to acquire respective further signal information; storing the acquired further signal information for each of at least a majority of radar return signals received from within the entire FoS within the second time period, in said memory in association with information identifying at least one of a respective beam in which that return signal was received and a respective receiver element at which that return signal was received, whilst said signal information acquired during said first time period is still retained in said memory; and analysing the stored signal information and/or further signal information to detect a target and to extract and/or refine target information for said target relating to at least one of a position and a characteristic of said target.

According to one aspect of the invention there is provided a radar system for providing information relating to a three-dimensional field of surveillance (FoS), the radar system comprising: at least one radar transmitter operable to persistently illuminate said FoS with a sequence of pulses of radiation having a wavelength, at a pulse repetition frequency (PRF); at least one radar receiver arranged to persistently monitor said FoS to receive radar return signals returned from objects within the FoS, as a result of said persistent illumination of said FoS by the at least one radar transmitter; and at least one processor configured to process return signals received from within said FoS: to detect targets; to analyse movement of at least part of a detected target at a resolution that is that is no greater than a size of the detected target; to identify, based on said analysis, a behaviour of at least one of a controller (e.g. pilot) of the detected target and the detected target itself (e.g. manned/unmanned aircraft behaviour) conforming to at least one predetermined behavioural criterion, at said resolution.

According to one aspect of the invention there is provided a radar system for providing information relating to a three-dimensional field of surveillance (FoS), the radar system comprising: at least one radar transmitter operable to persistently illuminate said FoS with a sequence of pulses of radiation at a pulse repetition frequency (PRF); at least one radar receiver arranged to persistently monitor said FoS to receive radar return signals returned from objects within the FoS, as a result of said persistent illumination of said FoS by the at least one radar transmitter; and at least one processor configured to process return signals received from within said FoS: to detect targets; and to extract and/or refine target information for each said target relating to at least one of a respective position and a respective characteristic of said target, even when each of said plurality of targets share a common range and a common azimuth within a range/azimuth resolution of the radar system.

According to one aspect of the invention there is provided a radar system for providing information relating to a three-dimensional field of surveillance (FoS), the radar system comprising: at least one radar transmitter operable to persistently illuminate said FoS with a sequence of pulses of radiation at a pulse repetition frequency (PRF); at least one radar receiver arranged to persistently monitor said FoS to receive radar return signals returned from objects within the FoS, as a result of said persistent illumination of said FoS by the at least one radar transmitter; and at least one processor configured to process return signals received from within said FoS: to detect each of a multitude of targets (e.g. 100 or more targets, or 250, 500 or 1000 or 10,000 or more targets) that are simultaneously located in said FoS, and to extract and/or refine target information for each said target relating to at least one of a respective position and a respective characteristic of said target.

According to one aspect of the invention there is provided a radar system for providing information relating to a three-dimensional field of surveillance (FoS) having a volume exceeding one cubic kilometre, the radar system comprising: at least one radar transmitter operable to persistently illuminate said FoS with a sequence of pulses of radiation at a pulse repetition frequency (PRF); at least one radar receiver arranged to persistently monitor said FoS to receive radar return signals returned from objects within the FoS, as a result of said persistent illumination of said FoS by the at least one radar transmitter; and at least one processor configured to process return signals received from within said FoS, and to store acquired signal information for each of at least a majority of radar return signals received from within the entire FoS within a predetermined time period, in a memory in association with information identifying at least one of respective beam in which that return signal was received and a respective receiver element at which that respective return signal was received, whereby to provide a representation of substantially the entire FoS in memory.

According to one aspect of the invention there is provided a radar system for providing information relating to a three-dimensional field of surveillance (FoS), the radar system comprising: at least one radar transmitter operable to persistently illuminate said FoS with a sequence of pulses of radiation at a pulse repetition frequency (PRF); at least one radar receiver arranged to persistently monitor said FoS to receive radar return signals returned from objects within the FoS, as a result of said persistent illumination of said FoS by the at least one radar transmitter; and at least one processor configured to process return signals received from within said FoS: to detect targets; and to extract target information for each said target using a plurality of different extraction methods, wherein each extraction method is tailored to a different respective surveillance function.

According to one aspect of the invention there is provided a radar system for providing information relating to a three-dimensional field of surveillance (FoS) having a volume exceeding one cubic kilometre, the radar system comprising: at least one radar transmitter operable to persistently illuminate said FoS with a sequence of pulses of radiation at a pulse repetition frequency (PRF); at least one radar receiver arranged to persistently monitor said FoS to receive radar return signals returned from objects within the FoS, as a result of said persistent illumination of said FoS by the at least one radar transmitter; and at least one processor configured: to process return signals received from within said FoS; to store acquired signal information for each of at least a majority of radar return signals received from within the entire FoS within a predetermined time period, in a memory; to process the stored signal information to extract target information relating to the position or movement of a detected target within the FoS and separate target information relating to a smaller part of the detected target (e.g. a part that is moving relative to another part of the target such as wing tips or nose and tail during a turn, or control surfaces).

Aspects of the invention also extend to the methods performed by any of: the radar system aspects; the radar receiver aspects; and/or the radar transmitter aspects.

Aspects of the invention extend to computer program products such as computer readable storage media having instructions stored thereon which are operable to program a programmable processor to carry out a method as described in the aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently (or in combination with) any other disclosed and/or illustrated features. In particular but without limitation the features of any of the claims dependent from a particular independent claim may be introduced into that independent claim in any combination or individually.

It will be appreciated that the term radar cell used herein refers to any volume of space that is illuminated by a radar transmitter and observed by a radar receiver.

BRIEF DESCRIPTION OF THE DRAWINGS

Embodiments of the invention will now be described by way of example only with reference to the attached figures in which:

FIG. 5 illustrates, in simplified form, another beneficial implementation/application of the radar system of FIG. 1;

FIGS. 16(a) to (c) illustrate, in simplified form, a coding technique that may be used a cell of the radar network of FIG. 10 to help resolve range ambiguities or in the radar system of FIG. 1;

DETAILED DESCRIPTION OF THE PREFERRED EMBODIMENT(S)

Figure 1:
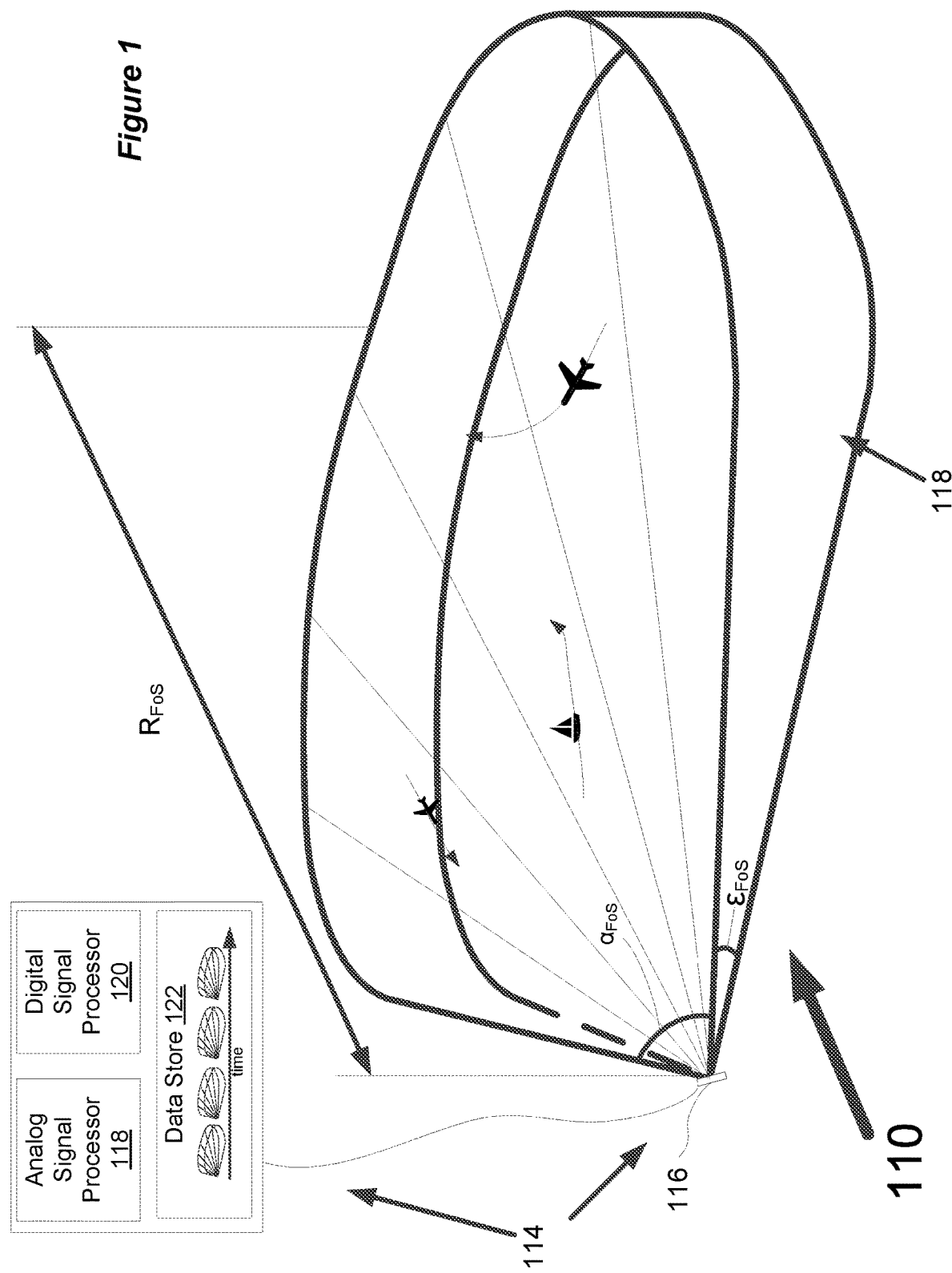
FIG. 1 schematically illustrates, in simplified form, a radar system.

FIG. 1 shows a non-cooperative radar system generally at 110. The radar system is configured to provide persistent interrogation of a volume of interest 130 (also referred to as a Field of Surveillance (FoS)). Persistent interrogation is coherent illumination of and reception from substantially all targets within a Field of Surveillance (FoS) (that provide returns when illuminated with radar signals) at a pulse repetition frequency (PRF) that permits unambiguous evaluation of Doppler, and without interruption due to sequential mechanical or electronic scanning, or a hardware-determined windowing process, that limits the duration of coherent signal analysis.

As seen in FIG. 1, the radar system 110 comprises: a radar transmitter (TX) and radar sensor apparatus 114. The radar sensor apparatus 114 comprises a radar receiver (RX) array 116, an associated analogue signal processor 118 for processing the signals received by the receiver array 116, a digital signal processor 120 for processing data representing the signals received by the receiver array 116, and a data store 122 for storing data representing the signals received by the receiver array 116.

The radar transmitter (TX), whilst not shown on FIG. 1 for simplicity, is statically mounted and is arranged to persistently illuminate a three-dimensional (3D) volume, with a continuous stream of radio pulses at an associated pulse repetition frequency (PRF), from different respective angles. The radar transmitter may be a single element transmitter or multi-element transmitter 112 (e.g. as described with reference to FIG. 15). The transmitter may be located separately from the receiver 116, typically up a mast. The transmitter may also be 'co-located' with the receiver 116 in which case it may be provided above the receiver array or may be in a number of locations (for example four) around the receiver, each covering a different part of the observed space (e.g. a quadrant) but pointing away from the receiver in each case.

Figure 14:
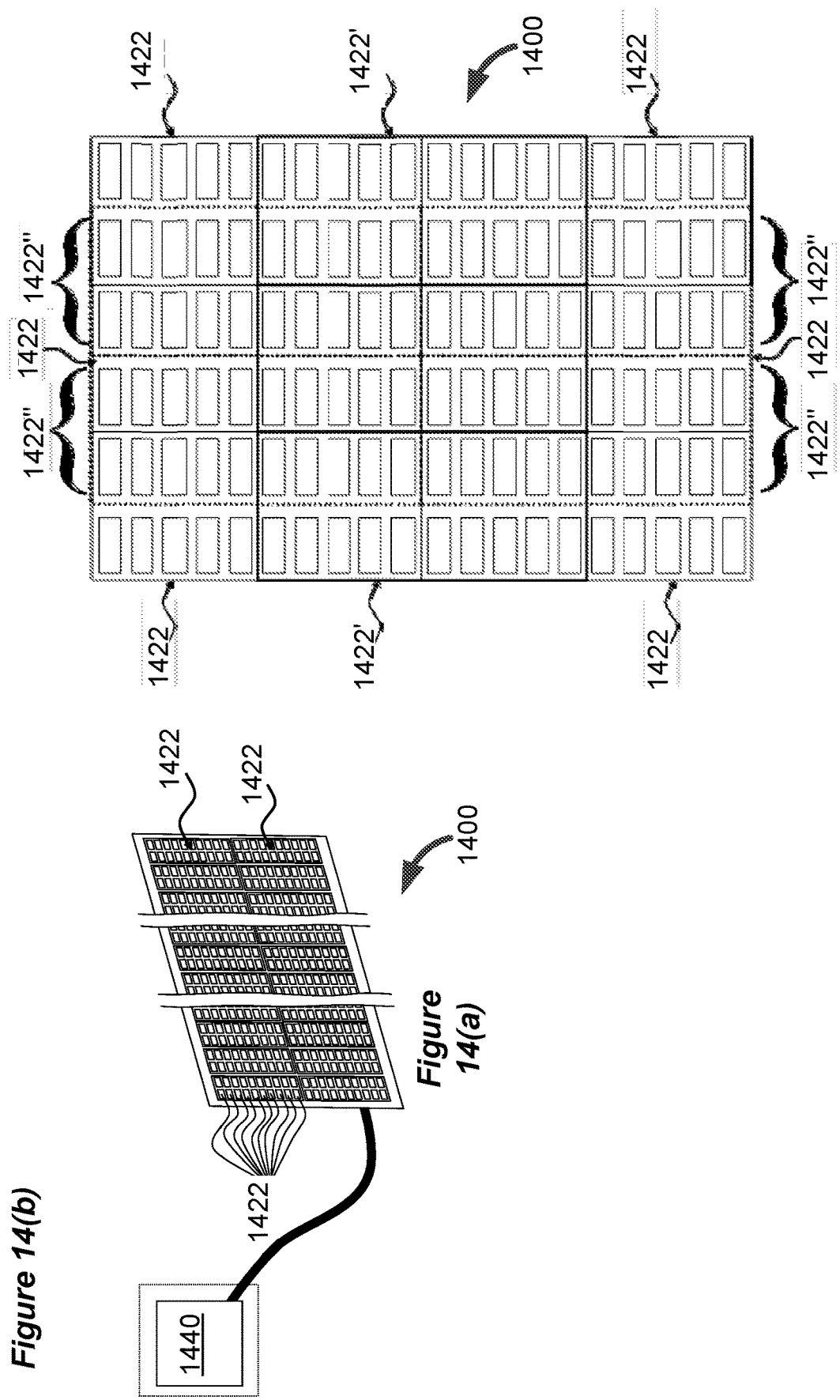
FIG. 14 illustrates, in simplified form, a radar receiver suitable for use in a cell of the radar network of FIG. 10 or in the radar system of FIG. 1.

The radar receiver array 116 is statically mounted to persistently receive radar return (or 'echo') signals reflected from objects present within a predefined part of the illuminated volume (the Field of Surveillance, 'FoS') 130. The radar receiver array 116 comprises an array of spatially separated receiver elements (e.g. as described with reference to FIG. 14.

In the example shown the Field of Surveillance 130 extends over an area of at least 90 degrees in azimuth '$\alpha_{FoS}$', at least 6 degrees in elevation '$\varepsilon_{FoS}$' and at least 5 km in range '$R_{FoS}$'.

The analogue signal processor 118 is arranged to process the radar return (or 'echo') signals reflected from objects present within the FoS 130 and received at each array element from the entire FoS 130 and to convert the received signals into a digital form suitable for processing by the digital signal processor 120.

The digital signal processor 120 processes the digital representations of the received signals to form receiver beams (based on an element or group of elements at which the return signals being processed are received) and to extract information about the objects from which the radar return signals are reflected (e.g. range, range rate, radial acceleration, azimuth, elevation, height and/or the like as described in more detail later). The digital signal processor 120 acquires signal information over a prolonged period (typically equal to or exceeding 0.25 seconds). In this example, the digital signal data (comprising complex signal amplitudes in either the time or frequency, 'Doppler', domain) for the entire FoS 130 is stored in memory, for each pulse interval, based on the element of the receiver array 116 at which the return signal represented by the digital signal data was received, and based on the determined range of the object from which the return signal was reflected.

In a variation on this example, the digital signal data for the entire FoS 130 is stored in memory based on the receiver beam in which the return signal represented by the digital signal data was received, and based on the determined range of the object from which the return signal was reflected.

In this manner, the radar system 1 effectively generates a digital representation of the characteristics of entire FoS 130 (in effect a virtual FoS) for each pulse interval and stores these digital representations in the data store 122. The data is retained in the data store for a prolonged surveillance period (several seconds or minutes) depending on requirements and available memory.

The data store 122 may form part of the memory of one or more computers and/or may comprise a memory dedicated to the storage of the radar signal related data. The Field of Surveillance may be divided between the memories of more than one computer either arbitrarily or based on defined regions within the Field of Surveillance, for example on the basis of subdivisions of range and/or beams in azimuth and/or elevation. Similarly, the analysis of the Field of Surveillance may be divided between the processing capability of more than one computer either arbitrarily or based on defined regions within the Field of Surveillance, for example on the basis of subdivisions of range and/or beams in azimuth and/or elevation.

Thus, in effect, as will be described in more detail later, the entire FoS 130 for both a current time frame, and for previous time frames, may beneficially be searched and analysed to extract information about the objects from which the radar returns are reflected to improve target detection (that is, the establishment of the presence of a target with sufficient confidence that processing resources or internal or external alert states can be assigned) and characterisation.

Thus, because the interrogation is persistent, while target detection occurs at one or more particular time steps of processing, relevant signal information from earlier stages may be introduced. This ability to coherently analyse data stored in such a volume retrospectively (e.g. as a result of detection decisions that may arise at any point in the analysis) is particularly beneficial. Moreover, signal information that contributes to the detection, or signal information from a neighbouring part of the FoS, may be retained for combination with nearby future information. In more detail, signal data associated with the detection may be retained for concatenation with subsequent coherent signal evidence associated with the detection.

Because the radar antenna interrogates the full field of view persistently, it can be seen that substantially all targets in the field of view (that is, targets that are detectable by and not hidden from the radar) will necessarily be represented in position and motion within the stored volume of data. In effect, therefore, a spatial search is replaced by a memory search in which search strategies are determined by processing design and capacity, rather than by physical constraints of beamforming and agility, time division, and spectrum.

Array/Beam Storage

As explained above, signal information for all visible and detectable targets is collected simultaneously and stored in computer memory and, rather than having a search function in real time and space within the Field of Surveillance, the search function takes place within the memory. This is achieved by means of storing data from the persistently-illuminating radar in memory as a virtual representation of the field of surveillance in which the data can be stored in one or more of a number of different ways including:

as array/time frames in which the data is stored, by array element (vertical and horizontal) and range bin, for pulse sequences over time;

as beam/time frames in which the data is stored, by beam (elevation and azimuth) and range bin, for pulse sequences over time;

as array/Doppler frames in which the data is stored, by array element (vertical and horizontal) and range bin, as Doppler transforms over time;

as beam/Doppler frames in which the data is stored, by beam (elevation and azimuth) and range bin, as Doppler transforms over time.

FIGS. 2(a) and 2(b) and FIGS. 3(a) and 3(b) illustrate, in simplified form, how data acquired by the radar system of FIG. 1 may be stored to form the virtual representation of the field of surveillance.

Figure 2A:
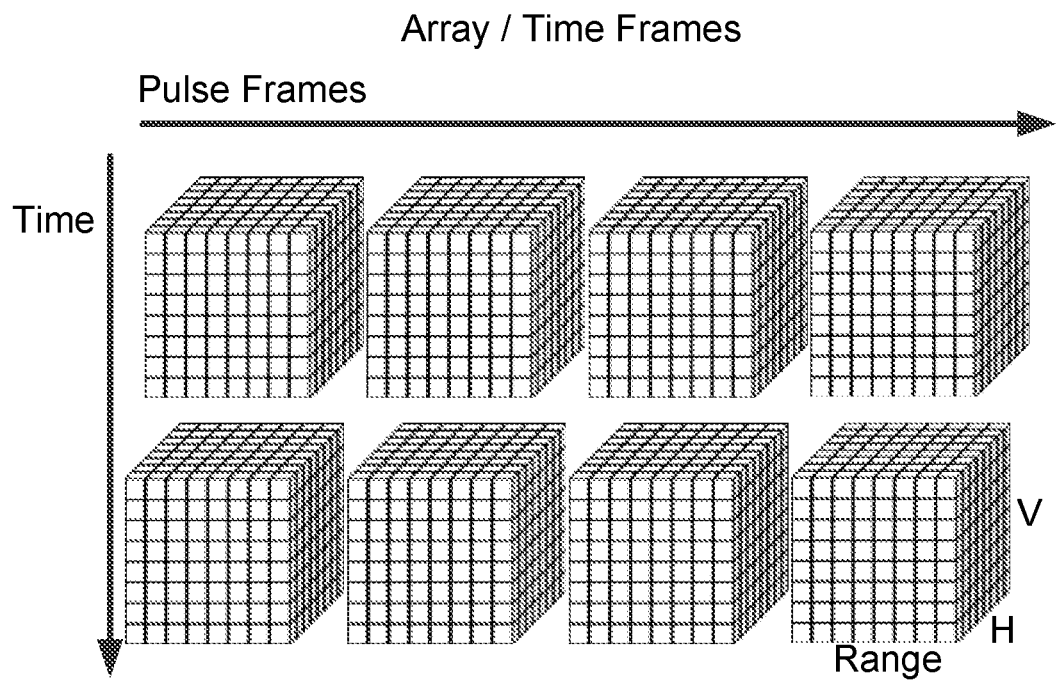
FIGS. 2(a) and 2(b) illustrate, in simplified form, how data acquired by the radar system of FIG. 1 may be stored.

As seen in FIG. 2(a), one way in which data acquired by the radar system of FIG. 1 may be stored over time involves storing the data by receiver element and range. Specifically, in FIG. 2(a) for the returns from each transmitter pulse a three-dimensional pulse frame is generated that contains a range bin sequence for each antenna element (represented in the figure by the element's horizontal 'H' and vertical 'V' position). The pulse frames within a particular 'dwell' time can be concatenated to produce a four dimensional signal frame. The effective 'dwell' time can be modified retrospectively, as explained in more detail later, for example by concatenating additional pulse frames and/or additional signal frames to extend the dwell time. The signal frames can also be concatenated to produce a five-dimensional signal history representing the way in which the virtual field of surveillance changes over time. It can be seen, therefore, that a pulse frame represents a single pulse whilst a signal frame represents a series of pulses that are to be used for the purposes of frequency analysis, and define an 'initial' dwell time that can be extended by concatenating signal frames or adding any number of pulse frames (although it will be appreciated that powers of two are particularly convenient from the point of view of FFTs).

The array element dimensions are transformed to form beams, and the time dimension of the signal frame is transformed to produce Doppler transforms for each element or beam. The number of columns of array elements may vary from 2 to 96, or any number suitable for forming resolved beams in the azimuth dimension. The number of rows may vary from 2 to 32 or any number suitable for forming resolved beams in the elevation dimension. The number of resolved range values may be between say 16 and 512 or any suitable number for measuring range. The number of resolved Doppler 'bins' may be equal to the product of the dwell time and the pulse repetition frequency, and may be 2048, 4096 or more. Thus the radar may detect many targets within a large number of resolution elements lying between a low, 5-dimensional space of a minimum of 32768 and a higher value of 2.4 Bn or more resolution elements per second.

Figure 2B:
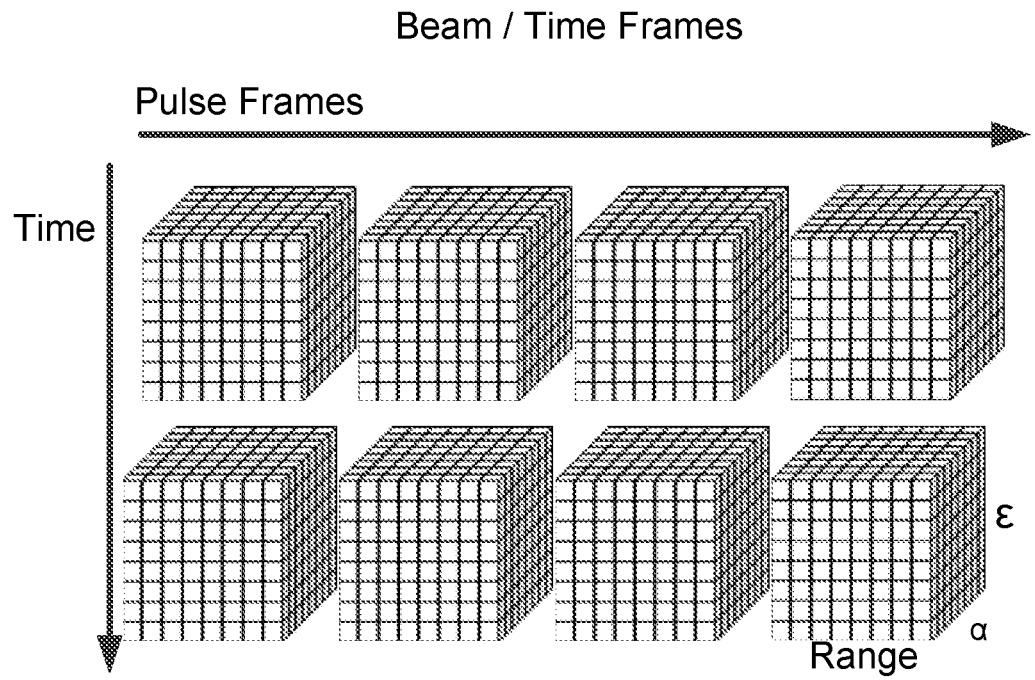

As seen in FIG. 2(b), another way in which data acquired by the radar system of FIG. 1 may be stored over time (in addition to or as an alternative to what is shown in FIG. 2(a)) involves storing the data by beam and range. Specifically, in FIG. 2(b) for the returns from each transmitter pulse a three-dimensional pulse frame is generated that contains a range bin sequence for each beam (represented in the figure by the beam's azimuth 'α' and elevation 'ε'). As with the by array element storage, the pulse frames within a modifiable 'dwell' time can be concatenated to produce a four dimensional signal frame and the resulting signal frames are concatenated to produce a five-dimensional signal history representing the way in which the virtual field of surveillance changes over time.

The signal frames can be transformed into the frequency domain (e.g. by Fourier transformation) to provide Doppler transforms.

Figure 3A:
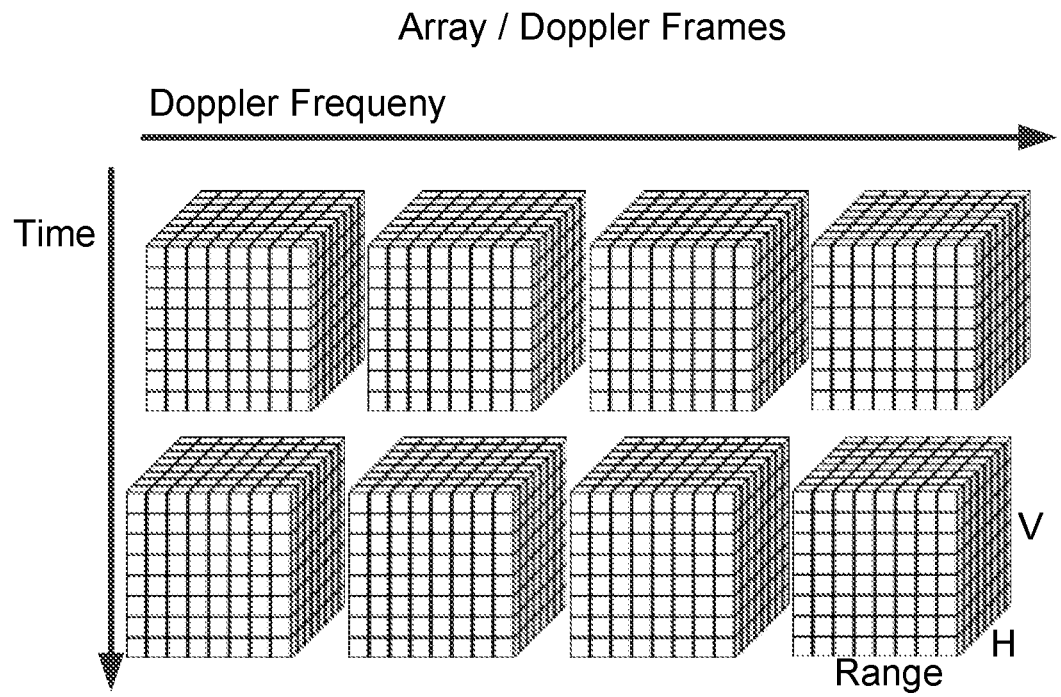
FIGS. 3(a) and 3(b) illustrate, in simplified form, other ways in which data acquired by the radar system of FIG. 1 may be stored.
Figure 3B:
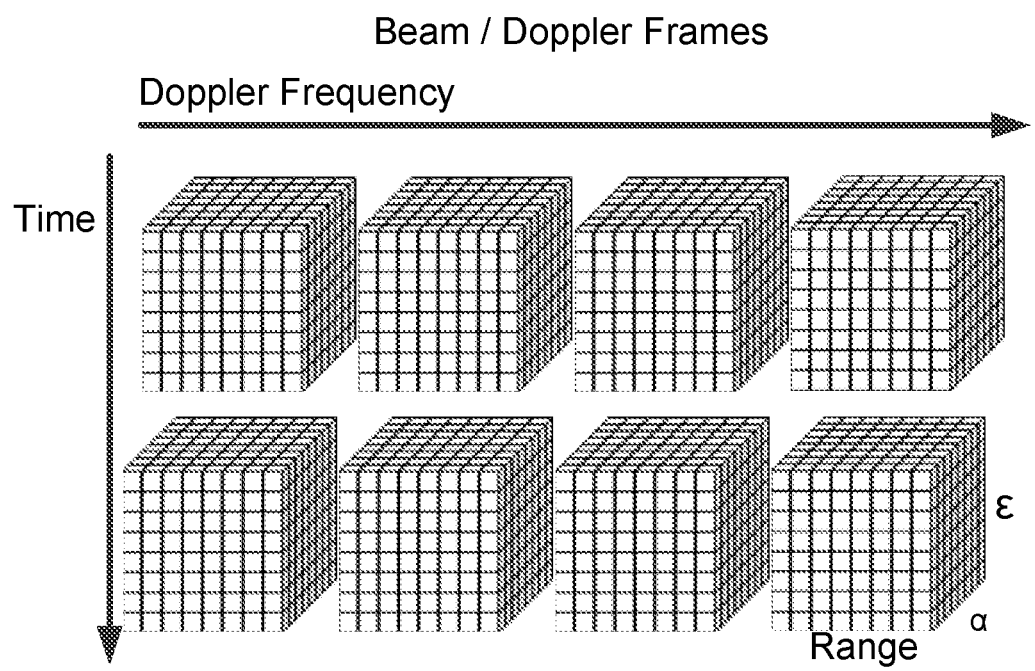

As seen in FIG. 3(a), data acquired by the radar system of FIG. 1 may be stored over time as Array/Doppler frames in which Doppler transforms are stored by element and range (in addition to or as an alternative to what is shown in FIGS. 2(a) and 2(b) above). Similarly, as seen in FIG. 3(b), data acquired by the radar system of FIG. 1 may be stored over time as Beam/Doppler frames in which Doppler transforms are stored by beam and range (in addition to or as an alternative to what is shown in FIGS. 2(a), 2(b) and/or C(a)). The Doppler transforms stored for subsequent signal frames form a Doppler history for the virtual FoS.

Thus, the stored information may, for example, be represented in memory locations corresponding to more than 2 million, more than 10 million, more than 100 million, more than 500 million or more than 2 billion resolved range, azimuth, elevation and Doppler values, updated at least once per second.

Memory Requirements

The typical volumes of data that may be required for such a system will now be considered, by way of example only, to illustrate the typical memory storage requirement for such a system.

For a single element in a receiving array, an application will be considered in which range resolution of 100 m is required, and all range values are recorded at a complex precision of 16 bits. This yields a data rate of 6 MBytes per second. For a typical array or subarray comprising 64 elements, the data rate is therefore around 384 MBps, and one minute's data requires 23 GB of memory.

As explained previously, the data may be processed to form beams, and in one possible example data is stored both in a 'by element' configuration and in a 'by beam' configuration, in parallel (e.g. to provide benefits in terms of improved efficiency of subsequent processing). In this case memory capacity in the region of 100 GB is required for each 64-element array and storage over 1 minute. Whilst this represents a relatively large volume of data the cost of memory is relatively low when compared to the cost of typical surveillance radar equipment. Larger arrays can be accommodated, but also shorter coherent storage times may be sufficient. Memory in the order of 1 Terabyte may be required.

Adaptive Dwell Times/Integration Intervals

Figure 4A:
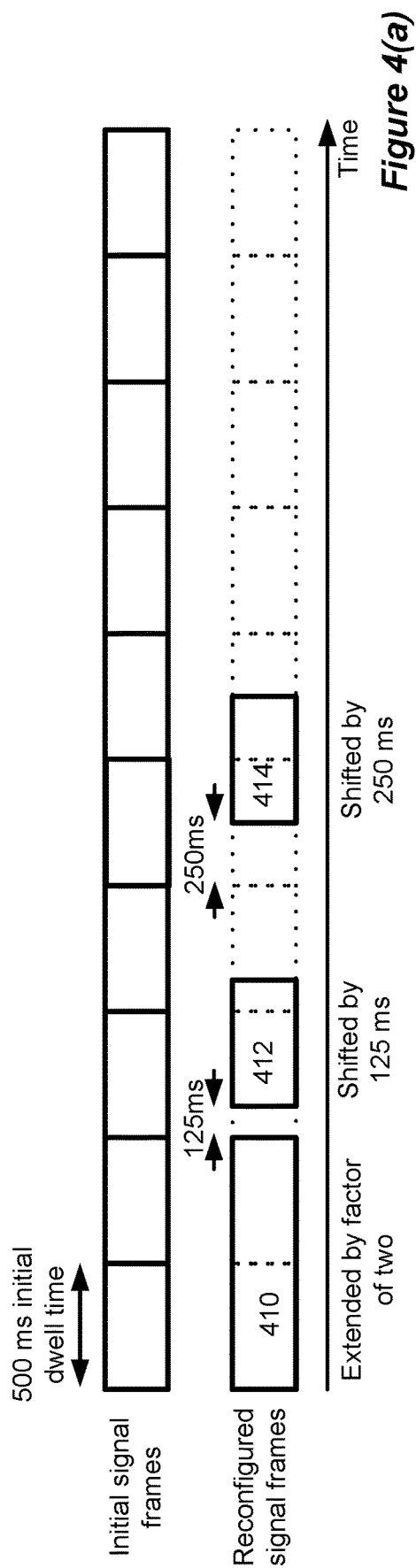
FIG. 4(a) illustrates, in simplified form, extension and shifting of a dwell time for persistently acquired radar data.

While data acquired during a certain time frame is used substantially simultaneously during signal processing and then subsequently during reporting, and while in conventional radars processing and reporting functions occur sequentially for every data frame, the data set achieved by means of persistent interrogation and storage effectively allows the length of frames to be chosen independently of the interval between reports. Thus, referring to the example shown in FIG. 4(a), if an initial coherent integration dwell time is 0.5 seconds, because the data is captured and stored persistently, the frame may be extended (e.g. as illustrated at 410) or moved on arbitrarily (say by 0.125 or 0.25 seconds as illustrated at 412 and 414 respectively) and re-integrated before the next report (125 or 250 milliseconds later) thereby yielding a smoother and 'fully sampled' set of reports, and the ability to update information that incorporates interrogations over an extended period.

As is described in more detail later (in particular in the section titled 'Target Centric Acquisition and Processing (TCAP)') long effective dwell times and integration periods can be achieved by interrogating stored data for an extended period or 'processing interval'. It will be appreciated that whilst extending dwell time and integrating up to 60 seconds of coherent data is envisaged, shorter or longer times may be appropriate for different applications.

Thus, the effective dwell time, coherent or incoherent, can be chosen or varied either pre-detection under resource manager control, or post-detection under the control of detection and tracking algorithms or the resource manager, or the operator.

Dealing with Dynamic Effects

A vulnerability exists in extended signal integration, whether coherent or non-coherent (although non-coherent, while less effective, is less susceptible) as a result of dynamic effects such as the target accelerating, turning, or changing the range gate at which it is observed (range-walk).

Where persistent interrogation is used range walk can be avoided, post-detection, by concatenating or interpolating range gates at the observed range.

Acceleration (whether in turns, in a straight line, or as a result of an oblique trajectory) is known to negate the effectiveness of coherent integration, particularly as dynamic analysis is typically performed by means of Fourier Transformation.

In the case of persistent interrogation, however, compensation for acceleration can be provided by multiplying the stored data volume by a vector matrix so that signal phases for each element are advanced or retarded as a function of time in (say 32) different ways or 'branches', each branch corresponding with the effect of a distinct rate of acceleration or deceleration in the radial direction from the radar. This procedure will leave a time series for which in one of the branches the true acceleration has been most correctly compensated, and for which branch, the Fourier Transform will reach a maximum value for that acceleration, and at the correct central Doppler frequency. The acceleration corresponding to that branch can therefore be retained as the measured value, but the stored data need not be replicated, and associated additional storage is not, therefore, required except for the preferred acceleration value. There is an increase in the processing burden depending on the number of branches. This process is explained in more detail later (in particular in the section titled 'Extended Coherence').

Thus, persistent integration and appropriated storage of the resulting data over a prolonged period has the benefit of increasing the available length of coherent integration, thereby increasing signal to noise ratios. Moreover, it has the greater benefit of allowing persistent interrogation and therefore persistent analysis of the target and its motion, resulting in the ability to characterise the target and its motion through a FoS in a way previously unknown or considered impractical.

Position Focussing

The process of analysing the data volume arising from persistent interrogation can be applied either to the whole volume of data, prior to detection, or to a much smaller dataset limited, for example, to a subset of beams and/or ranges focussed near a position of interest. The position of interest may be a position associated with a particular detection within the data stored for the recorded time period, and the analysis of the data may focus near the position of the detection for a time period prior to the detection or for a time period following the detection. Similarly, data may be retained for beams and/or ranges focussed near a position of interest for a longer period than for other positions in the FoS. In this way many benefits of persistent interrogation can be achieved by processing rates in proportion to the rate of target detections and without wholesale multiplication of the necessary volume of data and processing capacity.

Adaptive Resolution

A further benefit of persistent interrogation is that its resolution cell can be adapted to the application. There is a minimum size of resolution cell for the radar, determined by the receiver array dimensions, the operating frequency and the signal bandwidth, and this is typically kept as small as possible where the target is a singular object, moving in a concerted manner. However, in some applications, notably for weather radar, targets may take the form of more extended and diffuse features occupying larger volumes, whose volume reflectivity or scattering cross section is a very small fraction of the observed volume or area. In the case of persistent interrogation as described, not only can dwell times be extended, but the resolution cell can also be shaped by appropriate linear and coherent beam and range gate combinations. In this way, applications may be created in which the radar's characteristics can themselves be adapted to different requirements, that might previously have been considered to be mutually exclusive using the same radar system, without compromising any existing functionality.

Applications/Implementations

The inventors have realised that persistent interrogation renders possible many beneficial implementations/applications of the radar system that those skilled in the art would have considered unfeasible with more conventional systems. The inventors have also realised that this renders possible enhancements compared to known implementations/applications of radar technology that those skilled in the art would have considered unfeasible or unsafe with more conventional systems. A number of beneficial implementations/applications are described in more detail later.

Spatial Condensation and Cognitive Signal Search.

Figure 4B:
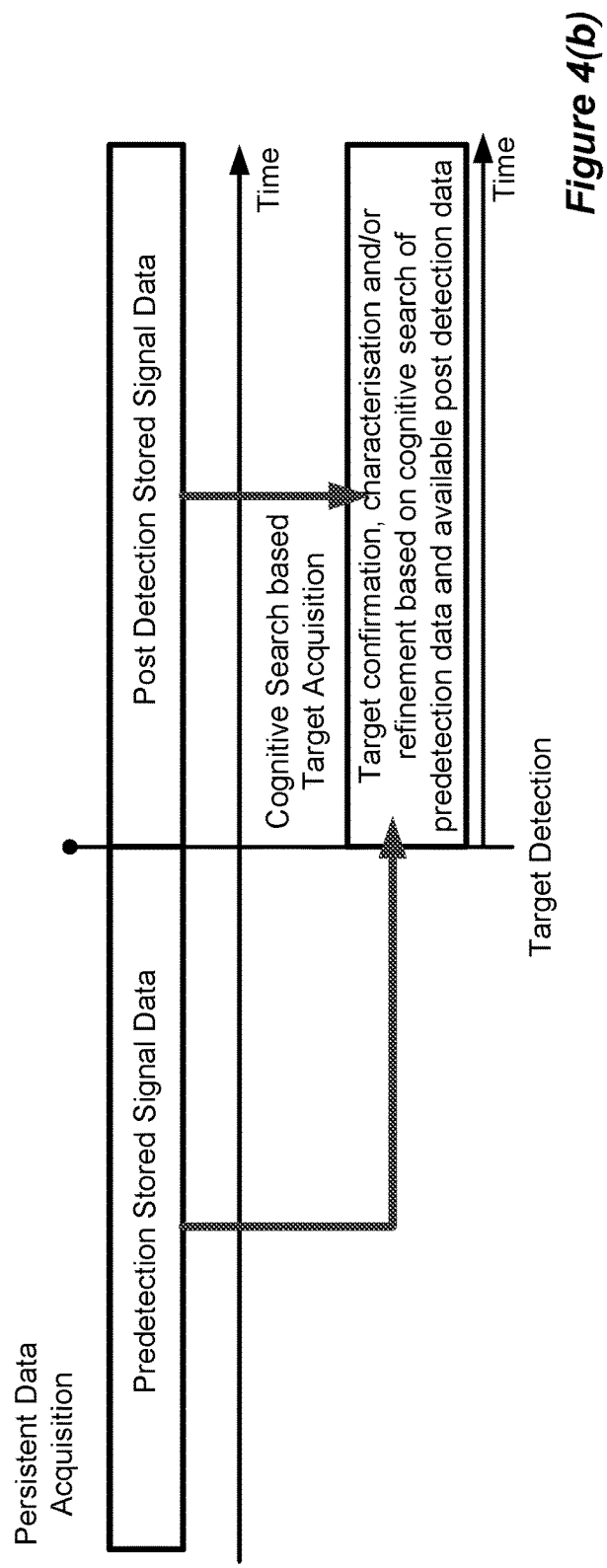
FIG. 4(b) illustrates, in simplified form, a beneficial implementation/application of the radar system of FIG. 1.

Referring to FIG. 4(b), as explained above, the dimensions of direction and range are arranged in memory as a set of pulse frames for beamforming; the pulse frames are arranged in sequence as signal frames for Doppler transformation, and signal frames are arranged in sequence as a signal and Doppler history. In essence, therefore the entire FoS (which may include greater than 500 cubic km of airspace) is condensed into a representation in computer memory (which may comprise a single discrete memory volume or a manageable volume spread over several memory cards. Each second about 2.4 Bn complex data values (64 bits) are generated, and a minute's worth of data for one of the four different forms shown in FIGS. 2 and 3 (e.g. Rows/Columns/Range/signal frame/Time) may be stored in approximately 1 TB (or all 4 forms may be stored in approximately 4 TB). This allows the memory space, and therefore the FoS, to be searched retrospectively for coherent signal evidence associated with the detection.

In one implementation of the radar system, therefore, as illustrated in FIG. 4, signal traces and evidence of the behaviour and nature of targets may therefore be sought anywhere within the data structure. Once a detection is made, the history can be searched retrospectively for coherent pre-detection evidence, and in the forward direction as new data become available.

Thus, as illustrated in FIG. 4, once a target is detected, target confirmation, characterisation and/or refinement may be carried out based on a cognitive search of pre-detection data and available post detection data. A region represented by a subset of beams and/or ranges near the position of the detected target may by focussed on and the data stored for that region analysed in more detail.

It will be appreciated that the target detection itself may occur substantially in real-time or 'after-the-fact' based on historic analysis of the data volume—a process of progressive detection.

Target detection may thus take place within range/azimuth/elevation cells as a function of time within the memory volume of each computer. A trajectory can be estimated, according to which segments of stored data neighbouring the detection (ahead or behind in time) may be analysed to continue the trajectory. The target information may be refined in terms of its trajectory, its behaviour, and its characteristics as a target.

Air Surveillance with Improved Target Density

Referring to FIG. 5, present-day Air Traffic Controllers operate to maintain separation of either 3 Nautical Miles or 5 Nautical Miles (NM) between aircraft, in part because of the resolution, accuracy, reporting rate and 2-dimensional positions provided by current surveillance systems.

FIG. 5 illustrates the ability to successfully distinguish between two targets (T1 and T2) that are at a relatively close distance (<3 NM in this example) from one another and, as a consequence, are at a range and azimuth relative to the radar receiver that are similar to one another and hence difficult to distinguish from one another with sufficient precision to guarantee aircraft safety.

As illustrated in FIG. 5, in one implementation of the persistent radar system described herein, the safe density of air traffic that can be accommodated in the surveyed airspace is greatly enhanced (i.e. the safe distance between monitored aircraft can be significantly reduced), compared to known radar systems, thereby reducing aircraft separation requirements well below the shorter of the 3 NM and 5 NM separations currently provided by air traffic regulators. In this implementation, therefore, the radar system is configured to reliably discriminate between targets at a relatively close proximity to one another of less than 3 NM, more typically less than 2 NM, 1 NM or even 0.5 NM or, subject to effective resolution in elevation or Doppler, zero separation in range and azimuth.

In more detail, in this implementation, the radar system is configured to use an effective rate of reporting, and Doppler and elevation resolution that are sufficient to ensure that aircraft that are proximate in range and azimuth can be distinguished with at least 95% confidence by their radial speed, acceleration and/or height. This in turn means that aircraft that would otherwise be indistinguishable from one another with sufficient confidence levels to meet safety requirements can be separated reliably by virtue of differences in their dynamic behaviour and/or altitude.

The signal processing and data processing techniques used for signal analysis, target detection, imaging, target analysis, tracking, trajectory analysis are also sufficient to resolve and detect targets that, while closely spaced in range and/or azimuth, can be separately tracked, over time, to characterise target behaviour in terms of changing range, azimuth, radial speed and acceleration and/or in terms of vector motion and height (e.g. as illustrated by $track_{T1}$ and $track_{T2}$).

Moreover, in addition to allowing a decreased safe separation between targets, the additional track dimensions available as a result of the way in which data is stored and interrogated, allow an increase in the number of targets that can be tracked and controlled safely. The relatively high reporting rate achievable with this radar system also reduces risks associated with breaks or intervals between track reports. This is explained in more detail with reference to FIG. 6.

Figure 6:
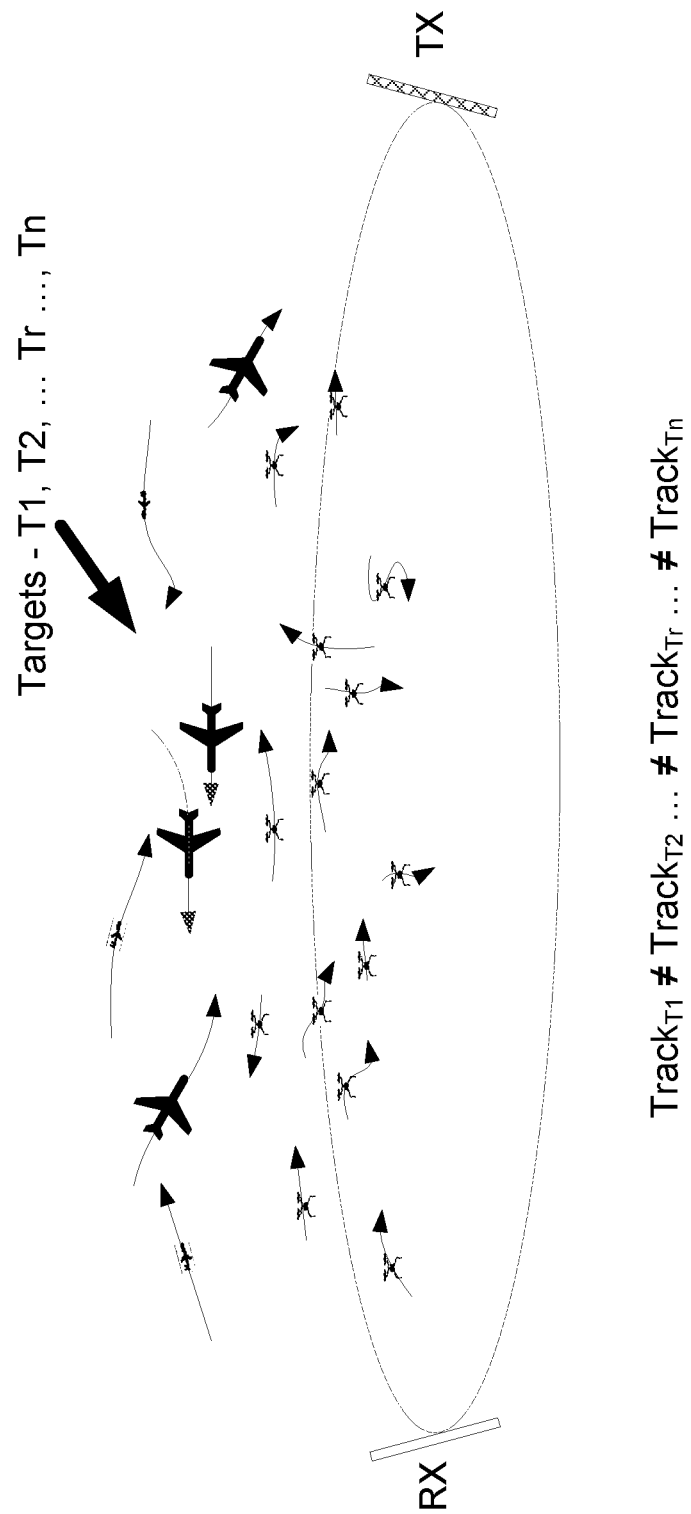
FIG. 6 illustrates, in simplified form, another beneficial implementation/application of the radar system of FIG. 1.

Surveillance with Improved Capacity Referring to FIG. 6, the capacity of current radar surveillance systems, in terms of the number of simultaneous targets that can be detected and tracked simultaneously is limited by the inherent characteristics of the radar surveillance sensor or sensors. Aviation and air transport activity are increasing, and also the increasing use of unmanned drones in military, civil or intrusive or threatening applications threaten saturation of current surveillance systems for the same reasons.

FIG. 6 illustrates the ability to successfully distinguish between and track multiple targets (T1, T2, . . . Tr, . . . Tn) within a FoS. As illustrated in FIG. 5, in this implementation of the radar system described herein, a much higher-capacity radar surveillance system (or network) is provided in which the capacity is limited by that of the available computing resources (computational and/or storage) rather than by the characteristics of the radar surveillance sensor or sensors, or available displays.

In more detail, in this implementation, all the relevant respective signal information available at one or more surveillance locations that is related to each target (of potentially many targets) within a defined three-dimensional Field of Surveillance (FoS) and visible from each surveillance location, is acquired substantially simultaneously by means of persistent interrogation of the FoS. The acquired signal information is stored, wholly or in part, in a computer memory, and made available for signal analysis, target detection, imaging, target analysis, tracking, trajectory analysis and reporting (in real-time and/or retrospectively). In a scanning radar, the volume of information generated in a 4-second scan is of order 100,000 values, whereas for HR it is of order 2.5 Bn values per second. Computer capacity is sufficient to accommodate and process this volume.

In this manner, therefore, this implementation of the radar system can track a very large number of targets substantially simultaneously. The number of trackable targets is limited by the available computer resources that can be increased as necessary rather than any fundamental limit of the radar technology itself. Thus a practical version of this implementation of the radar system may be configured to successfully track over 10,000 targets with sufficient resources, although it is envisaged that typical commercial radar systems may be configured to track fewer than 10,000 simultaneous targets, for example at least 100 targets, at least 150 targets, at least 250 targets, at least 500 targets or at least 1000 targets.

Moreover, where multiple surveillance locations (transmitting and/or receiving) are used to illuminate and/or interrogate targets from different directions and ranges the completeness, and uniqueness, of information about each target can be increased.

Thus, the radar system allows surveillance capacity to be increased beyond that of a circularly or electronically scanned radar and to be limited only by the capacity of computing resources.

In a particularly beneficial version of this implementation, the radar system is configured to track unmanned drones (possibly in addition to other targets such as conventional aircraft), for example as part of a system for tracking delivery and/or military drones. To do this, and to counter the low radar cross-section that may be exhibited by such drones, the dwell time of the radar is increased, as explained elsewhere, benefiting from the persistent dwell of the sensor.

Such detections can thus be used to construct a 'Single Integrated Air Picture', in which targets are reconciled and their accuracy reinforced between several non-coincident receivers as data sources.

Three-dimensional, Non-cooperative Air Traffic Control Facility

Conventional non-cooperative radars are limited in their ability to provide visual output to their users.

In one implementation, therefore, because the persistent interrogation of the entire Field of Surveillance effectively yields a 3-dimensional digital representation of the entire Field of Surveillance, the radar system's output is provided to a user (e.g. a controller) by means of a 3-dimensional visualization system such as a 3D television, or, more beneficially, by means of 3-dimensional viewing spectacles that adjust to the position, motion and control inputs of the controller (which may be provided using any suitable means for example control inputs in the form of touch panels, wands, Wi® sticks, etc.).

A user may, for example, use the system to focus on a particular part of the Field of Surveillance of interest by using their controller to 'zoom in' to a particular region of the 3D visualisation. This action will provide a control input that will result in an interrogation of the part of the data volume representing that particular region, and the representation of that particular region to be enlarged (and potentially a more detailed analysis of that region in order to provide a more detailed visual output of that part of the FoS to the user).

Provision of Multiple Combined Surveillance Functions.

Figure 7:
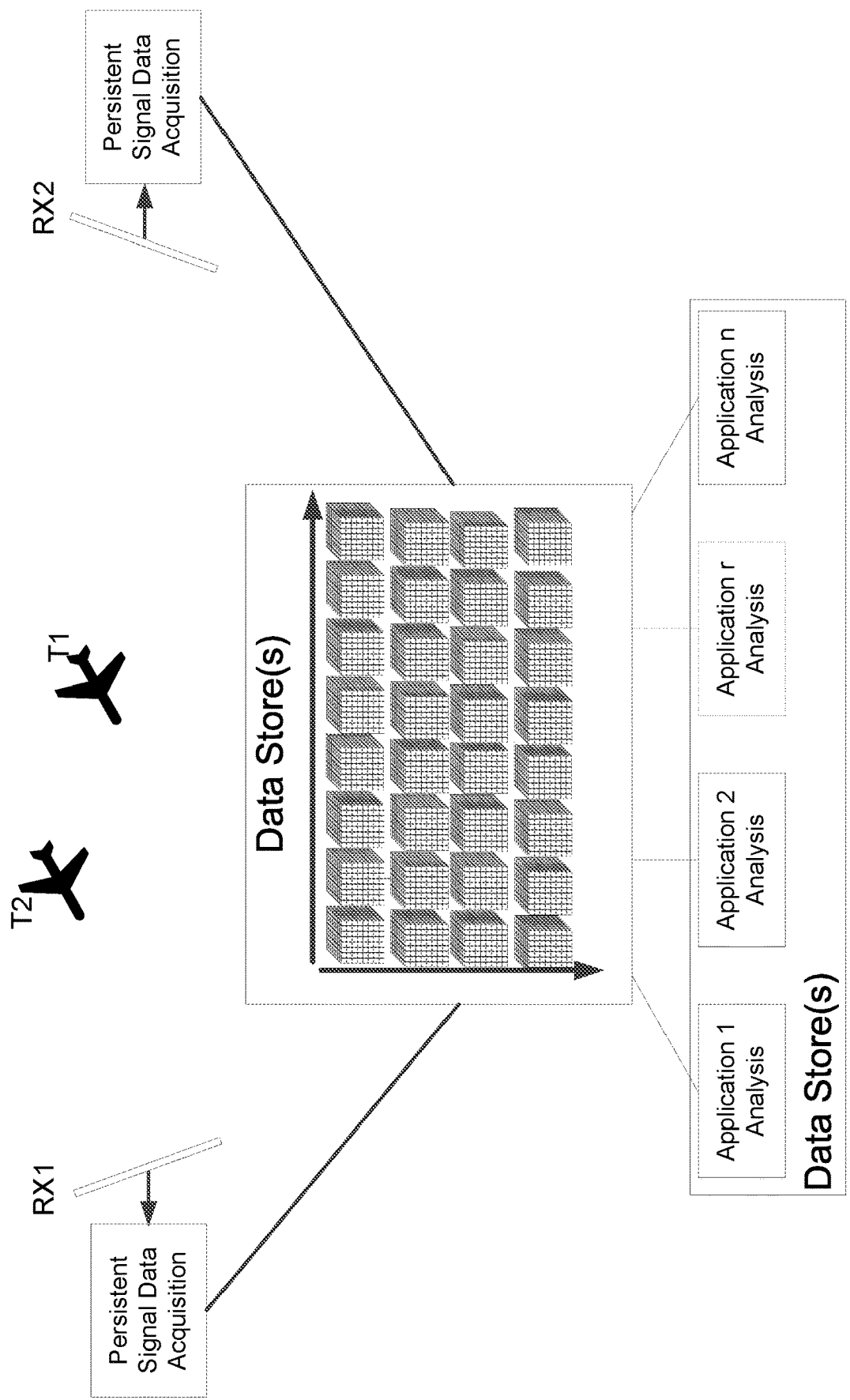
FIG. 7 illustrates, in simplified form, another beneficial implementation/application of the radar system of FIG. 1.

In a scanning radar, because of the need to manage search patterns sequentially, it is difficult to allow for a single radar surveillance sensor to provide a combination of two or more conflicting applications (e.g. Force Protection, Air Defence, Munitions Detection, Traffic Control, border protection, national infrastructure protection, weather radar, tornado tracking, air incident investigation, and/or the like). For example, a function such as air traffic control may be carried out effectively on the basis of target reports every few seconds. However, in the case of a defence or security function, or in retrospective investigation of air incidents, there may be a requirement to determine events in much greater detail and/or other requirements that conflict with those of air traffic control. The continuity of persistent interrogation provides the ability to investigate surveillance data with the necessary sensitivity and continuity using the stored, persistent, high-resolution surveillance data and hence provides the capability for multiple combined surveillance functions as illustrated in FIG. 7.

In more detail, because all targets within the FoS are represented within the computer memory, no differentiated search or scanning function is required to guide or select how interrogation is performed within the FoS. Any of a plurality of surveillance functions, represented by Applications 1 through n in FIG. 7, can be represented by a specific set of processing threads within the computer, and the ability of such functions to coexist or provide mutual surveillance support is limited only by the computing capacity provided.

Beneficially, the radar system can be configured to provide a plurality of applications for example a number of applications selected inter alia from those listed below:

High frequency (HF) over the horizon radar for aircraft, ships, missiles and sea clutter surveillance;

Air defence including long range (over 140 NM), low rate; medium range (<140 NM), medium rate surveillance;

Air defence including 'pop-up target' at short range (<10-20 NM), with a less than 1 second update;

Weapons control including short range (<10-30 NM), ~0.1 second;

Battlefield radar (may have similar requirements to weapons control);

Air traffic control radar (may have similar requirements to medium range air defence);

Non-cooperative target recognition (which requires analytical or imaging functions);

Electronic countermeasures (which requires agile waveform or other prior knowledge of threats);

Weather radar (which requires variable or adaptive feature resolution);

Dismount/docking activities (e.g. a secondary target disengaging from/engaging with a detected target—e.g. indicative of a missile launch/strike or a drone launch/embarkation);

Disintegration events (e.g. indicative of a catastrophic aircraft failure);

Pilot compliance;

Overhead airspace monitoring;

Detection, tracking and/or analysis of low, small and/or slow targets; and/or

Inverse aperture synthesis.

In conventional implementations of the above applications, dwell time is typically a fixed variable of the radar design, in which shorter dwell time is generally preferred, and is directly related to 'revisit time'. Using the radar system described herein, beneficially the dwell can be set or varied, depending on requirements after data collection, both before and after detection, and can be extended to achieve improved Doppler resolution and continuity of analysis, and other benefits associated with extended coherent or non-coherent integration such as improved detection and range resolution for different targets. Issues with range walk, and the ability to effectively track before detection can also be solved as described herein.

Target Analysis.

The ability of present-day surveillance sensors to analyse the characteristics of a target, particularly an airborne target but also ground- or water-borne targets, is limited by the time during which the target interrogation persists.

In one implementation of the radar system, target analysis is enhanced by the persistence (rate and continuity) of interrogation, whereby before, at, or after detection, signal information can be both acquired and concatenated to improve not only signal to noise performance but also the specificity of target information (e.g. in terms of speed resolution, imaging, propulsion, length, wingspan, and/or the like) and signal information (such as periodicity, harmonic content, relative phases, interference patterns, and/or the like).

In more detail, a target moving within the FoS generates a set of direction, range and Doppler values that depend not only on its position and trajectory, but also on its dynamic behaviour, its shape, and its moving components such as propellers, rotors, turbines, flight control surfaces, doors, etc. By tracking the target in the data volume acquired using persistent interrogation, and by applying appropriate dynamic corrections, the intrinsic nature and behaviour of the target can be investigated at a significantly improved level of detail compared to conventional radar and reported.

Figure 8:
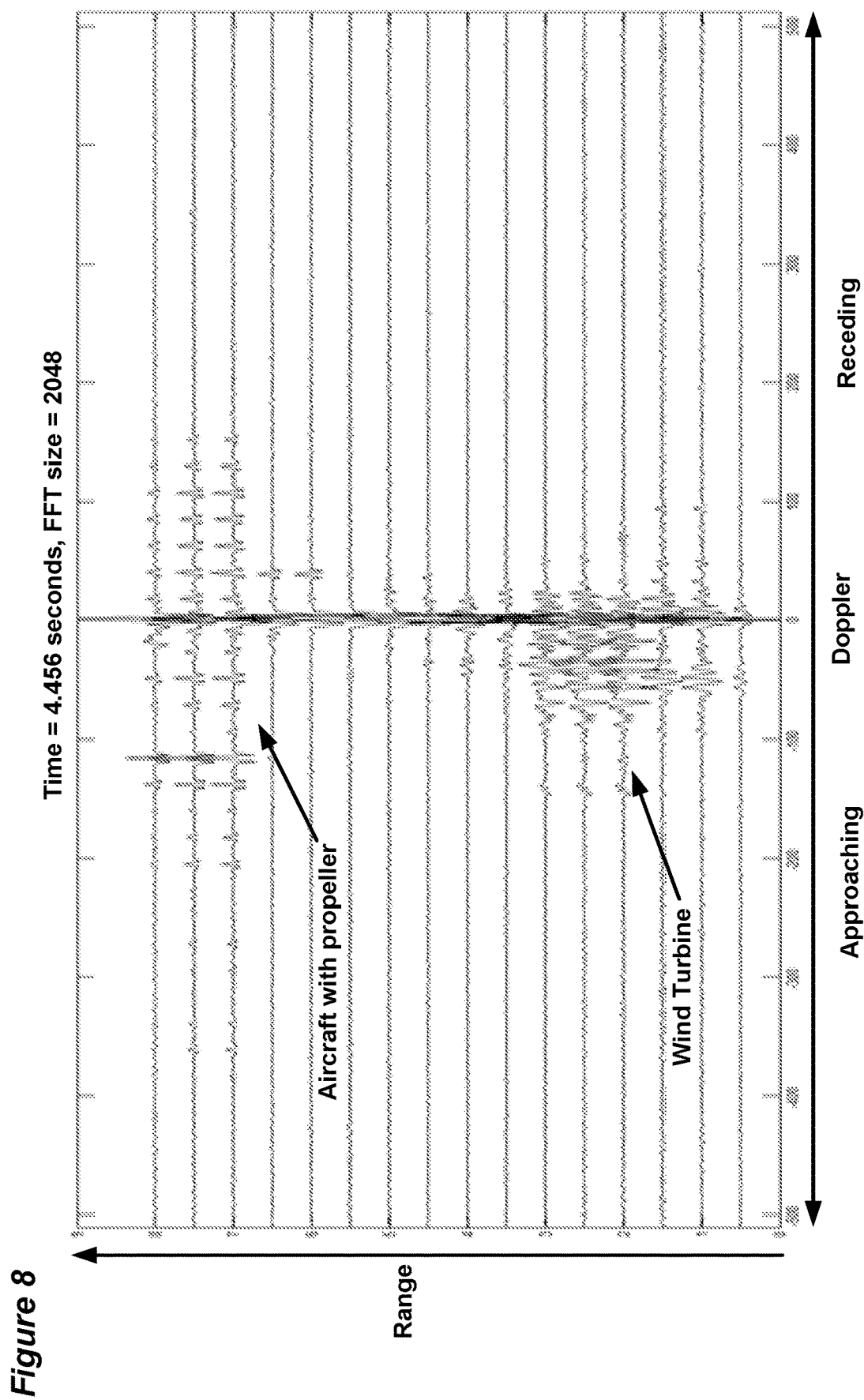
FIG. 8 illustrates, in simplified form, another beneficial implementation/application of the radar system of FIG. 1.

FIG. 8 illustrates, by way of example, how a set of ranges and Doppler spectra can be analysed to provide enhanced target information for a small aircraft and/or a wind turbine.

In this example the aircraft propeller generates a line spectrum (top centre) that yields the blade rate. The small aircraft is found to exhibit the characteristics of a 2-bladed propeller. The determination of whether a detected aircraft is 2, 3 or 4-bladed is based on the complex data (FIG. 8 shows only the modulus of the Doppler), for example an even number of blades exhibits simultaneous and in-phase components approaching and receding, whereas odd blades give alternating and out-of-phase components, approaching and receding. The range rate of the propeller tip can also be established from data extracted that is associated with the aircraft and that exhibits rotational characteristics (e.g. a spread of frequencies across the Doppler spectrum). This range rate, in combination with the direction of travel can be used to extract a tip speed for the propeller. Thus, the propeller radius can also be determined. From this and other information extracted for the detected aircraft (e.g. the number of blades exhibited) the type of aircraft can be determined based on knowledge of known aircraft types.

Monitoring of Pilot, Aircraft and/or Other Target Behaviour.

A particularly beneficial implementation that is enabled by the persistent integration provided by the radar system is the monitoring of aircraft behaviour, or pilot behaviour as evidenced by aircraft behaviour, at a relatively tiny scale. Specifically, the persistent integration provided by the radar system enables a behaviour monitoring system in which pilot and/or aircraft behaviour is monitored at the scale of the radar wavelength (or within an order of magnitude thereof). Such a system can be configured to monitor, for example, inter alia one or more of the following:

time to comply with ATC instructions;
stability and flight efficiency of operation;
compliance with assigned air corridors;
deviation from flight plans or instructions;
aircraft under command; and/or
pilot response to alert.

In more detail, the motion of an aircraft within the FoS is represented by a state vector containing terms describing position, velocity, acceleration, jerk, yank, etc. Under persistent interrogation, these vectors come to represent the details of motion of the aircraft, at the scale of the radar wavelength (centimetres) or greater including; stability of flight, delay between ATC instruction and response, compliance with flight procedures in takeoff, landing, ascent, descent, approach, avoiding action, etc., at time intervals that can be chosen by the operator down to the pulse interval (subject to computing resources). Hence, these can be used by controller, crew, airline management, air defence controller, regulator, trainer, weather surveillance, airframe manufacturer, engine manufacturer, etc. . . .

In this manner, therefore, the performance of a pilot or aircraft to be monitored with respect to, inter alia, one or more of the following: flight safety; compliance with Air Traffic Control; operation of Automatic Pilot facilities; fuel efficiency; intervention by another air borne object such as an aircraft; compliance with aviation regulations; and/or the like.

In one variation of this implementation, the data volume for the period immediately preceding a loss of contact with a target such as an aircraft is automatically (or semi-automatically) maintained (e.g. in backup storage) until contact is regained (this may be for the whole FoS or for a smaller part of it within which the target is located). In the event of a serious occurrence such as a hijacking or air accident the information can therefore be interrogated in detail, after the event, for example to determine if the target collided with an object (e.g. a surface to air missile) and from where that object originated.

The ability of conventional surveillance radar to measure and report aspects of pilot and aircraft behaviour (for example: time to comply with ATC instructions; stability and flight efficiency of operation; compliance with assigned air corridors; deviation from flight plans or instructions; aircraft under command; pilot response to alert, etc.,) is severely limited by its intermittent dwell and cannot be achieved at such fine scale.

The ability of current ground and surface monitoring radar surveillance to provide similar services and reporting functions is similarly limited by the same factors.

In another variation of this implementation, therefore, the radar system is configured to monitor land and/or sea surface traffic behaviour in a similar manner (possibly in addition to providing air monitoring capabilities as described above), at the scale of the radar wavelength (or within a magnitude thereof) or greater, by means of the coherent, persistently-illuminating radar sensor(s) (which may be operated in a coherent surveillance network as described in more detail below) which are configured to illuminate volumes near (within for example 100 metres of) the land or sea surface.

Similar functions may be valuable to operators of surface vehicles or craft; hence the trajectories and behaviour of warships, freighters, tankers, ferries, cruise liners, pleasure craft, inflatables, planing or displacement traffic, sailing craft, or trains, lorries, private cars, motorcycles, road trains, cyclists, pedestrians, runners, etc. may be measured and discriminated, leading to reports, warnings, alerts, alarms or automated responses.

Infrastructure/Asset/Event Protection

Figure 9:
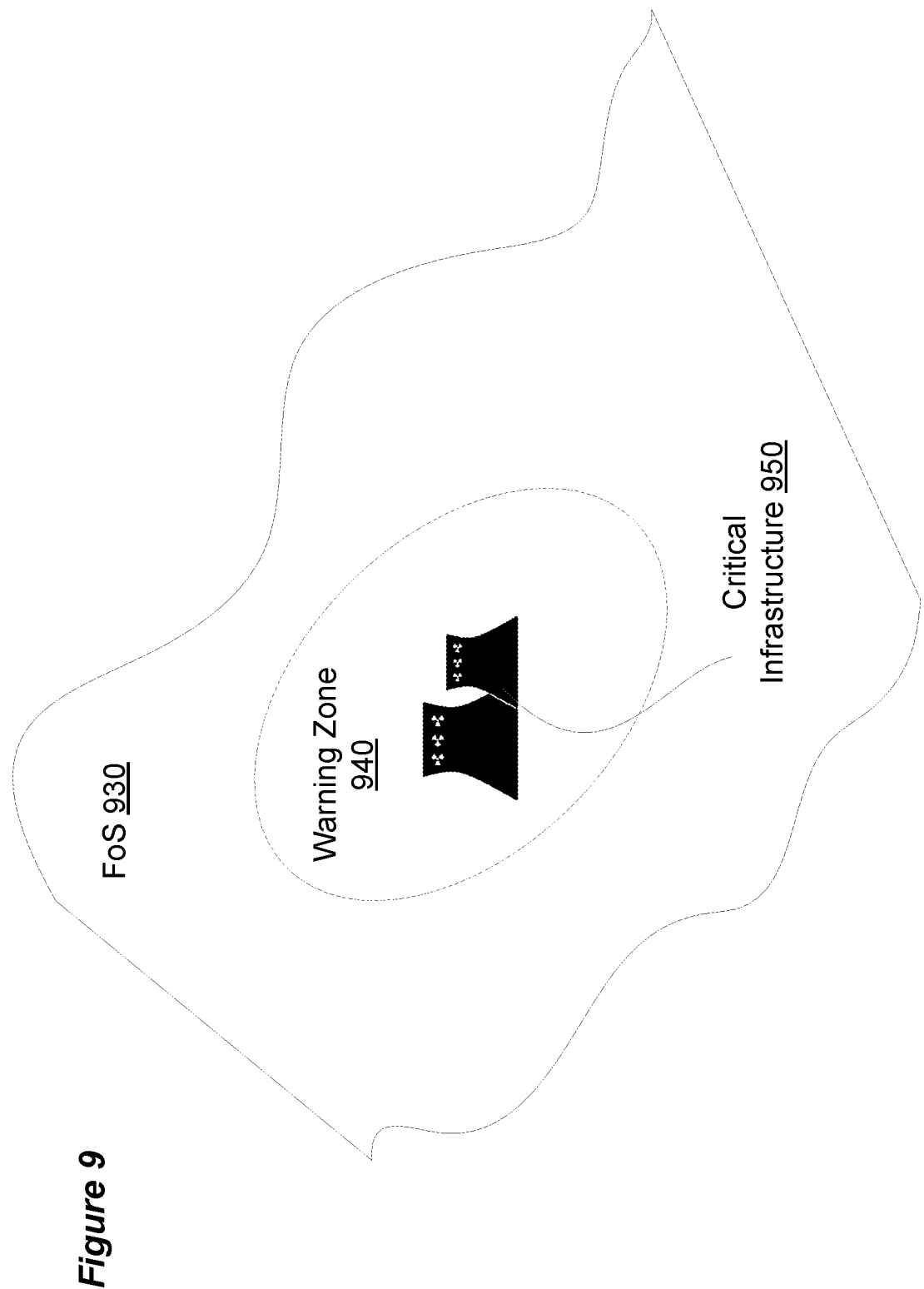
FIG. 9 illustrates, in simplified form, another beneficial implementation/application of the radar system of FIG. 1.

In another implementation of the radar system, as illustrated in FIG. 9, the radar system is configured to provide persistent interrogation of airspace near a site of particular interest (e.g. a site comprising national critical infrastructure or high-value static or moveable assets or critically vulnerable events).

In more detail, in this implementation the radar system is configured to provide a 3-dimensional Field of Surveillance 930 which includes a site 950 (or at least part thereof), that is considered to require greater scrutiny (e.g. for the purposes of providing enhanced protection of the site or for the purposes of acquiring improved intelligence about events occurring at the site). The radar system also provides means by which a smaller region 940 within the FoS, around the site of interest (or at least part thereof), can be configured to allow the greater scrutiny to provide an effective 'Warning Zone' with enhanced surveillance features (such as those described elsewhere including the section titled 'Monitoring of pilot, aircraft and/or other target behaviour' above). The radar system may, for example, be configured to store data relating to the smaller region with a greater resolution (e.g. at smaller range increments and/or tighter azimuth/elevation beams) and/or for a longer period of time.

It will be appreciated that in some cases the smaller region may be a region neighbouring or proximate the site of interest (or part thereof) rather than containing the site, for example to allow nearby air corridors to be monitored for threats.

The smaller 'Warning Zone' region may be around or neighbouring a site comprising, inter alia: a facility, the location of an event, an installation, a hazard, a quarantined area, a port, an airport, aerodrome, air base, road, railway, junction, crossing, airway, littoral, coastline, waterway, seaway, and/or the like.

In this manner, therefore, the radar system can monitor, in greater detail within the smaller defined region, the behaviour and characteristics of air vehicles, intruders, munitions, and the intentions revealed by their compliance with control or commands contribute to the air picture in the vicinity or on neighbouring air routes.

The technology used in the radar system, and applications thereof, will now be described in even greater detail with reference to a specific embodiment of the technology in a radar network (which may be used to provide any of the above implementations/applications). Further potential features and benefits of the technology will also be described in greater detail.

Radar Network

Figure 10:
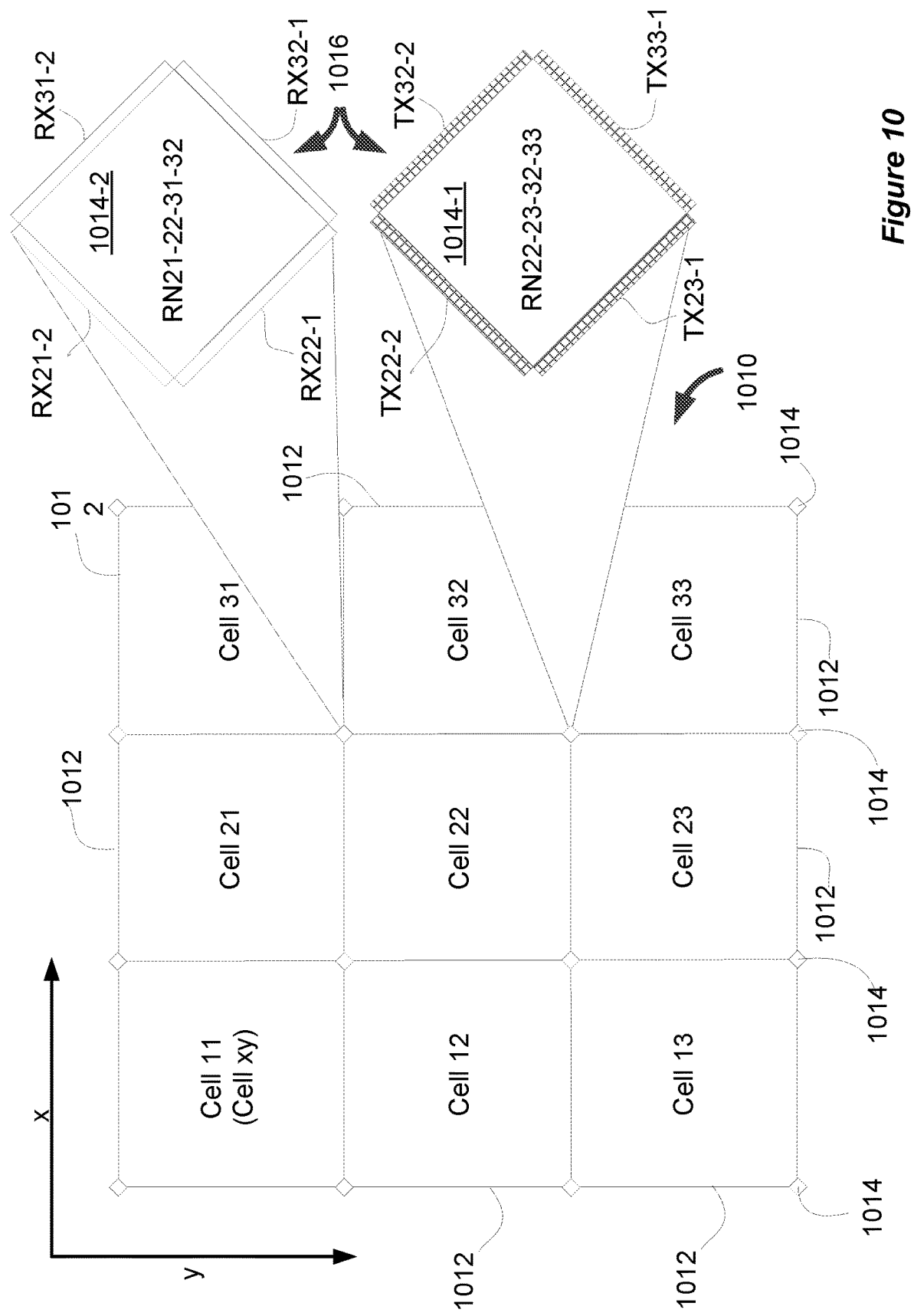
FIG. 10 schematically illustrates, in simplified form, a radar network suitable for providing air surveillance which may be a radar system similar to that shown in FIG. 1.

FIG. 10 shows, generally at 1010, an idealised radar network suitable for providing air surveillance for applications such as air traffic control (ATC) or air defence. The radar network 1010 comprises a plurality of radar cells 1012 with each radar cell 1012 providing its own respective local geographic area of radar coverage. The radar cells 1012 are arranged (or 'tiled') generally adjacent one another to provide a total surveillance area comprising a much larger geographic area of radar coverage (albeit that the actual areas of coverage provided by the radar receivers/transmitters of each cell may, in reality, overlap partially with one another).

Each radar cell 1012 is formed by a respective multi-static arrangement of static radar receivers (RX) and static radar transmitters (TX) with each receiver/transmitter being located at a different respective radar node 1014. The radar nodes 1014 of each cell are arranged in a polygonal arrangement with each radar node 1014 being located at a different respective vertex of the polygonal arrangement. It will be appreciated that configurations with a combination of receivers and transmitters at a single node may also be beneficial.

In this example of FIG. 10, each radar node 1014 is located at a different respective corner of a quadrilateral (a square) and each radar cell 1012 is formed by a multi-static arrangement of two radar receivers (RX) and two radar transmitters (TX). The exemplary radar network 1010 comprises nine cells arranged in a regular three by three arrangement with each radar cell 1012 (labelled 'Cell rc' where r is the row number and c is the column number) being square (although the actual area of radar coverage will extend beyond the boundaries of the square radar cell 1012).

In FIG. 10, simplified expanded views of two of the radar nodes 1014-1 and 1014-2 are shown generally at 1016. The radar nodes 1014-1 and 1014-2 illustrated in the expanded view are nodes located at the mutual vertices of four radar cells 1012. Node 1014-1, for example, is at the vertices of the cells labelled Cell 22, Cell 23, Cell 32 and Cell 33, and is labelled RN22-23-32-33 accordingly. Node 1014-2, for example, is at the vertices of the cells labelled Cell 21, Cell 22, Cell 31 and Cell 32, and is labelled RN21-22-31-32 accordingly. As illustrated in the expanded view, radar node 1014-1 comprises four radar transmitters TX22-2, TX23-1, TX32-2, and TX33-1 (one for each of Cells 22, 23, 32 and 33). As illustrated in the expanded view, radar node 1014-2 comprises four radar receivers RX21-2, RX22-2, RX31-1 and RX32-2 (one for each of Cells 21, 22, 31 and 32). It will be appreciated that, whilst a radar node having purely transmitter or receiver functionality for multiple cells is particularly beneficial for a regular tiled arrangement as shown in FIG. 10, in practice separate radar nodes 1014 may be used for different radar cells 1012. Each radar node may thus comprise a single radar transmitter or radar receiver for a single radar cell 1012.

Beneficially, each radar transmitter TX is a static transmitter that is arranged to illuminate its respective cell 1012 with a continuous stream of radio pulses at a predefined pulse repetition frequency (PRF) (i.e. having a predefined pulse repetition interval PRI) persistently, without scanning.

Similarly, each receiver RX is a static receiver arranged to observe an entire field of view (including the coverage area of its radar cell 1012) persistently without scanning and to receive reflections of pulses that are returned by targets in its radar cell 1012. Each radar receiver RX is provided with an associated processing capability which is configured to process the reflections of pulses returned from within its radar cell 1012 to determine information about the target from which the reflected signals are returned. The information that can be obtained includes positional information suitable for identifying the three dimensional position of the target (e.g. range, azimuth and elevation) and movement information identifying how the target is moving within the radar cell 1012 relative to the radar receiver RX (e.g. heading and velocity) using high-precision unambiguous Doppler. The parametric history for a target is stored and maintained including, for example, tracking information (positional history) and/or Doppler history. The detailed signal information including high-precision, unambiguous, Doppler histories that result for each target are used to track and classify each target.

Each receiver is designed to receive a wide dynamic range of signals within a tightly-controlled band, and to reject others strongly.

The radar receivers RX are connected, via a high speed communication link, to one another and to a server (not shown) where the positional and movement information from each radar cell 1012 is collated in order to track the movement of targets of interest throughout the entire surveillance area covered by the radar cells 1012 (e.g. as part of a broadband data network). The radar receivers RX of a particular cell 1012 are also able to share, via the communication link (either directly or indirectly via the server) respective information relating to a target detected in that cell obtained by each radar receiver RX of that cell. This allows each radar receiver RX of the radar cell 1012 to refine the positional and/or movement information derived for the target and to resolve any ambiguities.

In this example, the greatest proportion of computing power is provided at each receiver RX, and data communications consistent with modern broadband networks are sufficient to transport messages beyond the receiver to the server and/or other receivers.

This approach is similar to techniques, used for so called 'holographic' radar (HR), which are described in the International Patent Application having publication number WO2008/145993 and International Patent Application having publication number WO2009/144435 the contents of both of which documents are hereby incorporated by reference. The holographic radar is configured to illuminate a particular volume of space persistently rather than in the discontinuous manner of scanning radar systems. Information contained in signals returned from the volume being illuminated is not, therefore, lost or degraded as a result of scanning discontinuity. The holographic radar measures aircraft positions using intense, but technically realistic, computational processing. Such discontinuities, caused by scanning, can make target resolution, in the presence of clutter (especially wind farm related clutter), difficult and in some cases impossible. The holographic radar is able to accurately measure aircraft (and other target) positions using intense, but technically realistic, computational processing.

For a radar configuration having a particular combination of operating frequency ($F_{op}$), Pulse Repetition Frequency (PRF), target range (R), and radial speed ($V_r$), radar target information can be said to be effectively 'continuous' or 'persistent' and its Doppler shift unambiguous if, where 'c' is the speed of light, it is sampled:

(a) at a rate exceeding the Nyquist rate for the Doppler shifts engendered by the target, that is at a PRF greater than $[4 \times F_{op} \times V_r/c]$; and (b) without interruption. In this case $V_r > [c \times PRF/(4 \times F_{op})]$ Range information is unambiguous if the target is at a range less than a maximum ($R_{max}$) where $R_{max} = [c/(2 \times PRF)]$.

This is achieved if for the radar configuration where the target ranges (R) and radial speed ($V_r$) lie within the maximum values $R_{max}$ and $V_{rmax}$ such that:

(a) $R_{max} \times V_{rmax} < [c^2/(8 \times F_{op})]$; and (b) $[c/(2 \times Rmax)] > PRF > [4 \times F_{op} \times V_{rmax}/c]$, This is the ideal situation for the holographic radar (HR) (e.g. as described in the International Patent Application having publication number WO2008/145993 and International Patent Application having publication number WO2009/144435).

However, the inequalities for unambiguous range and range rate defined above place limits on maximum range and radial speed that may not always be convenient within typical mission requirements (range and speed) and normally available operating frequencies for surveillance radar. Lower frequencies are preferred to achieve high range and speed. For example, for operation at L band (1215-1350 MHz for aeronautical radio determination), for aircraft flying at 600 kts, this would impose a range limit in the region of 15 Nautical Miles (nm). This is short with respect to many surveillance radar requirements. On the other hand if the pulse repetition frequency is set low enough to achieve unambiguous range of say 40 nm, the Doppler shift for high speed targets may exceed the Nyquist criterion for that PRF.

The exemplary radar receivers described herein are advantageously configured, in any of a number of different ways, to resolve any such ambiguity.

Beneficially, the frequency of the radio waves transmitted in each pulse from each radar transmitter, and observed by each radar receiver is maintained the same (or is restricted to a small selection of frequencies across a small frequency band) for the entire radar network 1010, using a resolution bandwidth in the region of 1 MHz (or less) which is equivalent to an occupied bandwidth of approximately 2 MHz. The frequency used, in this example, is located in the so called 'L' band (1 to 2 GHz).

For the purposes of spectrum release, therefore, it can be seen that the radar network 1010 beneficially allows non-cooperative surveillance to move out of the S band, and to occupy a minimal spectrum, using an integrated network of radar sensors operating on, and occupying only a single frequency (or a small range of frequencies), in the L band. This will beneficially allow release of the S band spectrum. The high quality of target information allows targets to be resolved based on their Doppler history, not by means of raw range resolution. This allows spectrum use to be optimised and concentrated in a single, narrow band.

Time on target is not limited by beam scanning considerations: the process dwells on each target as long as is needed to determine whether it is a target of interest for tracking or whether it is to be classed as clutter (either static, or moving as in the case of a wind turbine). Discrimination can therefore be done largely on the basis of precision Doppler histories (or the evolution of such histories).

As will become apparent from description that follows, in addition to reducing the requirement for spectrum, particularly in the S Band, the proposed radar network has the potential to provide a number of other benefits including: higher accuracy based on extended measurement baselines and more rapid updates based on the 'staring' (persistently illuminating) sensors; elevation measurement; clutter analysis and removal; target classification capabilities arising from multi-sensor observations, for example based on high-resolution, unambiguous Doppler histories; clutter analysis and removal, including wind turbines; as low-cross-section targets become more prevalent, detection capabilities can be enhanced using appropriate, target-type-specific modelling and filtering.

Such a system also has the potential to offer: imaging capabilities; secondary radar capabilities for messaging including identification and supplemental information.

The holographic radar technology on which the network is based has been successfully demonstrated at trial, is scalable and cost effective. It can therefore meet the performance requirements of current primary surveillance radar and, in a number of respects, can exceed it (especially in relation to clutter suppression, 3D measurements, update rate and added target and track information). Moreover, the cellular nature of the system allows it to be incrementally integrated with, or to incrementally replace, existing air surveillance radar systems.

Moreover, the use of Holographic Radar technology has successfully been demonstrated to maintain performance without degradation in the presence of clutter, particularly including wind farms.

Radar Cell

Figure 11:
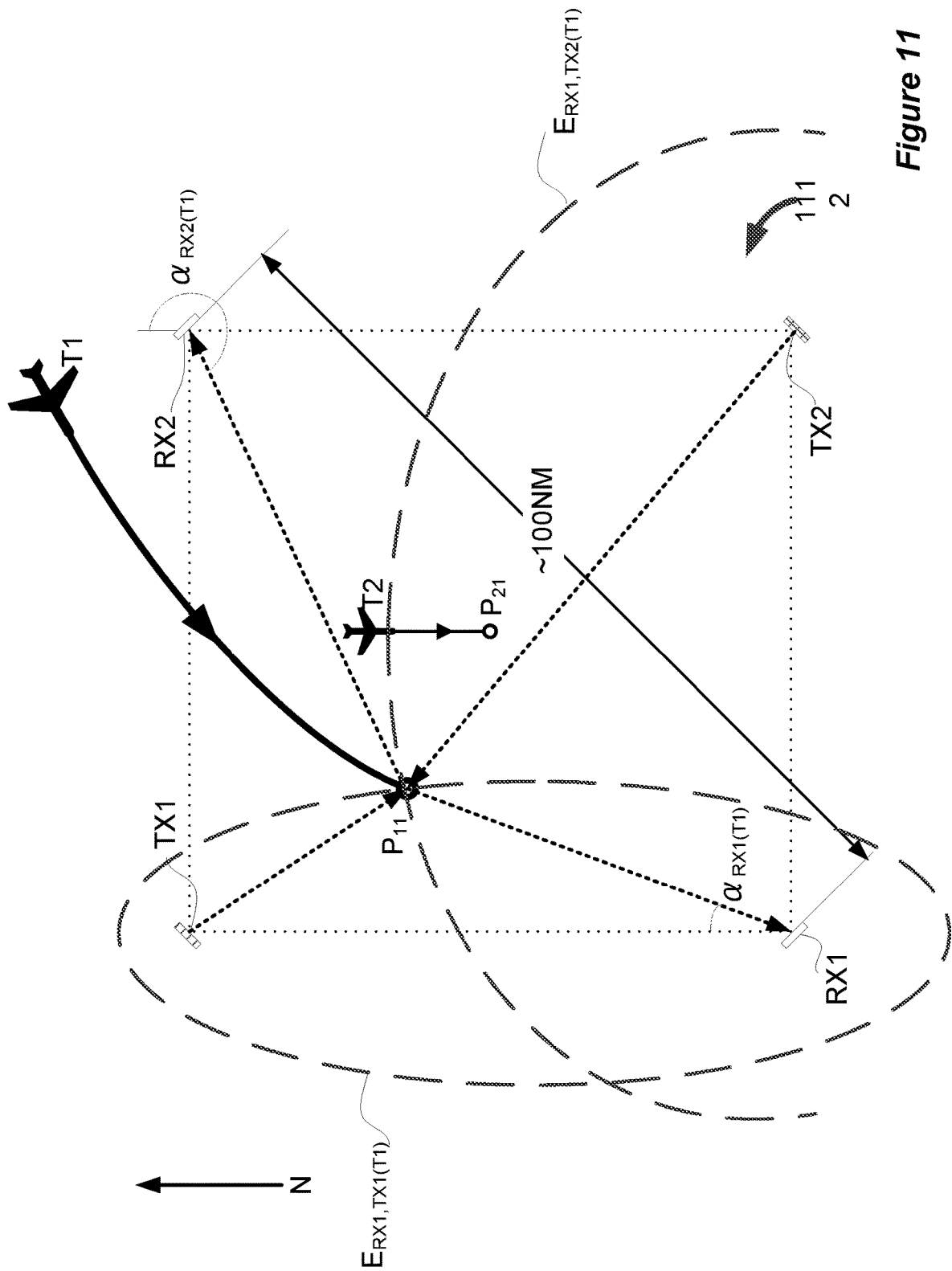
FIG. 11 schematically illustrates, in simplified form, a cell of the radar network of FIG. 10.
Figure 12:
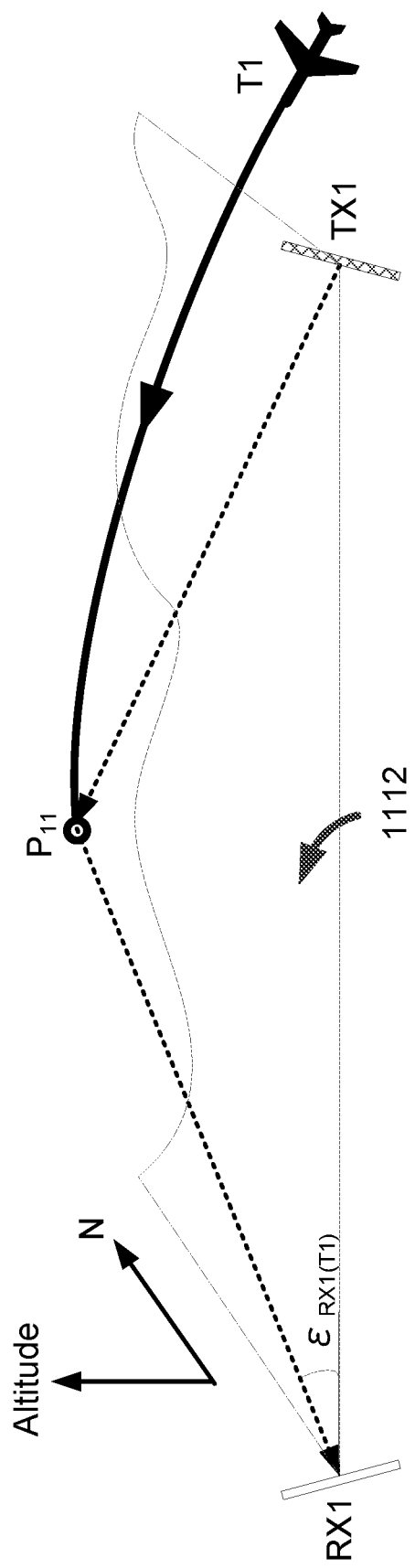
FIG. 12 illustrates, in simplified form, performance of a positional measurement possible in a cell of the radar network of FIG. 10 or in the radar system of FIG. 1.

A radar cell will now be described in more detail with reference to FIGS. 11 and 12 in which a single cell, suitable for forming part of the radar network 1010 of FIG. 10, is shown generally at 1112. In FIG. 11, a single square radar cell 1112 is shown in plan whilst in FIG. 12, the single square radar cell 1112 is shown partially from the side to illustrate a measurement of angular elevation.

The square radar cell 1112 formed by two radar transmitters TX1, TX2 arranged at diagonally opposite corners of a square and two receivers RX1, RX2 arranged at the other diagonally opposite corners of the square. The diagonal distance from the transmitter/receiver at one corner of the square to the transmitter/receiver at the other corner of the square is typically, as shown in this example, 100 NM (approximately 70 NM on a side) although larger or smaller cells are possible depending on requirements. Typical useful transmitter to receiver separation may, for example, range from a few tens of meters to tens of kilometres and beyond (e.g. 100 m, 1 km, 10 km or 100 km). The coverage of the cell is configured to extend upwardly to Flight Level 600 (approximately 60,000 feet). The lower limit of coverage is determined by the locations and heights of installation and is, therefore site dependent.

Each radar transmitter TX1, TX2 persistently illuminates a broad region, encompassing the entire square cell 1112, with a continuous sequence of pulses of an L band frequency radio wave. When the pulses encounter an object in the illuminated region reflections of that pulse are returned from the object. The pulse repetition frequency (PRF), in this example, is sufficiently high to ensure that the maximum expected velocity (positive or negative) of any target of interest can be determined unambiguously based on the Doppler shift that they impart to the reflected signals that they return. Specifically, the PRF is greater than or equal to four times the expected maximum magnitude of radial speed divided by the wavelength of the radio wave used in the pulses.

Each radar receiver RX1, RX2 continuously monitors the radar cell 1112 and receives reflections of the pulses returned from targets of interest (for example targets T1 or T2 shown in FIG. 11) such as aircraft, other airborne objects and/or ground or marine based vehicles, from substantially anywhere in a broad region, encompassing the entire square cell 1112. Thus, targets T1 and T2 within the cell are illuminated by both radar transmitters TX1, TX2, and their reflections are received by both radar receivers RX1, RX2.

Whilst the radar network is intended to operate with several transmitters 'visible' to each receiver, with each transmitting persistently (continuous sequence of pulses rather than continuous wave), when the distance between the transmitter and receiver is sufficiently large (such as this example) the receivers will not become saturated by line of sight radar signals received directly from a transmitter.

Beneficially, however, where there is a risk of receiver saturation/desensitisation, the radar receivers RX1, RX2 can be configured to attenuate signals received from the direction of each of the transmitters TX1, TX2 to avoid saturating the receiver or degrading its sensitivity undesirably. The attenuation may be achieved mechanically or computationally in any suitable manner for example by shadowing or obscuring the returns, by beam nulling, by appropriate direction of the receiver beam, and/or by signal subtraction.

Furthermore, each radar receiver RX1, RX2 is beneficially able to synchronise with each radar transmitter TX1, TX2 based on the radar signals received directly from that radar transmitter TX1, TX2 (regardless of whether those signals are attenuated or not). It can be seen, therefore, that by partially attenuating (as opposed to completely suppressing) radar signals received directly from the transmitter TX1, TX2 (when necessary), synchronisation with each radar transmitter TX1, TX2 can still be achieved simply and efficiently based on the radar signals received directly from that radar transmitter TX1, TX2.

As will be described in greater detail later, each radar receiver RX1, RX2 comprises an array of spatially separated receiver elements that are arranged to allow the angular direction from which received reflections of pulses returned from targets of interest to be determined using an associated signal processor. The angular direction can be determined, by the signal processor, both in azimuth, as shown in FIG. 11, and elevation as shown in FIG. 12 (for RX1 and TX1) to provide, for each target detected, a respective pair of measured azimuth angles $\alpha_{RX1}$ and $\alpha_{RX2}$ (one for each of the radar receivers RX1, RX2) and a respective pair of measured elevation angles $\varepsilon_{RX1}$ and $\varepsilon_{RX2}$ (one for each of the radar receivers RX1, RX2) only one of which is illustrated in FIG. 12.

Figure 13:
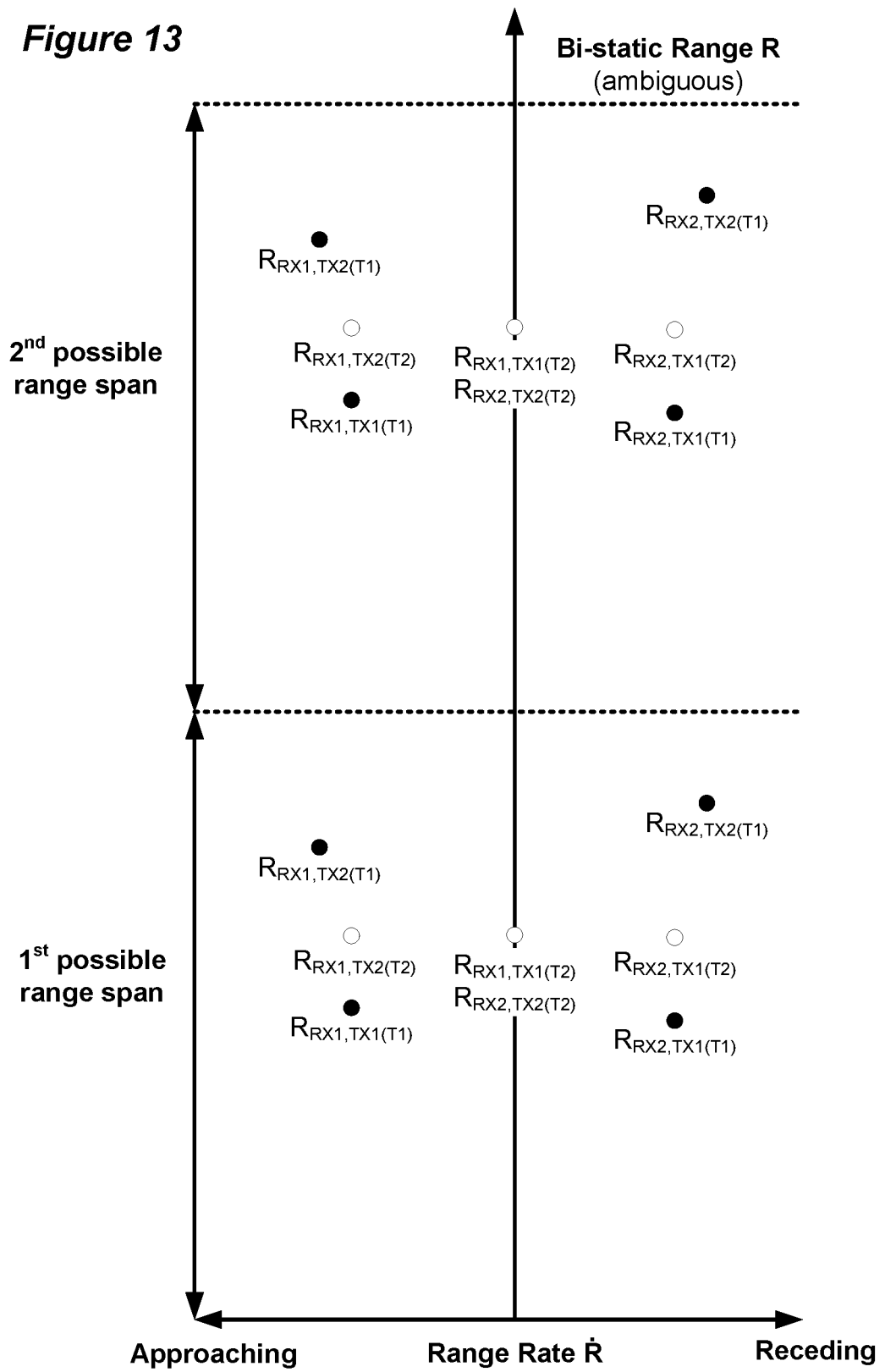
FIG. 13 illustrates, in simplified form, further measurements possible in a cell of the radar network of FIG. 10 or in the radar system of FIG. 1.

Referring to FIG. 13, which illustrates a bi-static range 'R'/range rate '$\dot{R}$' space in which observations made by the radar receivers RX1, RX2, for the targets T1, T2, are represented, the signal processor of each radar receiver RX1, RX2 is able to determine the velocity vector (speed and direction) of the target from respective measurements of the range rate (positive or negative) of the target in a direction perpendicular to a line between the radar receiver RX1, RX2 making the measurement and each radar transmitter TX1, TX2. The signal processor of each radar receiver RX1, RX2 is also able to determine the combined distance (bi-static range) of a target T1, T2, from that radar receiver RX1, RX2, and from the radar transmitter TX1, TX2 that transmitted the original radar pulse that caused the reflected signal being analysed.

In more detail, the signal processor of each radar receiver RX1, RX2 is able to process the reflected signals received by that radar receiver RX1, RX2 to measure the Doppler shifts imparted to those reflected signals. The signal processor is thus able to determine with a high degree of precision the range rate represented by the measured Doppler shifts, because of the relatively high PRF used by the transmitter. More specifically, for a given target, the signal processor of each radar receiver RX1, RX2 is able to determine a respective pair of range rate measurements; each range rate measurement being associated with signals originating from a respective radar transmitter TX1, TX2. Each range rate measurement represents the velocity of the target in a direction perpendicular to a straight line between the radar receiver RX1, RX2 making the measurement and the radar transmitter TX1, TX2 that transmitted the signals for which the measurements are being made. Thus, the signal processor of each radar receiver RX1, RX2 is able to determine, with a high degree of precision, the 'true' velocity vector (speed and direction) for the target by resolving the pair of range rate measurements (which represent, for the square radar cell 1112 of this example, perpendicular components of the true velocity vector).

The velocities calculated at each radar receiver can be internally validated with one another to ensure accuracy.

Doppler spectra and histories are stored, maintained and evaluated for each target, at the receiver and/or the server, and each target is classified (for example as aircraft, helicopter or wind turbine) based on the historical information. Reports are compiled, at the receiver and/or the server, for each reportable target, and in the above examples the responses associated with wind turbines are discarded.

Different targets may thus be classified based on the characteristics exhibited by the Doppler spectra instantaneously and/or historically over time. Referring back to FIG. 8, for example, the classification may be based on, inter alia:

- the overall spread of the Doppler spectrum in the frequency domain (e.g. having a spread of Doppler components that extends by an amount associated with a particular target class such as the 'wind turbine' in FIG. 8, or by the blades of a helicopter main or tail rotor);
- the periodicity of the Doppler spectrum (e.g. by determining a blade rate for the propeller aircraft in FIG. 8 based on the periodicity—time between well defined regular peaks);
- the regularity, gaps or imbalance in the frequency domain (e.g. the nature of features such as turbine, rotor or propeller blades and their leading edges (usually rounded) or their trailing edges (usually sharp));
- the spread of each component, the central or peak component (e.g. components that persist or components that flash discontinuously, and the relationship between components that are straight, or curved or more or less long compared with the wavelength);
- the maximum frequency or amplitude offset of components (e.g. the fastest approaching or receding part);
- the relative phase of components (e.g. complex spectrum components which may represent an even or odd number of rotor or propeller blades);
- distinctions between approaching and receding components (e.g. targets in turns, rotating targets, targets in aerobatic manoeuvres etc.);
- the development of components as dwell time is increased or reduced (e.g. do they become sharper or do they separate into different, distinct components, either repetitively or discontinuously);
- the relative amplitude of components (e.g. aircraft viewed either nose-on or from below).

The accurate synchronisation achievable using the direct signals received from the radar transmitters, or by synchronization with precision satellite or terrestrial timing signals, allows the signal processor of each radar receiver RX1, RX2 to determine, with a reasonable degree of accuracy, a time taken (or 'delay'), from a radar pulse being transmitted, to its reflected signal being received at the radar receiver RX1, RX2. The delay represents the combined distance of the target T1, T2, from the radar receiver RX1, RX2 that receives the reflected signal and from the radar transmitter TX1, TX2 that transmitted the original radar pulse that caused the reflected signal (referred to as the bi-static range). A delay measured for a particular target and a particular transmitter TX1, TX2 therefore represents a respective ellipse (or ellipsoid in three dimensions) of constant bi-static range on which the target is located. Each ellipse has a focus corresponding to the radar receiver RX1, RX2 at which the reflected signal is received and another focus at the radar transmitter TX1, TX2 from which the original radar pulse originated. Where synchronization with precision satellite or terrestrial timing signals is used the synchronisation may be made using the so-called 'MSF' or 'The Time from NPL' signal (formerly known as the 'Rugby clock') which currently comprises a, highly accurate, 60 kHz signal broadcast by the UK's National Physics Laboratory (NPL), or may be with any other suitable signal broadcast elsewhere. Synchronisation may be with so-called Coordinated Universal Time (UTC).

In FIG. 11, two ellipses $E_{RX1,TX1(T1)}$, $E_{RX1,TX2(T1)}$ are shown for reflected signals received from target T1 at radar receiver RX1. Each of the two ellipses $E_{RX1,TX1(T1)}$, $\varepsilon_{RX1,TX2(T1)}$ shown correspond to the bi-static range represented by the delay measured for radar pulses originating from a different respective radar transmitter TX1, TX2. As illustrated, the target T1 to which the ellipses relate is located at an intersection $P_{11}$ between the two ellipses (or ellipsoids in three dimensions). The processing capability of the receiver is able to determine where the ellipses/ellipsoids intersect thereby narrowing down the possible position of the target to a range of possible positions. For most of the cell coverage, the processing capability of the radar receiver RX1, RX2 is able to use the angular measurements (azimuth and/or elevation) to find the point of intersection between the ellipses/ellipsoids that is consistent with the angular measurements thereby providing a true measure of the position, P11, of the target.

The measured delay, and hence the associated bi-static range represented by the timing, is inherently ambiguous because of the relatively high PRF required to ensure that Doppler (and hence velocity) can be determined unambiguously, and because of the relatively large geographic area that the radar cell 1112 covers. This can result, for a given target, in several possible bi-static range aliases (which can be visualised as a plurality of confocal ellipses of different sizes). In FIG. 13 this ambiguity of the range measurements is illustrated as a plurality of possible range 'spans' each including the actual observation of a target at the true bi-static range or an alias of it. For most of the cell coverage, however, the angular measurements (azimuth and/or elevation) can be used to eliminate aliases to arrive at a true measure of the position, P11, of the target.

Depending on the configuration of the radar transmitter/receiver and the cell size and shape, it is possible that a target may occasionally be in a position in which positional ambiguity still exists, or in which true position cannot be determined with sufficient precision, using a single radar receiver RX1, RX2, alone. Beneficially, however, in such 'pathological' cases the positional measurements provided by the other radar receiver RX1, RX2, can be used to resolve any remaining positional ambiguity and/or to refine the positional measurements thereby allowing the target to be positioned accurately using trilateration. Even where positional information can be determined to a required level of precision using a single radar receiver RX1, RX2, alone, the positional measurements provided by the other radar receiver RX1, RX2, can be used, advantageously, to refine the positional measurements further to provide improved precision and/or to provide a fall-back check of positional accuracy.

It will be appreciated that the respective angular (azimuth and elevation) information derived by the different radar receivers can also be used to identify a positional measurement for a target, relatively precisely, without the need for range measurements, because the geometry of the radar cell is known.

Moreover, in some exceptional cases of high symmetry, for example when a target located exactly in the centre of the radar cell 1112, travelling due South (as shown for target T2 at position $P_{21}$), the transmitter pulses will overlap in range.

In the case of T2 at $P_{21}$, for example, all the bi-static ranges will be the same, and Doppler for RX1→TX1 and RX2→TX2 will be zero. It might appear that such, exceptional, situations will cause interference making it more difficult for the radar receivers RX1, RX2 to resolve the signals and determine the required positional/movement information. Even in such exceptional cases, however, whilst the transmitter pulses will overlap in range, the different Doppler effects exhibited by the pulses received at each receiver (RX1←TX1(zero) compared to RX1←TX2 (approaching) and RX2←TX2 (zero) compared to RX2←TX1(receding)) can be used resolve them from one another.

As seen in FIG. 13, therefore, for a particular target T1, T2 there are four possible measurements of bi-static range within a given range span (two for each receiver) and four possible measurements of range rate (two measurements for each receiver—one for each perpendicular component of the velocity vector).

In summary of the measurements for each target are illustrated, for clarity, in Tables 1 and 2 below.

TABLE 1

Target T1
(heading SSW, top-left of cell)

| RX | TX | Range | Range Rate | Azimuth | Elevation |
|---|---|---|---|---|---|
| RX1 | TX1 | $R_{RX1,TX1\,(T1)}$ | $\dot{R}_{RX1,TX1(T1)} \to$ approaching | $\alpha_{RX1(T1)}$ | $\varepsilon_{RX1(T1)}$ |
|  | TX2 | $R2_{RX2,\,TX2\,(T1)}$ | $\dot{R}_{RX1,TX2(T1)} \to$ approaching |  |  |
| RX2 | TX1 | $R_{RX1,TX1\,(T1)}$ | $\dot{R}_{RX2,TX1(T1)} \to$ receding | $\alpha_{RX2(T1)}$ | $\varepsilon_{RX2(T1)}$ |
|  | TX2 | $R2_{RX2,\,TX2\,(T1)}$ | $\dot{R}_{RX2,TX2(T1)} \to$ receding |  |  |

TABLE 2

Target T2
(heading S, centre of cell)

| RX | TX | Range | Range Rate | Azimuth | Elevation |
|---|---|---|---|---|---|
| RX1 | TX1 | $R_{RX1,TX1\,(T2)}$ | $\dot{R}_{RX1,TX1\,(T1)} \to$ zero | $\alpha_{RX1(T1)}$ | $\varepsilon_{RX1(T1)}$ |
|  | TX2 | $=R_{RX1,TX2\,(T2)}$ | $\dot{R}_{RX1,TX2(T1)} \to$ approaching |  |  |
| RX2 | TX1 | $=R_{RX2,\,TX1\,(T2)}$, | $\dot{R}_{RX2,TX1(T1)} \to$ receding | $\alpha_{RX2(T2)} =$ | $\varepsilon_{RX1(T2)} =$ |
|  | TX2 | $=R2_{RX2,\,TX2\,(T2)}$ | $\dot{R}_{RX2,TX2(T1)} \to$ zero | $\alpha_{RX1(T2)+180°}$ | $\varepsilon_{RX2(T2)}$ |

Doppler spectra and histories are evaluated for each target, and the targets are classified—for example as aircraft, helicopter or wind turbine.

Reports are compiled for each reportable target, and in this case the wind turbines are discarded.

Radar Receiver

A radar receiver suitable for use in a radar cell will now be described in more detail, by way of example only, with reference to FIGS. 14(a) and 14(b).

In summary, each radar receiver consists of a receiving array and associated computing and communications equipment. The array consists of a number of rows and columns of radio-frequency receiving elements arranged, in this example, for L band functionality. These together continuously acquire coherent signals scattered from targets and clutter within the field of view, which are passed in digital form to a Sensor Data Processor. Generally, the receiving array is arranged to point upwardly (e.g. at approximately 45 degrees).

FIG. 14(a) illustrates a radar receiver generally at 1400. The radar receiver 1400 comprises a receiving array comprising a plurality of receiving sub-arrays 1422. Each sub-array 1422 comprises a plurality of receiving elements 1424 configured over an area. Each element 1424 and sub-array 1422 of the receiving array is arranged to receive signals returned from substantially the whole of the illuminated volume, each element 1424 and/or sub-array 1422 essentially forming a signal channel.

Each receiver sub-array 1422, in the exemplary receiver 1400, is ten receiving elements 1424 high by two wide arranged to have substantially the same aperture size as the transmitter array. The sub-arrays are arranged in a grid which is two sub-arrays high by eighty wide.

As seen in FIG. 14(b) the elements of the sub-arrays 1422 are also configured to form further, overlapping sub-arrays 1422', 1422" (or 'virtual' sub-arrays) as illustrated in simplified array of sub-arrays (two high by three wide).

The elements of vertically adjacent sub-arrays are configured to form vertically overlapping sub-arrays 1422'. Specifically, the lower five elements in each of the two columns forming each upper sub-array, and the upper five elements in each of the two columns forming each lower sub-array, form a vertically overlapping sub-array 1422' which shares some receiving elements with both the associated upper and lower sub-arrays.

The elements of horizontally adjacent sub-arrays are similarly configured to form horizontally overlapping sub-arrays 1422". Specifically, for each pair of horizontally adjacent sub-arrays, the elements of the rightmost column of the left sub-array, and the elements of the leftmost column of the right sub-array, form a horizontally overlapping sub-array 1422" which shares some receiving elements with both the sub-arrays of the associated horizontally adjacent pair.

In the case of the receiver array shown, therefore, the receiving elements 1424 and sub-arrays 1422 are arranged in a spaced relationship, facing substantially the same direction, to form an overall aperture comprising eighty-two non-coincident, but overlapping sub-apertures in width and three non-coincident, but overlapping sub-apertures in height.

It will be appreciated that although specific array and sub-array dimensions are described, any appropriate arrangement of sub-arrays and receiving/transmitting elements may be used depending on the requirements of the application for which they are used. This includes, for example, arrangements having different sub-aperture overlaps (or no overlaps), different aperture dimensions, arrays which are wider than they are tall etc.

Whilst the receiving array (and sub-arrays 1422) shown are planar, it will be appreciated that they may be conformal to some other known shape. The arrays or sub-arrays may for example be non-coplanar. The arrays may, for example, be formed on the angled faces of a pyramidal structure, or on a curved, concave or convex structure.

The radar receiver 1400 comprises a signal processing module 1440 (such as a computer processor or the like) configured such that signals which are coherent with the transmitted signal may be introduced and used to determine the amplitude, frequency, delay and phase of all signals received at each element or sub-array. The processor module is also configured for the formation of multiple beams digitally by combination of different signal channels with suitable amplitude and phase weightings. The processing module 1440 is configured for performing the signal processing tasks required by the application for which the radar receiver is to be used, for example, beamforming, range gating, Doppler processing, low threshold detection, target tracking (e.g. XYZ, Vxyz, A/Phi(m, n, t)), imaging and/or classification.

The arrangement of sub-arrays 1422 and receiving elements 1424 allows multiple (overlapping) beams to be formed (e.g. one for each of the different sub-arrays 1422), digitally by the processor, which have substantially the same look direction, thereby permitting monopulse sub-beam angular measurement. The use of a plurality of sub-arrays 1422 permits greater measurement accuracy than phase monopulse angular measurement using, for example, a single array of closely spaced receiver elements.

It will be appreciated that although phase monopulse angular measurement is described, the receiver elements and/or receiver sub-arrays may be arranged to allow amplitude monopulse angular measurement.

It will be further appreciated that a plurality of sub-arrays may also be arranged having different look directions, effectively creating a plurality of separate apertures/sub-apertures. The sub-arrays may be arranged, for example, to provide a wider (for example 360°) coverage. Similarly, the sub-arrays may be arranged to look at a known man made or other obstacle from (slightly) different locations thereby allowing targets which would otherwise be obscured by the obstacle to be resolved with greater accuracy. If, for example, the radar receiver is located at a wind farm the receiver sub-arrays may be arranged to 'look around' turbines which otherwise obscure part of their individual fields of view.

Thus, whilst beamforming on transmission is a process with a single, physically-exclusive outcome, on reception as many beams can be formed as the configuration of the receiver array and the available processing resources can support. Hence, whereas transmission beams must be directed sequentially, receiving beams may be formed simultaneously.

In this way the signals from all targets are fully sampled, information loss is minimised, and Doppler alias effects are avoided, resulting in the ability to: perform precision tracking and coherent tracking; reconstruct imagery; characterize behaviour; classify targets etc. Tracked targets are represented in computer memory not only in terms of XYZ and Vxyz as a function of time, but also in terms of the Doppler phase and amplitude history of the target.

Signals received by the subarrays may simultaneously be combined in a first data stream such that the amplitude and phase weightings provide a null in the direction of the land or sea surface, to reject surface targets, and in a second data stream such that the amplitude and phase weightings provide a null in the direction of raised objects such as wind turbines, allowing the observation of surface targets and rejection of turbines or aircraft. Separate filtering and tracking algorithms can then be applied to the two or more data streams.

The received return signals effectively represent observations (which may or may not represent a target of interest) made by the radar receiver in each of a plurality of signal channels. In the radar receiver, data extracted by the processor for each observation is stored in process 'pixels'. Each pixel may be considered to be a unique set of numbers representing, for example, a single combination of time, range, range rate and/or Doppler frequency, and at least one of beam number, sub-array number, and/or element number.

The pixel content comprises a list of numbers representing, for example, a series of amplitudes, phases and/or frequencies representing the characteristics of the associated observation, which may constitute a target, an item of clutter, or a 'null', whose behaviour may be deemed insignificant. Observations are deemed significant until they are reliably known to be insignificant and a history of the information (e.g. phase histories, amplitude histories, or the like) extracted from the observations is retained. This approach contrasts with the process of thresholding in which observations are deemed insignificant and discarded, without further processing, unless a particular parameter (or set of parameters) meets an associated threshold (or set of thresholds).

In a cluttered environment typified by a wind farm, therefore, the radar receiver functions to form the best tracks possible for all or a large range of targets, based on amplitude and phase histories, and to discriminate between significant and insignificant targets (or targets representing one class or another) at the end of the analysis rather than at the beginning. Coherent analytical processes can be applied to enhance or minimize targets of different types, since all signal information is retained within the signal and target memories.

Thus, the configuration of the radar receiver is such that it is capable of accommodating and discriminating targets and clutter in a densely populated environment.

The receiver channels are processed and digitally converted separately, and after pre-filtering provide a high channel dynamic range of over 95 dB and a beam/Doppler dynamic range of over 140 dB. Deep RF filtering reduces susceptibility to interference or jamming.

The receiver is subject to regular automatic self-calibration, providing excellent angular accuracy and performance monitoring.

The receiver obtains target information in greater depth than a sequentially-scanning Primary Surveillance Radar. For each target it generates range, azimuth, elevation, and Doppler spectra at approximately 4 Hz. The output can be adapted to existing surveillance processing and display systems that require a slower rate.

It will be appreciated that the configuration (size, spacing and number) of the elements in the receiver array and/or any sub-arrays may be changed in dependence on requirement.

Radar Transmitter

A radar transmitter suitable for use in a radar cell will now be described in more detail, by way of example only, with reference to FIG. 15.

In summary the radar transmitter illuminates the same volume of airspace as is observed by the sensor, with a pulse modulated waveform and a precisely-defined spectrum. Like the receiver, the transmitter is also generally arranged pointing upwardly (e.g. at approximately 45 degrees).

In operation, the transmitter emits a continuous (or quasi-continuous) signal, centred at the required frequency, and modulated to occupy the minimum bandwidth (typically a single 2 MHz band) to support range resolution requirements. The bandwidth, in this example, is based on a range resolution requirement of approximately 150 m which has the potential to deliver positional accuracy of better than 50 metres.

Figure 15:
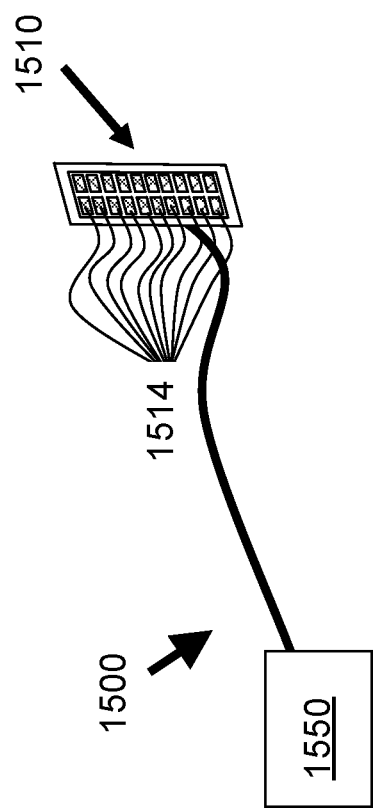
FIG. 15 illustrates, in simplified form, a radar transmitter suitable for use in a cell of the radar network of FIG. 10 or in the radar system of FIG. 1.

As seen in FIG. 15, the transmitter comprises at least one array 1510 of transmitting elements 1514 configured to illuminate a whole volume of interest simultaneously, with a coherent signal modulated appropriately (for example as a regular sequence of pulses) to permit range resolution. It will be appreciated that although an array of elements is described the transmitter may comprise a single transmitting element.

As seen in FIG. 15 the transmitter array, in this example, is ten transmitting elements 1514 high by two wide and therefore comprises fewer elements than the receiver array and has a substantially smaller total aperture.

The radar transmitter is provided with a control module 1550 configured for controlling the signals transmitted via the transmitter array 1510 in dependence on the requirements of the radar cell for which the radar transmitter is to be used.

It will be appreciated that the configuration (size, spacing and number) of the elements in the transmitter array may be changed in dependence on requirement. In some situations a single transmitter element may be sufficient.

Benefits

In its essence, the cellular approach provides for an array of transmitting and receiving holographic elements, positioned for broad surveillance coverage. This can be described as an active multi-static holographic radar array or 'Polygraphic Radar Network' (or 'PGRN'). The cellular approach allows an incremental roll-out, integrated with other surveillance radar sensors, and leading to a single integrated radar network over time.

It can be seen, therefore, that the proposed arrangement provides the ability to determine the target's position and motion with great accuracy in 3 dimensions. It exploits the joint coverage provided by the different sensor and transmitter pairs, which greatly adds to the capability of any single sensor.

The combination of transmitter/receiver pairs described above allows the target to be positioned using combinations of angular and distance measurements. The arrangement also provides 'redundant' position and movement measurements that can be used to improve the precision of the positioning and/or velocity vector measurements.

Whilst it might appear that there is a risk that the different transmitters will set up a deep interference pattern that will make detection unpredictable or ineffective in certain locations (e.g. in situations of extreme symmetry), a target's response will contain separate Doppler components for each transmitter which allow the different signals to be resolved and meaningful material obtained. Moreover, the scattering of each pulse from one transmitter, at the target, will be independent of the scattering of each pulse from the other transmitter (because the scattering emanates from a different point of the target's structure). The precision Doppler process will therefore allow separation of the components, and the bi-static ranges will also generally differ for the two transmissions.

In addition to reduced spectrum occupancy, there are several additional benefits of the cellular approach, including:

The ability to operate transmitters continuously without desensitising the receivers. Continuous transmission of a waveform with a suitable bandwidth minimizes peak transmission power requirements. The intensity of direct reception from transmitter to receiver is reduced and brought within the receiver's dynamic range because of the bi-static separation and because of opportunities to screen transmitters from receivers and to null out received signals in the transmitter direction. In a monostatic radar this is not normally practicable. Modulated CW signals are used that can be compressed in duration by suitable FIR filters.

Exploitation of large baselines, providing angular accuracy

The quantity and precision of data acquired for each target (leading to precision, target classification, and the potential for reduced aircraft separation)

Smoothing of detection probabilities and measurement accuracy over the broad area within the cell Different transmitters and receivers will observe the target from different directions, thus reducing the likelihood of drop-outs in detection.

As emphasised above, the radar receivers acquire all the signals (within their operating frequency range) scattered by targets within a persistently-illuminated, 3-dimensional field of view of a static transmitter and do not, therefore, observe a narrowly-defined direction but instead form many beams over the volume, and therefore the receiver beneficially does not 'lose sight' of targets but instead has an indefinite time-on-target (while the target is in view). This maximises the opportunity to distinguish targets' behaviour.

The acquisition of precise, extended signal histories from each target, allows optimal target detection, classification and tracking in a 3-dimensional airspace.

Whilst multi-static radar can, potentially, operate passively using transmissions from third-party sources (and this can appear attractive since it effectively provides an additional function without, in principle, requiring the occupation of any additional radio spectrum) the cellular network described uses an active system with dedicated radio transmitters. The use of an 'active transmission' approach in which dedicated radio transmitters are used is advantageous because it allows the actual waveform, spectrum and beam patterns to be designed explicitly to meet the surveillance requirement. Moreover, it allows the derivation of accurate Doppler transforms using the received signals to be greatly simplified because the transmitted waveform is precise, fully coherent and tightly controlled in that respect. Further, third-party sources controlling transmissions of opportunity will be beyond the direct control of the Air Navigation Service Provider (ANSP), and therefore will require extensive planning, agreements and precautionary measures to provide assurance. The active transmission approach avoids such complexities by using signals that are under the control of the ANSP, but using a minimum bandwidth that remains available and affordable.

The network cells can be configured to support the provision of Air Traffic Services both inside and outside controlled airspace, to detect intruders and infringements into controlled airspace, including, due to its 3-dimensional capability, infringement from lower levels than previously possible without significant additional complexity.

The combined cell operating band offers a functional benefit in that the extended baselines can be exploited in the coherent target processing. Positioning is ultimately based on multilateration. In each cell, each single target will be represented in the processing space by more than one detection; this requires additional computational power to resolve multiple targets within the cell; however the long baselines this provides allows high 3D positional precision, while the high coherence supports 3D vector plots (that is, position and instantaneous velocity).

The network has the potential to provide positional accuracy in the region of 50 m rms or less, in addition to the direct measurement of direction and speed of travel. Elevation measurement accuracy will be similar at higher altitudes. This level of accuracy beneficially supports the maintenance of minimum separation standards between aircraft, and has the potential to support greater exploitation of vertical separation.

As regards aviation safety, the radar cell architecture offers a fundamentally robust approach to surveillance, as part of the Safety Management System, and one that will support appropriate safety casing. The radar receivers provide redundancy, both by redundant cover of the airspace, and by means of explicit redundancy provisions within the radar equipment. A high level of redundancy is also provided at the level of receiver channels, internal communications, timing and waveform control, processing hardware, radar transmission and data transmission.

The cellular radar network's use of radar technology which 'stares' persistently into a persistently illuminated volume allows significant clutter mitigation, especially that caused by moving wind turbines, although other forms of clutter can also be greatly attenuated because of their combination of position and motion or other behaviour. Such clutter includes clutter caused by road vehicles, clouds and weather, etc. Static clutter may also be eliminated via these processes.

The use of transmitter signals around the network as a source of synchronisation has the potential to allow a very low level of drift and jitter around the system.

Further Features

Enhanced/Alternative Disambiguation

Whilst one technique for the resolution of delay related bi-static range ambiguity, based on angular (azimuth/elevation) measurements, has been described above, it will be appreciated that such ambiguity resolution may be enhanced or replaced by use of appropriate transmitter encoding (e.g. phase and/or chirp encoding).

Specifically, using both Doppler and 'envelope' range rates determined in the course of one or more sample frames, a degree of range ambiguity can be resolved by means of pulse coding and range/Doppler processing. By the same method, and with appropriate pulse to pulse phase coding, both range and Doppler ambiguities can be resolved at the same time. The phase coding applied in this example is applied between pulses, rather than within a pulse, and is thus very different to 'phase coding' as applied in pulse compression techniques.

Examples of phase encoding are illustrated in FIGS. 16(a) and 16(b) in which the transmitter imparts a known coding sequence of phase shifts to the radio signals in the transmitter pulses.

The phase shift has the effect of modifying the Doppler shift measured by the receiver (and hence the implied range rate measurements) by a significant but known amount. The receiver can determine an estimate of actual range rate for a target based on consecutive delay measurements and is therefore able to identify for which of a selection of possible ambiguous ranges the modulated Doppler shift is consistent with that range rate estimate.

The minimum phase coding for a sequence of pulses involves transmitting two pulses at the same phase, separated by a Pulse Repetition Interval ('PRI'—equal to the reciprocal of the PRF), followed by two successive pulses of inverted phase, also exactly at the PRI.

An example of this is shown in FIG. 16(a) which shows a simple coding sequence of two pulses with no phase shift followed by two pulses with a 180° (pi radians) shift which is repeated indefinitely.

Accordingly, a target detected at a range between once and twice the unambiguous range, and with a Doppler shift of $F_{dop}$ will appear to have acquired an additional Doppler shift equal to the positive or negative Nyquist frequency (PRF/2).

Thus, by computing the target's radial range rate from the change in measured range in successive, effectively continuous, data frames or subframes, rather than from the Doppler value, the choice between $V_r$ and $V_r+/-PRF/2$ can be made unambiguously.

Similarly, a true range rate above the unambiguous limit of $V_{rmax}=[c\times PRF/(4\times F_{op})]$ will appear at an apparent Doppler frequency of $F_{dop}+/-PRF$ (note that this is different from the error occurring from range ambiguity).

Further, using a similar method, a target having both ambiguous range ($R_{max}<R>2\times R_{max}$) and ambiguous Doppler ($F_{dop}>PRF/2$) will appear at $V_r+/-PRF$, $+/-PRF/2$. Thus, for effectively continuous target signal information, the correct values of R and $V_r$ can be computed based on data from successive frames or subframes, either with direct range comparisons or by cross-correlation of the pulse envelopes.

Longer and more complex pulse code sequences may also be used that are capable of extending the capability for range disambiguation. These involve phase code sequences based on successive phase shifts of 90 degrees or 45 degrees, with sequences of 8, 16, or more pulses. Whilst this requires finer distinction between true and ambiguous ranges and Doppler frequencies, the available precision of Doppler values will be sufficient to meet this requirement.

For example, in FIG. 16(b) a more complex coding sequence is illustrated in which the successive phase shifts increase by 90 degrees ($\pi/2$ radians).

The coding sequence of FIG. 16(a) is particularly effective because it only relies on the receiver being able to determine the direction of movement of the target (the 180° phase shift will effectively invert the modulated range rate). However, due to its frequent repetition, the simple coding scheme does not provide as wide a range of unambiguous coverage as the more complex coding scheme of FIG. 16(b).

FIG. 16(c) shows a range/range-rate surface that illustrates the effect of the phase coding of FIG. 16(b) on Doppler measured range rate for target T1 in FIG. 11. In this example, T1 is assumed to be in the second bi-static range span for radar return signals originating from transmitter TX2 and hence returns from TX1 are not represented for clarity. As seen in FIG. 16(c). Target T1, relative to RX1 is approaching the RX1, TX1 line and therefore has a true range rate value that is approaching as illustrated by the point $D_{RX1,TX2(T1)}$. However, because the target is in the second range span, as a result of the phase coding the Doppler, the target appears to be receding at $D'_{RX1,TX2(T1)}$. Similarly, Target T2, relative to RX2 is receding from the RX2, TX1 line and therefore has a true range rate value that is receding as illustrated by the point $D_{RX2,TX2(T1)}$. However, because the target is in the second range span, as a result of the phase coding the Doppler, the target appears to be approaching at $D'_{RX2,TX2(T1)}$.

Nevertheless, because an estimated value of range rate can be determined by reference to successive range measurements it is relatively straightforward to use this to determine whether the phase coding has resulted in this pre-determined shift in Doppler frequency and consequently resolve which range span the target is actually in and what the exact Doppler value is by compensating for the known phase coding.

Continuous Coherent Radar Network: Target Reconciliation and Trilateration

In prior art scanning surveillance radar systems, a target illuminated by one scanning radar could appear as false targets to another radar that operates using the same frequency.

Contrastingly, in the radar network 1010, the separate transmitters TX1, TX2 and receivers RX1, RX2 in the radar network 1010 are static, persistently illuminate a desired volume with a series of pulses, and operate on the same frequency and coherently. The transmitters TX1, TX2 can operate either with substantially zero, or fixed phase or delay shifting between them (and/or other members of the network). The transmitters TX1, TX2 can also operate with small or slow intentional phase or delay modulation between them to aid in identification of radar return signals processed by the different transmitter/receiver pairs (for example, RX1-TX1, RX1-TX2, RX2-TX1, RX2-TX2).

Regardless of whether the transmitters operate with a phase delay between them or not, the returns received at each of the receivers RX1, RX2, from each of the different transmitters TX1, TX2, can, advantageously, be reconciled without false targets causing an issue.

Specifically, because the transmission timing of each transmitter TX1, TX2 and its respective location relative each receiver RX1, RX2, is known (at the processor of the receiver and/or at a central processing capability), valuable target information can be acquired for each pairing of transmitters TX1, TX2 and receivers RX1, RX2 that are not possible in more conventional systems. For example, apparent ambiguities arising from the fact that radar returns originating from one transmitter TX1 appear, on receipt, to be substantially identical to those from another transmitter, TX2 (by virtue of the common frequency use by different network elements) can be resolved by virtue of the redundant information available in the Range/Azimuth/Elevation/Doppler space. In one exemplary system, this is beneficially achieved by computing apparent target positions based on the known azimuth and elevation angles for each receiver, and the known transmitter locations and timing.

The radar returns from any single target will be received at a particular receiver at the same azimuth and elevation directions regardless of the transmitter TX1, TX2 from which the signals originated. Thus, only detections arising from returns received at the same angle should require reconciliation. Once a target is detected, its position with respect to a first receiver/transmitter pair, comprising the known receiver RX1, RX2 of the returns from that target and a selected transmitter TX1, TX2 (which may be selected arbitrarily) is hypothesised. This hypothetical position can be determined from the azimuth and elevation angle for that detection in combination with the relative location of the receiver and transmitter of that receiver/transmitter pair. For a cell 1012 containing two transmitters TX1, TX2 (e.g. as illustrated in FIG. 11), this detection will be accompanied by a second detection, originating from the other of the two transmitters TX1, TX2, for the same receiver RX1, RX2. If the first positional hypothesis is correct (because the correct transmitter was selected), then the second detection will have an associated hypothetical position that is consistent with the known location and synchronisation of the second transmitter, and the hypothesised position within the radar cell 1012 of the target causing the second detection, will be the same as for the first detection. If the hypothetical positions are found to be consistent, then the position of the target can be refined by combining the associated pair of bistatic range measurements in a form of bistatic trilateration which, at longer bistatic ranges, can be more accurate than measurement based on angular measurement by the receiver.

If, on the other hand, the two hypothetical position measurements are not mutually consistent, then the initial (possibly arbitrary) transmitter assignment is reversed, and positions recalculated and then refined if necessary.

Figure 17B:
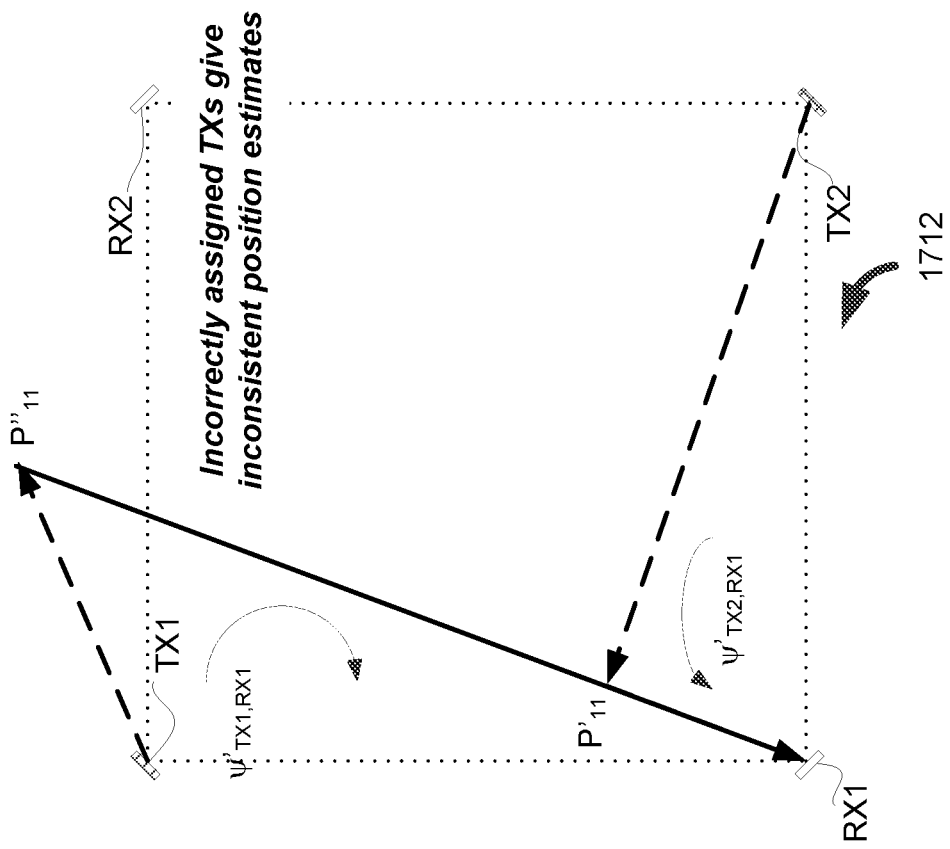
FIGS. 17(a) and 17(b) illustrate, in simplified form, reconciliation of detections from different transmitters in the radar cell of FIG. 11 or in the radar system of FIG. 1.
Figure 17A:
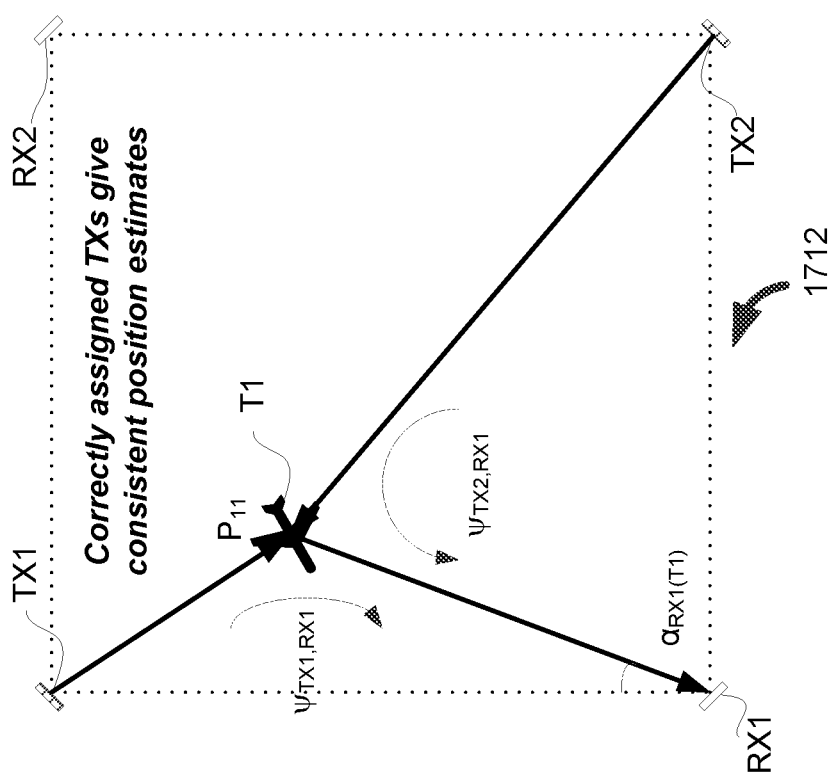
Figure 18:
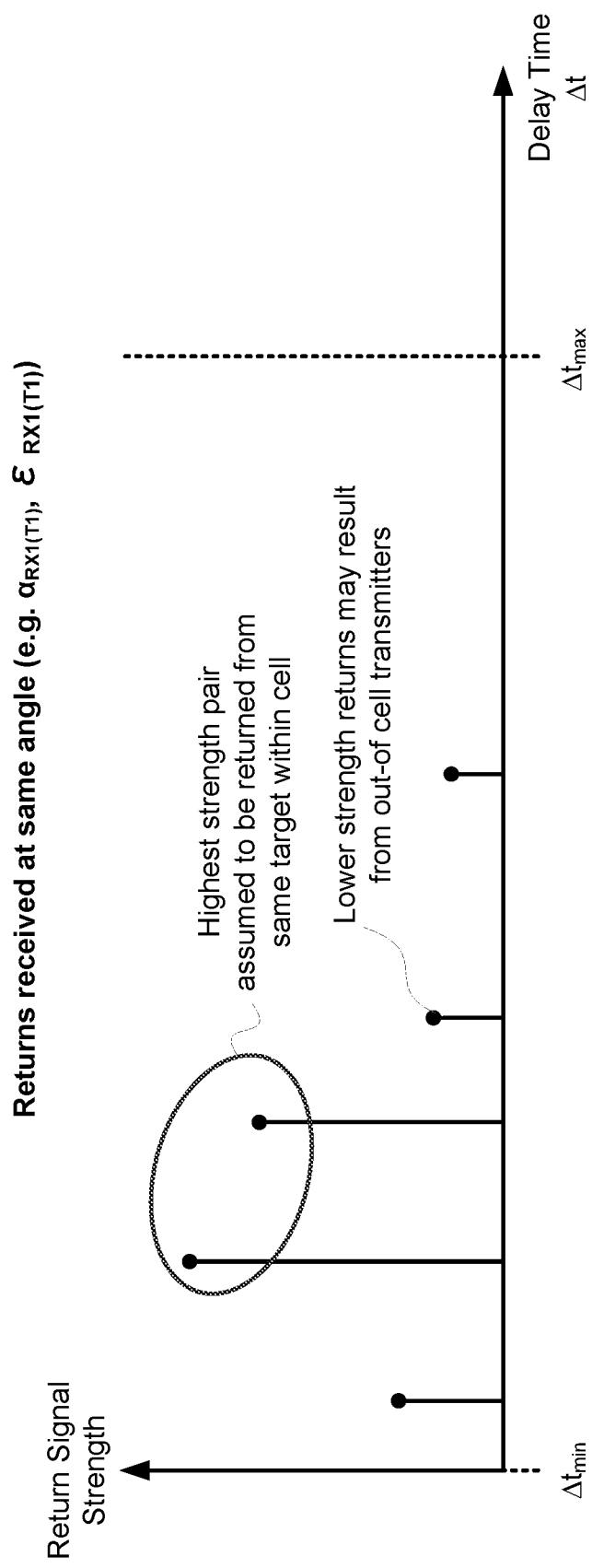
FIG. 18 illustrates, in simplified form, selection of return signals for reconciliation as illustrated in FIGS. 17(a) and 17(b)
Figure 19:
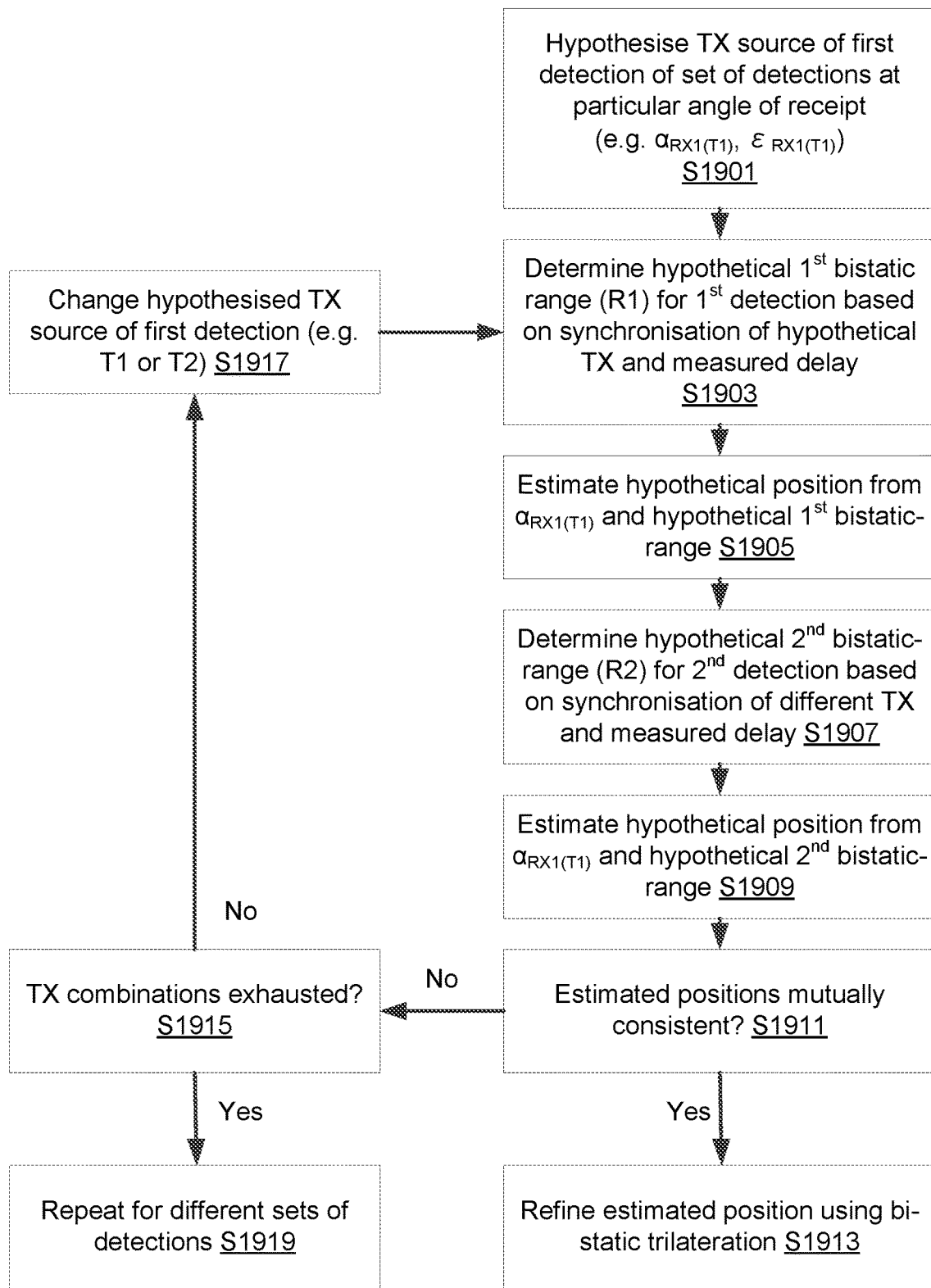
FIG. 19 illustrates, in simplified form, a flow chart illustrating a process for reconciliation of detections from different transmitters as illustrated in FIGS. 17(a) and 17(b)

FIGS. 17 to 19 illustrate the process of detection reconciliation, in more detail, with reference to a radar cell 1712 similar to that shown in FIG. 11.

FIG. 17(*a*) illustrates a radar cell 1712 in which radar returns originating from each transmitter TX1, TX2 are reflected from target T1, via respective paths $\psi_{TX1,\ RX1}$ and $\psi_{TX2,\ RX1}$ and received at receiver RX1. The return signals are received at an azimuth angle $\alpha_{RX1(T1)}$ relative to a straight line between transmitter TX1 and receiver RX1 and at an elevation angle $\varepsilon_{RX1(T1)}$ relative to the plane of the radar cell 1712.

When the target T1 is detected and the correct transmitters are selected for each detection, then the position derived from the known azimuth and elevation angles for the receiver RX1, and the known transmitter locations and timing are consistent with one another and, hence, the position $P_{11}$ of the detected target.

FIG. 17(*b*) illustrates the radar cell 1712 of FIG. 17(*b*) in the case where the different detections are associated incorrectly with the wrong transmitters TX1, TX2. As seen in FIG. 17(*b*), in this situation, the respective hypothetical positions of the target $P'_{11}$, $P''_{11}$, derived for each detection from the known azimuth and elevation angles for the receiver, and the known transmitter locations and timing, are inconsistent with one another, with the boundary of the cell 1712 and, hence, with the actual target position. Thus, it is relatively straightforward to dismiss such positions as being erroneous.

FIG. 18 illustrates the selection of detections for reconciliation. As seen in FIG. 18, when the radar cell 1712 forms part of a wider radar network, radar returns may be received from the same target, at the same azimuth and elevation, that originate from transmitters of other radar cells. Accordingly, there may be detections arising from radar return signals originating both from within the radar cell 1712 and detections arising from radar return signals originating from outside the boundaries of the radar cell 1712 In this case, the return signals originating from transmitters TX1, TX2 of the radar cell 1712 associated with the receiver RX1 that receives the signals will generally be the highest strength signals and thus, the set of detections associated with the highest power return signals can be selected for reconciliation. If the respective hypothetical positions associated with each detection arising from the highest magnitude return signals cannot be reconciled for either transmitter TX1, TX2, then, because the raw data is retained, reconciliation can be attempted with other combinations of detections.

FIG. 19 is a flow chart illustrating, by way of example only, one method by which detections from different transmitter sources TX1, TX2 can be reconciled.

Initially, when a set of radar return signals are all received at a particular receiver RX1 from a common azimuth and elevation angle, and an associated target is detected, where each return is a respective detection associated with radar signals originating from each transmitter TX1, TX2 in the radar cell 1712 and possibly a number of other detections associated with radar return signals arising outside the radar cell 1712. A set of detections (typically one for each transmitter) are selected (for example those associated with the highest power return signals as described above). A respective transmitter source associated with each of the detections is then hypothesised at S1901.

A first hypothetical bi-static range R1 is then determined, at S1903, for a first of the detections based on the known synchronisation of the hypothetical transmitter source associated with that detection and the delay, relative to their hypothetical transmission time, at which the radar return signals for that detection are received. From this, and the known azimuth and elevation angles of the detection, a first hypothetical position of the detected target can be estimated at S1905.

A second hypothetical bi-static range R2 is then determined, at S1907, for a second of the detections based on the known synchronisation of the hypothetical transmitter source associated with that detection and the delay, relative to their hypothetical transmission time, at which the radar return signals for that detection are received. From this, and the known azimuth and elevation angles of the detection, a second hypothetical position of the detected target can be estimated at S1909.

If, at S1911, the first and second hypothetical positions are consistent with one another (e.g. they place the detected target at a substantially identical position within a predetermined margin of error) then they the detections are presumed to be associated with the correct transmitters and the position estimate is refined at S1913 (e.g. using trilateration).

If, at S1911, the first and second hypothetical positions are not consistent with one another then they the detections are presumed to be associated with incorrect transmitters and, if another transmitter combination is still possible at S1915, the reconciliation process repeats for another transmitter combination.

The procedure repeats until either all possible transmitter combinations have been exhausted without success at S1915, or the correct transmitter combination has been found. It will be appreciated that, whilst there are only two possible combinations in this example, there may be more possible combinations where there are more than two transmission sources from which the detections could have arisen.

If all possible transmitter combinations have been exhausted without success at S1915 then reconciliation can be attempted with a different set of detections (e.g. including one or more detections associated with lower power radar return signals than those used for the previous reconciliation attempt). Reporting of the target is then made subject to appropriate contingency rules that may allow a delay while additional resolving information is acquired, a tracker-based decision, or an operator exception.

This approach can provide significant benefits in terms of a very substantial reduction in the bandwidth requirements for the whole surveillance system, as described above. It also results in improved positional measurements by trilateration, and in diverse Doppler measurements that can: reduce or mask the effects of target fading that occurs for each signal path but that will not be directly correlated between signal paths thereby improving probability and continuity of detection; and contribute to the system's ability to form coherent images of the target.

Such consistency checking can be extended to multiple (greater than two) transmitters, with an associated increase in computing burden, but added positional certainty and fading-resistance for the resolved results.

In this way, therefore, multiple simultaneous detections can be used in the sense of additional supporting information for each target, rather than treated in terms of interference.

Target Centric Acquisition and Processing (TCAP)

Current surveillance radar technology is generally dominated by either mechanically or electronically-scanned receiver arrays. Thus the 'time-on-target' is strictly limited by the scanning process. In the case of mechanical scanning time-on-target is determined by the width of the receiver beam and the rate at which the receiver array is rotated. In the case of electronic scanning, the 'time-on-target' is effectively determined by a software-defined resource management system which interleaves tracking functions with surveillance scanning. Thus, in electronically scanned systems, surveillance and continuity are compromised by tracking.

As described above, each radar cell of the radar network is designed so that it acquires effectively continuous target signals, without a limit constrained by the radar system's scan process or imposed by a resource management system. This allows raw radar return data (and processed or partially processed return data) to be retained, uninterrupted, and reused following initial detection and subsequent analysis of a target.

Beneficially, this allows the duration of the processing interval during which return signals from a target are continuously processed (the effective 'time-on-target') to be set arbitrarily and extended, indefinitely (until a target disappears), to support more detailed target analysis.

Thus, the duration of the effective processing interval used for making an initial detection may be set based on a specified speed of acquisition and then another, different, duration processing interval used, post detection, for more detailed analysis of a detected target, for example based on a detected target characteristic (e.g. a motion characteristic) or classification. For example, a relatively short initial processing interval may be used, and then, following detection, the processing interval may, in effect, be extended to allow for more detailed target analysis.

The longer the processing interval the greater the 'processing gain' in terms of signal-to-noise ratio and the higher the resolution of frequency domain processing. Thus, TCAP can provide significant improvements in the signal-to-noise ratio and/or provide higher resolution in the frequency domain depending on requirements.

Moreover, frequency domain processing is directly related to the motion of the target, whose measurement is therefore further enhanced by extending the processing interval to increase the period of signal continuity and exploiting the resulting improvements in frequency domain resolution.

Figure 20:
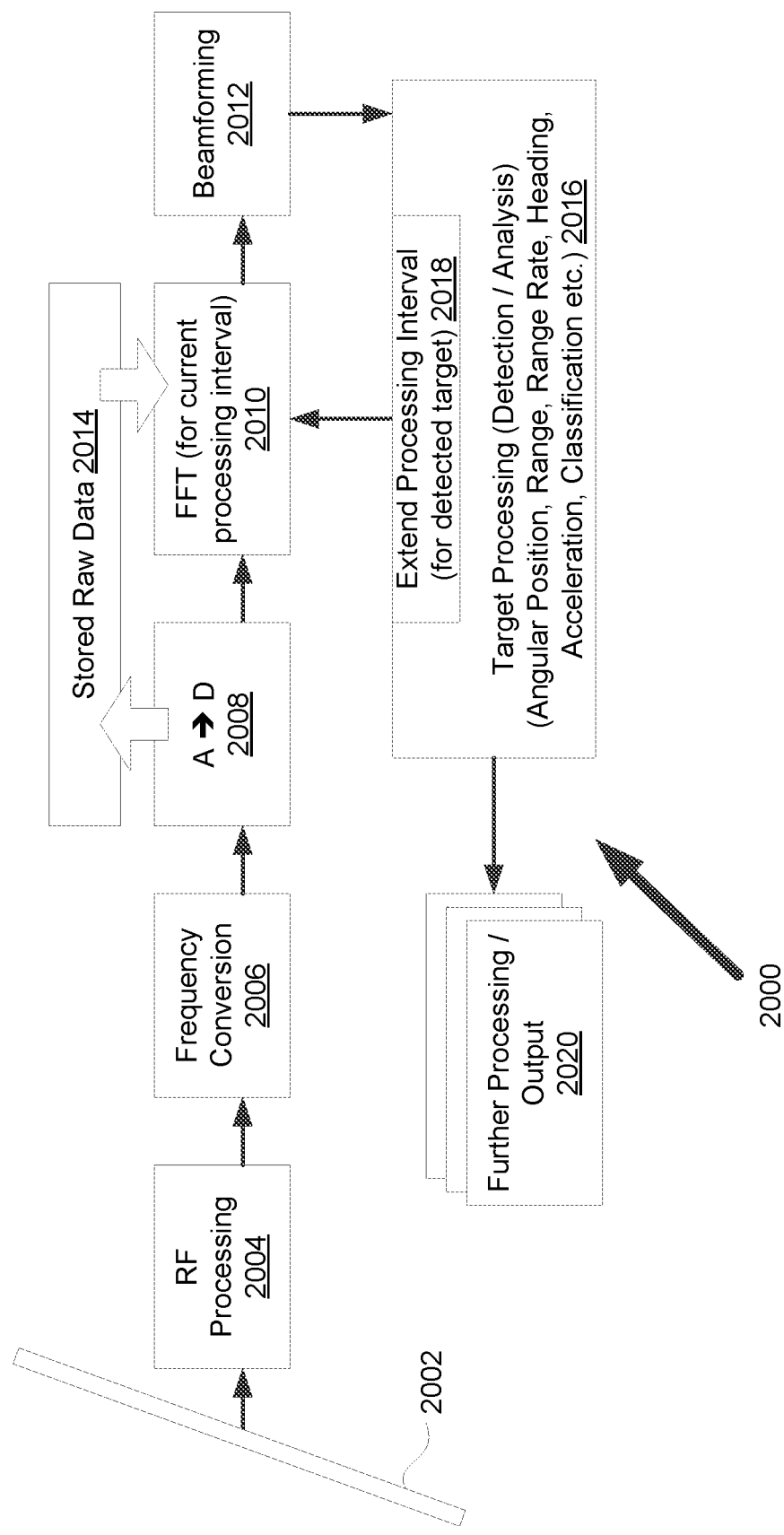
FIG. 20 is a simplified functional block diagram of an exemplary radar receiver suitable for use in a cell of the radar network of FIG. 10 or in the radar system of FIG. 1.

In FIG. 20 a simplified functional block diagram of circuit modules/signal processing modules (which may comprise hardware, software or a mix of hardware and software) suitable for implementing a receiver signal processor for the radar network 1010 is shown generally at 2000. In this example signals are received by the receiver elements of a receiver array 2002. The signals received by the receiver array 2002 receive preliminary radio frequency (RF) processing by an RF processing module 2004 prior being transformed in frequency to an intermediate frequency by an IF generation module 2006. The analogue outputs of the IF module 2006 are converted to digital outputs by an analogue to digital (A-D) converter module 2008. Raw digital radar return data is stored in an appropriate data store 2014.

Complex FFTs are then carried out on the outputs of the A-D converter module 2008 (and/or the stored raw data) by an FFT module 2010, prior to beam formation at a beamforming module 2012 (although it will be appreciated that beamforming may be carried out in the time domain prior to FFT). The time domain to frequency domain conversion performed by the FFT module is completed for an appropriate initial processing interval (for example 250, 500, 1000 ms, etc.).

The digital beamformer 2012 forms multiple beams substantially concurrently (for example, a multiple equal to or related to the number of array antenna elements), in the desired directions, from the outputs of the A-D converter module 2008 using appropriate phase and/or amplitude weightings. It will be appreciated that although a digital beamforming module is described the beams could also be formed prior to analogue to digital conversion at the RF or IF stage using appropriate analogue beamforming circuitry, for example circuitry comprising multiple phase modulators.

The beam outputs from the beam former 2012 are then subject to various forms of signal processing to support the detection and tracking of targets.

A target processing module 2016 is configured to detect any targets. This may be achieved in any suitable way, for example by forming migration surfaces (e.g. a range/range rate surface) for each beam and then detecting any target(s) in one or more of the migration surfaces.

The target processing module 2016 is configured to analyse the detected target to determine for example inter alia to determine an angular position (in azimuth and elevation), a range, a range rate, a heading, an acceleration, a classification etc. for the target. The angular position of each detected target may, for example, be determined using amplitude monopulse comparison between beams and/or phase monopulse comparison between elements of the receiver. The use of phase monopulse can be advantageous over the use of amplitude monopulse because it may be easier to calibrate for the type of receiver arrays described here, being an element-oriented single parameter, rather than a beam-oriented 2-D plot. Phase monopulse measurements may also be more accurate than amplitude monopulse measurements.

If the target processing module 2016 determines the target to be of sufficient interest based on the target analysis (which may occur after the target analysis described above is only partially performed) then the target processing module 2016 may determine that more detail is required. If this is the case, then the processing interval is extended (by processing interval extension sub-module 2018) for the detected target and the time domain to frequency domain processing repeated, by the FFT module 2010, for the extended processing interval and beamforming repeated by the beamforming module 2012 (if required).

Further processing of the acquired target information and/or output of information relating to the target to an operator may be performed by one or more further processing/output modules 2020. This may occur substantially simultaneously or in parallel with any process interval extension and associated re-processing thereby allowing the most refined (i.e. the most up-to-date and hence the most precise) target information to be provided to the end user.

Accordingly, it can be seen that surveillance is persistent, or 'always on', while tracking and target analysis are achieved by continuing the coherent acquisition and analysis of target signals. Advantageously, a non-threatening target can be assigned a position and tracked, while an anomalous or otherwise threatening target can be continually enhanced by extending the effective processing interval, potentially indefinitely or until the target disappears from view.

Thus, not only are all parts of the field of view interrogated simultaneously, but target processing using the full complex history of signal amplitudes and phases can be extended, indefinitely, as needed, for example when more detailed target information is required.

Extended Coherence

Dynamic motion (acceleration and higher order movement such as 'yank' and 'jerk') of a target tends to limit, and can defeat the benefit of, coherent integration. However, the inertia of the target means that such dynamic motion has a finite effect that may be bounded by the nature of the target and determined by the behaviour of the target.

In existing systems coherent integration for a target can only be extended as long as the radar scan dwells on the target, whereas in the radar network described above, since transmitter dwell time is not limited (except by the target exiting), coherent processing can be pursued to meet the detection and analysis requirements for the target.

In addition to extending the processing interval, therefore, a particularly advantageous example of a radar cell or network, as described above, is provided with the ability to effectively extend the coherence of the system to allow third (and possibly) higher order effects to be determined reliably.

Specifically, the 'extended coherence' feature provides either: for the pre-distortion of the phase of a received radar return signal according to a pre-determined, multi-branched set of phase/time shifts, or: for the concatenation of successive, contiguous but multi-branched, complex, extended Fourier transforms (that is, concatenated from a 'tree' of adjacent or neighbouring frequency 'bins' of shorter dwell) to resolve trajectories that exhibit one of a set of rates of radial acceleration. Each of these variations will be described in more detail below with respective reference to FIGS. 21 and 22.

A predetermined dynamic model of each of various target types is used to construct a series of branched filters, which can be applied either to a Fourier transformation of the signal, or to its time domain representation, to determine which branch most closely represents the actual target motion.

Having determined the type, the speed and the branch, the filter output can be used to form an extended complex Doppler history of the target. Combinations of branches can also be used in classification.

Figure 21:
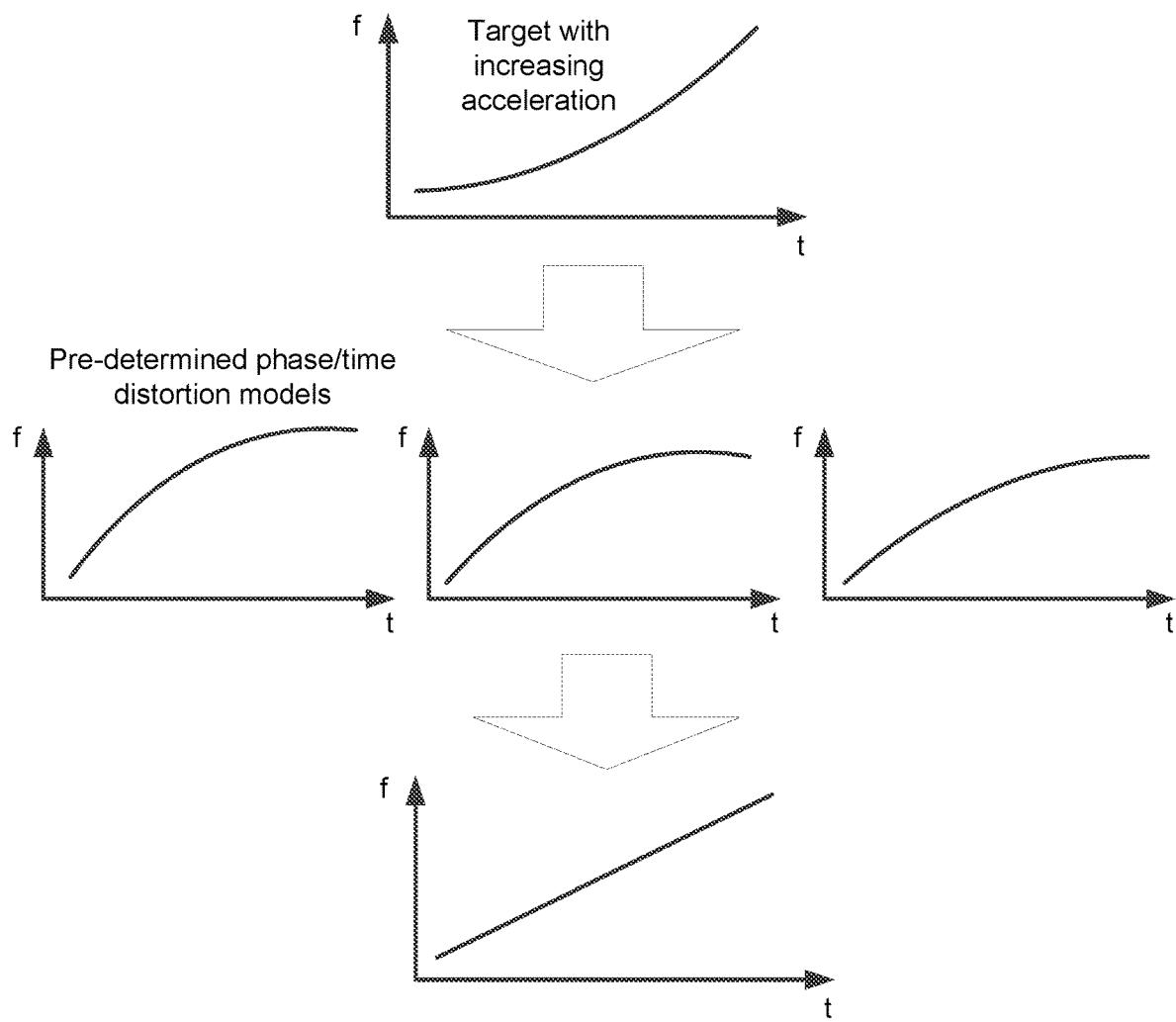
FIG. 21 illustrates, in simplified form, a technique for extending coherence in the radar network of FIG. 10 or in the radar system of FIG. 1.

FIG. 21 illustrates a process in which the phase of a return signal is pre-distorted for a target with positive or negative acceleration, in this example, at each of several possible rates. As seen in FIG. 21 the pre-distortion involves applying a pre-determined dynamic model representing a series of phase/time shifts, selected from a multi-branched set of phase/time shifts, to the radar return signals in the time domain to distort the received signals into a form for which FFT processing is more suitable (a linear—constant radial speed—frequency-time characteristic in FIG. 21).

The branch of the multi-branched set of phase/time shifts which is found to provide the most suitable distortion is the branch that most closely represents the actual target motion and can therefore be used to identify and to detect radial acceleration, within a set of pre-characterised target behaviour types or acceleration limits. Where a particular set of phase/time shifts (branch) provides a good fit for a certain time period, the model may be extended by concatenating a different set of phase/time shifts (branch) for a subsequent time period.

This is particularly advantageous because an FFT is significantly more efficient if the result is a constant range rate (single frequency) and so a target exhibiting a 'constant acceleration' (second order) can be determined between subsequent FFTs. Variable acceleration (third order) can then be accommodated by finding the best mean acceleration and then branching the set of distortion phase/time shifts, based on the rate of acceleration (jerk).

Figure 22:
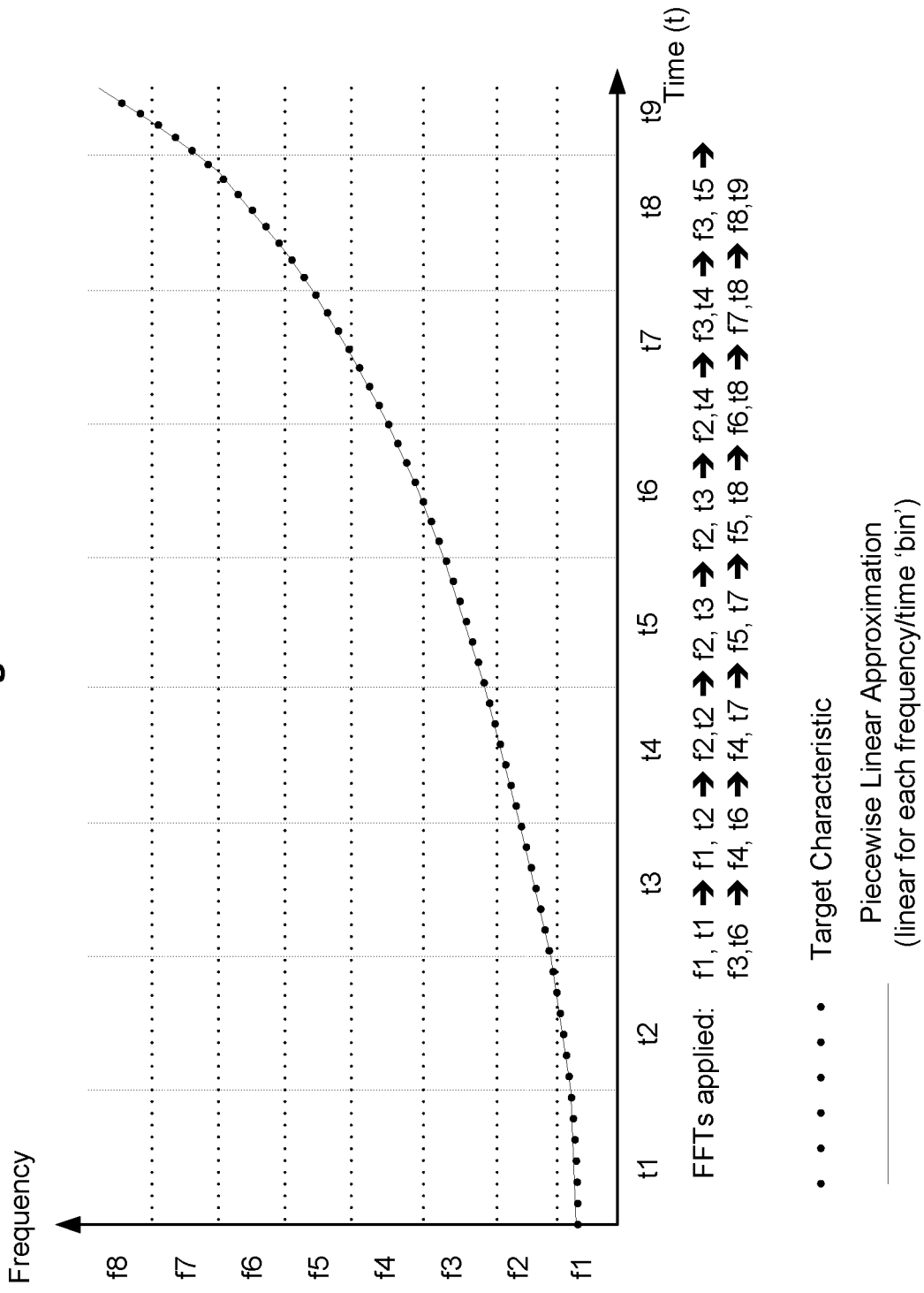
FIG. 22 illustrates, in simplified form, another technique for extending coherence in the radar network of FIG. 10 or in the radar system of FIG. 1.

FIG. 22 is a frequency time graph for an example in which a target exhibits increasing range rate. In the example of FIG. 22, FFT processing is significantly simplified by concatenating a series of complex FFTs for each of a number of frequency 'bins' (of relatively short dwell time) that are contiguous (adjacent in frequency, or neighbouring in time). The FFTs are concatenated to give a concatenated FFT for which coherence is maintained. In effect, this process provides a concatenated FFT representing a piecewise linear approximation to the frequency time characteristic. This concatenated FFT can then be filtered using a predetermined multi-branched frequency domain model to determine which branch most closely represents the actual target motion.

Adaptive Extended Coherence

As described above, the time on target may be adapted, post-detection, for a particular target or a specific class of targets (for example, those within a particular geographical area). Similarly, since data acquisition for a target is, in fact, continuous as long as it remains within the field of view, the period over which radar return signals are coherently integrated may be extended, indefinitely, following a detection, to allow improved measurement of attributes such as acceleration, 'jerk' and 'yank', to form images, or to aid in identifying behaviour such as aerobatics or aberrant piloted control of aircraft, or failures in control systems of unmanned air systems.

Where a particular branch of a particular dynamic model has been determined to most closely represent target behaviour this may be adapted, for example following extension of the period of coherent integration, by adaptively re-applying branches of the dynamic model until an improved fit is found and/or by concatenating a different series of branches.

Thus, complex histories can be extended by Fourier-based analysis of concatenated data frames, establishing characteristic trajectories, or sequences of trajectory perturbations, and depending on and adapting to observed target behaviour over time.

Accordingly, coherent integration can constrained or extended, essentially at will, in accordance with target measurements and/or analysis.

Doppler Spectrum Filtering for Extended Time Periods

Radar that is required to detect aircraft in the presence of sources of radar interference having moving parts (moving clutter') such as wind turbines can have to deal with radar returns which exhibit a significantly higher signal energy than radar returns from aircraft (this is especially true for turbines).

A number of techniques may be applied in a radar cell/network as described above in order to discriminate between radar returns from such sources of radar interference and radar returns from targets of interest.

One technique for providing such discrimination is to compare the evolution of Doppler frequency over time for detected targets. Using such a technique, targets such as wind turbines, for example, can be identified and discriminated against by virtue of the characteristic evolution of the Doppler spectrum associated with rotation of the turbine blade over time. Such a technique is only possible in a radar system that utilises the persistence provided by radars that apply holographic principles, as described herein, because the target is illuminated continuously and therefore sufficiently high resolution Doppler is produced.

The techniques for detecting an aircraft in a cluttered environment, and in particular a cluttered environment comprising wind turbines, can be enhanced by taking further account of the fact that the Doppler spectra of returns from aircraft and wind turbines are fundamentally different in character, for example:

Aircraft produce a sharp peak in the Doppler spectrum and the frequency of this peak changes steadily over time, depending on the direction and acceleration of the aircraft;

Wind turbines produce a distributed spectrum, the level and frequency distribution of which changes substantially from one observation period to the next.

Beneficially, therefore, in order to enhance the detection of aircraft over wind turbines, the following processing steps are utilised where appropriate:

Median filtering is applied to the Doppler spectrum.

This involves replacing each point in the Doppler spectrum with a median average of a number of points on either side, prior to subtraction and thresholding. This is effective in suppressing the distributed background from the wind turbines without suppressing the sharp peak from the aircraft. If threshold detection is subsequently applied, this considerably enhances the probability of the peak from an aircraft exceeding the threshold with respect to the probability of a turbine exceeding the threshold.

Utilisation of past observations.

This involves filtering the Doppler spectrum over time for current and past observation periods such that steadily changing peaks are enhanced whereas rapidly changing spectra, such as that associated with wind turbines, is suppressed. Thus, before a peak is accepted as being from an aircraft, account is effectively taken of the frequency of peaks from earlier observations to confirm that the peak is associated with a target of interest.

Wide Area Micro-Doppler

Micro-Doppler refers to Doppler associated with changes in phase arising from such small movements of a target that the range change does not extend for more than half the wavelength of the radar signal. Typically, for example, vibrations of a target, and/or or fast rotating parts of a target, will cause micro-Doppler associated phase modulation of a radar return signal that can manifest itself as sidebands around the 'macro' Doppler frequency associated with bulk motion of the target.

Beneficially, the ability to extend the effective dwell time or time-on-target ('processing interval') indefinitely and the coherent integration of signals, by virtue of the persistent illumination and observation of a volume of interest without interruption, allows the sidebands associated with micro-Doppler effects to be identified and analysed.

Thus, another feature of the radar cell/network is the ability to resolve phase deviations, or 'micro-Doppler', arising from sub-wavelength radial and/or vibratory motions, rather than in the sense of a Doppler 'frequency' where the motion is assumed to progress steadily over multiple carrier wavelengths. Since this can be applied over the full broad field of view of a radar receiver, this is termed, herein as 'wide area micro-Doppler' which was not previously possible.

The ability to derive such micro-Doppler effects opens up the possibility of many additional applications and/or enhanced target classification (e.g. based on target vibrations and or rotary part detection). For example, micro-Doppler models may be developed for targets of different types and/or 'threat' levels (e.g. based on vibratory signatures for different engine types—such as, propeller, jet, rocket etc.—and/or configurations—such as twin engine, single prop etc.). These micro-Doppler models may thus be used to further enhance target classification.

Secondary or Vernier Beamforming

Another beneficial feature of the radar cell/network described herein is the storage of raw radar return data (pre or post FFT) following beamforming. Hence, a target detection can be used to initiate the re-formation of one or more beams that are more optimally-directed for the purposes of determining accurate azimuth and/or elevation directions (e.g. based on phase and/or amplitude monopulse measurements), to optimise signal to noise ratios and to further improve range measurement.

Beneficially, beams may be re-formed not by a Fourier inverse process but by explicit complex weightings of contributing antenna elements.

Sidelobe Suppression

Another beneficial feature of the radar cell/network described herein arises from the fact that, during the extended dwell time or 'time-on-target' of the radar, all beams are formed substantially simultaneously in the computing domain. Accordingly, while sidelobes exist, the sidelobes and any associated detections that may arise from the sidelobes, exist in direct time correlation with the main beams and their detections.

Detection and processing occur within a large four-dimensional range/azimuth/elevation/Doppler space, of which Doppler has the finest 'grain', and it is possible to identify main- and side-lobe detections appropriately. Accordingly, detections associated with side-lobes can either be suppressed completely or, because the detections are known to be associated with the sidelobes, the detections may be used to enhance target positional analysis, for example based on the relative signal strength (signal amplitude) of the detections in each sidelobe.

The precise correlation in range and Doppler of targets detectable in neighbouring beams, that arises as a result of persistent illumination and interrogation of each target, can be used to obtain a unique angular position. Contrastingly, in a conventional radar target detections in neighbouring sidelobes cannot be so correlated.

As an example, a wind turbine blade generates a radar return that varies rapidly through a steep peak or flash. This flash will not be synchronised with the rotation used by a typical scanning radar, and during the scan it is not therefore possible to determine whether, at the time of the flash, the receiver main beam or a sidelobe was illuminated. This is especially significant where the intensity of the flash is high compared with the minimum sensitivity of the radar. By contrast, with the holographic networked radar, the flash is observable simultaneously and in precise correlation between the main beam and sidelobes. This allows the position to be determined uniquely.

Multipath Discrimination

In surveillance radar systems, such as the radar network described herein, a backscatter echo is used to determine the location of targets both in range and direction (azimuth and elevation). In an ideal situation a single direct radar return echoed from the target will enable the radar receiver signal processor to generate a unique detection report for each individual target.

In reality, however, the backscatter from a target can reach the receiver via two or more paths—the so called 'multipath' phenomenon. For airborne targets, for example, multipath can result from the reflection of radar returns from the ground, the surrounding terrain and or other items of clutter.

The multipath phenomenon can 'deceive' a radar processor into detecting non-existent or 'ghost' targets. Standard radar processing for filtering out false alarms is generally not particularly good at suppressing ghost targets because they move in a similar manner as a normal target (because the radar returns that cause them originate from a real target). A partial solution for mitigating multipath ghost targets is to incorporate a ground map of the radar surroundings and to eliminate all echoes which appear to originate below ground. However, such an approach does not deal with 'above ground' ghost targets that are offset in azimuth from the true target.

The radar receivers of the radar network described herein are beneficially able to eliminate ghost targets arising from multipath effects by taking advantage of the continuous, uninterrupted illumination and observation of the volume of interest provided in the radar network. Thus, the radar receivers are able to generate uninterrupted continuous observations of targets present anywhere within the radar footprint. This allows the radar return processors to characterise the detection history of an observed target, over an extended dwell time (effective 'time on target'). Ghost target detections arising from multipath effects will have characteristics that are strongly correlated with the detection arising from the direct target echo with the ghost target, in general, being time delayed, spatially offset and of reduced amplitude with respect to the true target. Once again, as with in-sidelobe detections, the 'ghost' target is not decorrelated from the real target by any scanning motion of the receiver.

The consistency of 'ghosts' with real targets is more complex than that between main- and side-lobes. Accordingly, the identification and elimination of such 'ghosts' may be enhanced by acquisition of and reference to a database of sources of multipath effects, for example in the form of reflecting surfaces or clutter such as walls, towers, roofs etc. The acquisition of such a database is, of course, made significantly easier by the use of persistent illumination and observation which allows the detection of potential sources of multipath effects and the subsequent analysis of associated signal data both post detection and pre detection.

The approach for eliminating such multipath ghost targets is analogous to the sidelobe suppression technique described above.

Detection of a target and the associated processing occurs within a large four-dimensional range/azimuth/elevation/Doppler space, of which Doppler has the finest 'grain'. Direct and multipath detections are identified through observing the time evolution of different target related attributes. Using data association and correlation based on reported range, Doppler and angular direction related targets are associated with one another and hence a true target will be linked with any corresponding ghost detections.

Doppler consistency of each target can be respectively checked against the measured range rate for that target, its motion profile and known sources of multipath to allow a genuine target to be identified and distinguished from multipath ghost detections. The multipath detection approach described herein is advantageously able to deal with any multipath detection, irrespective of its direction of arrival, provided it is separated in range from the real target (as it generally will be).

A specific advantage of this approach is that it does not require the use of more costly, processing intensive, adaptive beam nulling techniques for the suppression of multipath returns (although such techniques are not precluded). Furthermore, the technique may not rely on knowledge regarding the local terrain map.

Beneficially, the ghost target profiles, once correctly assigned to the relevant true target, can be used to improve the classification of the true target. This is because a ghost target signature profile will generally be from the perspective of a different angle to that of the direct echo and can therefore provide additional angular diversity which is generally known to improve radar target classification. This classification enhancement is achievable because of the grouping of ghost target echoes with true target detections. Conventional radar sensors lack this ability to group ghost target echoes with direct detections and so the enhancement gained in classification performance, through such signature combination, cannot be realised.

Modifications and Alternatives

A number of specific examples of the cellular radar network, radar cell, radar receiver and radar transmitter have been described above in detail. As those skilled in the art will appreciate, however, a number of modifications and alternatives can be made to the above examples whilst still benefiting from the inventions embodied therein. By way of illustration only a number of these alternatives and modifications will now be described.

It will be appreciated, for example, that the regular arrangement of nine radar cells 1012 in the radar network of FIG. 10 is used purely for reasons of clarity and ease of explanation. It will be appreciated that a deployed radar network will likely comprise an irregular arrangement comprising any suitable number radar cells 1012 (including a single cell for small geographic coverage areas such as a small island or the like). It is envisaged that between twenty and fifty such cells would be required for the UK, for which many of the corners will coincide (in a manner similar to that shown in Figure A]), resulting in a manageable number of sites at which radar nodes are located.

Although quadrilateral arrangements of radar nodes 1014, and in particular square arrangements, offer benefits in terms of simplicity it will be appreciated that any polygonal arrangement of radar nodes 1014 may be used that is suitable for the geographic area being covered, and that advantages may arise from the use of asymmetric cells, whereby the ambiguities that may typically arise as a result of symmetry can be avoided. Moreover, different cells 1012 of the radar network may be of different sizes and/or shapes in order to optimise radar coverage for a particular geographic area. Different arrangements may be necessary, for example, to take account on particular geographic, legal or other considerations that affect the siting of the radar stations. For example, cells can be configured in detail for the terrain or the available secure locations for sensors.

Whilst the radar cells 1014 described above are each formed by a multi-static arrangement of comprising two radar transmitters and two radar receivers, any suitable number of transmitter and/or receivers (including a single transmitter and/or receiver) may be used and the number of transmitters may be different to the number of receivers. Further, in certain locations (especially at land extremities), any radar transmitter forming a radar cell may be co-located with a respective radar receiver of the cell.

Whilst some of the radar nodes shown in FIG. 10 have radar receivers only and others have radar transmitters only it will be appreciated that a similar cellular arrangement could be achieved with radar nodes comprising a combination of one or more radar receivers and one or more radar transmitters (e.g. receivers on one or more faces each observing a respective cell and transmitters on one or more faces each illuminating a respective cell). Moreover, radar receivers and transmitters for different but adjacent cells could be provided separately from one another rather than as part of a single radar node as shown.

It will be appreciated that whilst use of the L band is considered particularly attractive, however, if different priorities emerge it is possible in future to migrate to different frequencies of operation such as ultra high frequency (UHF) bands.

Whilst the radar cells are described as part of a network of such cells it will be appreciated that each such cell may be capable of independent operation in addition to integrated operation as part of the network.

Whilst arranging the pulse repetition frequency for completely unambiguous Doppler at velocity magnitudes of interest is of particular benefit, it will be appreciated that the system can also allow positional and/or motion information to be resolved in the presence of either Doppler or range ambiguity. For example, the radar receivers are able to obtain sufficient information (e.g. angular, positional, range-rate estimation based on multiple position fixes) to resolve some Doppler ambiguity (e.g. a single level of Doppler ambiguity representing two possible velocity values) if present.

The cellular network may be configured to provide Asterix ('All Purpose Structured Eurocontrol Surveillance Information Exchange') messages containing plan position and trajectories of aircraft targets over the instrumented volume. Additional message codes may contain height and amplitude. Further information about targets (vector velocity, classification) may also be made available, tailored to user requirements.

Data may be provided with an update rate of approximately 1 Hz to 4 Hz. This will allow a degree of filtering and smoothing that may persist over a period comparable with current PSR scan intervals.

The source of each target report may be provided by the radar cell and/or the network server.

In addition to providing service throughout each cell of the network, information for out-of-area targets may also be derived and reported where possible. A selectable function may be provided as to whether information for such out-of-area targets is reported.

Target reports may typically be provided with a latency of, typically, 0.3 seconds or less from the time of the acquisition window. Acquisition windows typically occur continuously, without interruption due to scanning.

The update rate of the cellular network may, if required, be a rate in excess of that required by CAP 670 or EUROCONTROL standards, for example at over 3 Hertz.

Whilst the radar cell is aimed at tracking aircraft in manoeuvres consistent with civil aviation practice (up to 3 g for limited periods), more extreme manoeuvres may be accommodated.

Susceptibility to interference and/or jamming may be alleviated by ensuring that the radar receivers are protected by deep blocking filters (>80 dB), and/or have a very high dynamic range (14-bit ADC conversion for each receiver element (~+6 dB element gain)), allowing interferers to be accommodated to a high level without desensitization. Each receiver may be capable of operation in the presence of incoming signal intensities of −50 dBm, with a receiver effective area of approximately −24 dBsm. This places a minimum on the required jamming emission at 100 km of over 300 kW for saturation.

The receiver may be provided with further capability to detect and diagnose jamming signals and their direction of arrival, and apply appropriate beam nulling and filtering to the signal in real time.

Whilst the described radar cell uses cross-nodal transmissions (that is, transmissions directly from a transmitter to each receiver) to synchronize the network directly and precisely, it will be appreciated that Global Positioning System (GPS) (or GNSS) timing, or MSF/NPL (Anthorn), or e-LORAN, or a land-communicated time reference may also be used for time coordination. The radar cell may also use be synchronised via a hierarchy of timing sources, which has the potential to provide additional accuracy and/or robustness (e.g. in the event of unit failures).

The radar network may be configured such that the transmitters operate in strict synchrony with each other. An appropriate synchronization approach may be used to synchronise the transmitters including, for example, the use of Global Positioning System (GPS) (or GNSS) timing and high-stability local clocks. Moreover, direct transmissions between pairs of transmitters and their associated receivers within the radar network may be used as the means for synchronization using, for example, the known positions of each to adjust the timing of transmissions and reception.

The cellular network approach may be configured to comply with interoperability requirements in the UK, Europe or other territories. Specifically, the network may be configured to comply, as a non-cooperative surveillance system, with the requirements stated in Annex I of EU Commissioning Implementing Regulation No 1207/2011 of 22 Nov. 2011.

The receivers of the cellular network may be configured to use Asterix messaging to communicate aircraft positions.

The radar transmitter may operate in a continuous-wave mode.

Targets may be observed and detected at (and across) the boundaries between cells (where detections at one of the receivers of the cell cannot be used as effectively to determine positional information) by extending the process in which detections by two receivers within a cell are reconciled. The detections of receivers in adjacent cells may also be used to enhance such targets.

Whilst the cellular radar network is particularly useful for conventional civil aeronautical radar it may be extended to air defence, military and maritime radar.

The Meteorological Office currently uses spectrum in the L-band, S-band and C-band. The cellular radar network may be configured to mitigate the effects of weather related clutter (e.g. clouds) by, for example, ensuring that cloud formations do not lead to spurious aircraft tracks (owing to the sensor's ability to evaluate Doppler histories for different classes of target). However, the cellular radar network may also provide the added benefit of reporting separately the presence of aircraft, cloud masses and rainfall as well as explicitly discounting wind turbines.

It will be appreciated that whilst a practical version of the radar system described with reference to FIG. 1 may be capable of maintaining data for radar returns from over 500 cubic km of airspace, it is envisaged that typical commercial radar systems may be configured to maintain data for a smaller minimum volume, for example at least a 1 cubic km volume, at least a 3 cubic km volume, at least a 5 cubic km volume, at least a 10 cubic km volume, or at least a 100 cubic km volume.

It will be appreciated that whilst a practical version of the radar system described with reference to FIG. 1 may be capable of maintaining substantially continuous data for radar returns received over a prolonged surveillance period exceeding 10 minutes, it is envisaged that typical commercial radar systems may be configured with a capability to maintain data for shorter minimum period, for example a prolonged surveillance period of at least 10 seconds, at least 30 seconds, at least 1 minute, at least 2 minutes or at least 5 minutes.

It will be appreciated that the processing functions of the radar system described with reference to FIG. 1 may be configured to maintain data acquired for detected targets of particular interest for an extended period that exceeds the prolonged surveillance period for which data is stored for substantially the entire FoS (and may be stored indefinitely). Similarly, data for the entire volume of the FoS, or for a specific part of it, may be maintained for an extended period that exceeds the normal prolonged surveillance period (and may be stored indefinitely) if a significant event is detected in the FoS (or the specific part of it). When such data is to be stored for a much longer period or indefinitely it may be transferred to another (e.g. more permanent) data store for more detailed subsequent analysis). Such indefinite storage may be triggered by detection of any of a number of events such as anomalous pilot/vehicle behaviour, a disintegration event (such as aircraft break-up), a dismount event (such as a secondary target disengaging from a detected target—e.g. indicative of a missile or drone launch)

In the exemplary multi-static radar system for providing surveillance, the radar system included a plurality of radar receivers and a plurality of radar transmitters arranged in a multi-static configuration to form at least one radar cell to provide an area of radar coverage within that cell. Each of the radar transmitters was a static transmitter that persistently illuminated a respective radar cell with a radar signal and that was synchronised or controlled as a part of the radar system. Each radar receiver was a static receiver operable to receive radar signals from within a respective radar cell, including radar return signals echoed from any object as a result of illumination by one or more corresponding radar transmitters. The respective radar signals received at each radar receiver were then processed to determine information relating to the position of a detected object and/or the motion of that object.

It will be appreciated that the features of the multi-static radar system may be applied in other radar systems described herein including, for example, the radar system of FIG. 1, where appropriate to do so.

The radar transmitters may be arranged such that, in operation, each radar cell is illuminated by at least two radar transmitters.

The radar receivers may be arranged such that, in operation, each radar cell may comprise at least two radar receivers arranged to receive signals from within that radar cell, including radar return signals echoed from any object within the respective radar cell.

The radar cell may comprise a polygonal coverage area having a plurality of vertices at each of which a respective radar transmitter, or radar receiver, may be arranged for illuminating, or receiving radar signals from within, the polygonal coverage area.

The polygonal coverage area may comprise a quadrilateral (e.g. square or rectangular) coverage area.

The quadrilateral polygonal coverage area has a radar receiver located at one vertex thereof and another radar receiver located at a diagonally opposite vertex thereof.

The quadrilateral polygonal coverage area has a radar transmitter located at one vertex thereof and another radar transmitter located at a diagonally opposite vertex thereof.

The polygonal coverage area has a radar receiver located at one vertex thereof and another radar receiver located at a diagonally opposite vertex thereof.

The polygonal coverage area has a radar transmitter located at one vertex thereof and another radar transmitter located at a diagonally opposite vertex thereof.

Each radar transmitter and each radar receiver located at a respective vertex of the polygonal coverage area may be configured together to provide radar coverage that extends beyond the polygonal coverage area.

The radar system may comprise a plurality of radar transmitters arranged to illuminate a radar cell wherein each radar transmitter may be operable to transmit radar pulses of radio waves having the same respective transmission frequency (and/or pulse repetition frequency).

Each radar receiver may be configured to attenuate radar signals received from a direction of the at least one corresponding radar transmitter (e.g. using at least one of shadowing, obscuration, beam nulling, directing and/or signal subtraction), whereby to mitigate against saturation and/or desensitisation, of that radar receiver.

Each radar receiver may be operable to receive radar signals from within a respective radar cell, including radar return signals echoed from any object within the respective radar cell, as a result of illumination of the radar cell by a plurality of radar transmitters located remotely from that radar receiver. It will be appreciated that one, some or all of the plurality of radar transmitters may, nevertheless, be located in proximity to the radar receiver.

The processing means may be operable to distinguish between radar return signals echoed from any object within the respective radar cell as a result of illumination of the radar cell by a first of the plurality of radar transmitters and radar return signals echoed from any object within the respective radar cell as a result of illumination of the radar cell by a second of the plurality of radar transmitters.

The processing means may be provided as part of each radar receiver, the respective part being configured for processing the radar signals received at that radar receiver to determine information relating to at least one of position and motion of the object relative to that receiver.

Radar signals received, by each radar receiver, from a direction of the at least one corresponding radar transmitter may be attenuated, by virtue of the distance between each radar receiver and the at least one corresponding radar transmitter, whereby to mitigate against saturation and/or desensitisation, of that radar receiver.

Each radar receiver may be operable to use signals received from a direction of the at least one corresponding radar transmitter to synchronise the radar receiver with the radar transmitter.

Each radar receiver and each radar transmitter may be operable to synchronise with one another based on signals from another one of said plurality of transmitters.

Each radar receiver and each radar transmitter may be operable to synchronise with one another based on signals from a satellite.

Each radar receiver and each radar transmitter may be operable to synchronise with one another based on signals from a time synchronization system. The time synchronization system may comprise the broadcast of a time-synchronisation signal such as the 'MSF' signal, or 'Time from National Physics Laboratory (NPL)' signal, and/or may allow synchronisation with coordinated universal time (UTC).

The radar receivers may be interconnected via a communication link.

The radar receivers may be interconnected via a high speed (e.g. broad band) communication link.

The radar receivers may be interconnected via a wired communication link.

The plurality of radar receivers and plurality of radar transmitters may be arranged in a multi-static configuration to form a plurality of radar cells to provide an extended area of radar coverage within the plurality of cells.

In one exemplary radar system there is provided a radar transmitter for the multi-static radar system, the radar transmitter comprising the means for persistently illuminating a radar cell with the radar signal.

The radar transmitter may be operable to persistently illuminate the respective radar cell with a radar signal comprising a sequence of radar pulses.

The radar transmitter may be operable to persistently illuminate the respective radar cell with a radar signal comprising a sequence of radar pulses at a predetermined pulse repetition frequency.

The radar system may be configured to detect and determine the information for objects moving up to a maximum range rate and wherein the predetermined pulse repetition frequency may be set sufficiently high to ensure that the range rate of an object moving at the maximum range rate can be determined unambiguously, from the Doppler shift imparted to the radar return signals, by the processing means.

The predetermined pulse repetition frequency may be at least four times the maximum range rate divided by a wavelength of a radio wave used in the radar pulses.

In one exemplary radar system there is provided a radar receiver for the multi static radar system, the radar receiver comprising means for receiving radar signals from a radar cell, including radar return signals echoed from any object within the radar cell, as a result of illumination of the radar cell by at least one radar transmitter located remotely from the radar receiver.

The radar receiver may further comprise processing means for processing the radar return signals echoed from an object and received at the radar receiver to determine the information relating to at least one of position and motion of the object.

The radar receiver may further comprise means for obtaining information relating to at least one of position and motion of the object relative to another radar receiver (e.g. from the another radar receiver or from a server).

The processing means may be operable to determine the information relating to at least one of position and motion of the object based on the information relating to at least one of position and motion of the object relative to another radar receiver.

The processing means may be operable to determine an angular position of the object relative to the radar receiver.

The angular position of the object relative to the radar receiver may comprise an elevation angle of the object relative to the receiver.

The angular position of the object relative to the receiver may comprise an azimuth angle of the object relative to the radar receiver.

The processing means may be operable to determine a position of the object relative to the receiver based on the angular position of the object relative to the radar receiver.

The processing means may be operable to determine a range of the object relative to the receiver.

The range of the object relative to the radar receiver may comprise a bi-static range, representing a combined range: from the radar receiver to the object; and from the object to a radar transmitter that transmitted radar signals that resulted in the radar return signals, echoed from the object, and on which the determination of range may be based.

The processing means may be operable to determine the range of the object relative to the radar receiver from an ambiguous set of at least two possible values for the range.

The processing means may be operable to determine the range, from the ambiguous set of at least two possible values for the range, based on at least one angular position of the object relative to the radar receiver.

The processing means may be operable to determine the range, from the ambiguous set of at least two possible values for the range, based on a phase coding of transmitted radar signals that resulted in the radar return signals, echoed from the object, and on which the determination of range may be based.

The processing means may be operable to determine the range, from the ambiguous set of at least two possible values for the range, based on information relating to at least one of position and motion of the object relative to another radar receiver.

The processing means may be operable to determine a position of the object relative to the receiver based on the range.

The processing means may be operable to determine a range rate of the object.

The processing means may be operable to determine a respective range rate of the object in each of two directions.

The processing means may be operable to determine a velocity magnitude and direction of the object based on the range rates of the object in each of the two directions.

The processing means may be operable to determine the range rate(s) of the object based on a Doppler shift exhibited by the radar return signals received at the radar receiver.

The processing means may be operable to maintain histories for each object detected by the radar receiver.

The histories may comprise at least one of: Doppler, range, range rate, two-dimensional position, three-dimensional position, object tracking, angular position, velocity, and direction histories.

The processing means may be operable to classify each object detected by the radar receiver based on the information relating to at least one of position and motion of the object.

The processing means may be operable to classify an object detected by the radar receiver as at least one of a target of interest or clutter based on the information relating to at least one of position and motion of the object.

In one exemplary method, performed in a multi-static radar system, for providing surveillance, wherein the multi-static radar system comprises a plurality of radar receivers and a plurality of radar transmitters arranged in a multi-static configuration to form at least one radar cell to provide an area of radar coverage within said cell, the method comprises: each radar transmitter persistently illuminating a respective radar cell with a radar signal; each radar receiver receiving radar signals from within a respective radar cell, including radar return signals echoed from any object within said respective radar cell, as a result of illumination of said radar cell by at least one corresponding radar transmitter located remotely from that radar receiver; and processing the respective radar signals received at each radar receiver to determine information relating to at least one of position and motion of said object.

The processing means may be operable to process the radar return signals echoed from within said radar cell and received at the at least one radar receiver: to make a first detection of a target, wherein said first detection results from first radar return signals, originating from one of said transmitters, and echoed from said target; to make a second detection of said target, wherein said second detection results from second radar return signals, originating from another of said transmitters, and echoed from said target; to identify, for each of said first and second detections, from which of said transmitters the radar return signals resulting in that respective detection originated; to determine first positional information for said target based on said first radar return signals resulting in said first detection and information on the transmitter identified to be the originator of said first radar return signals; to determine second positional information for said target based on said second radar return signals resulting in said second detection and information on the transmitter identified to be the originator of said second radar return signals; and to determine refined positional information for said target based on said first and second positional information.

The processing means may be operable: to process the radar return signals echoed from within said radar cell within a first process interval, representative of a first time on target, to detect a target and to provide information relating to said target; to determine, based on said information relating to said target, a second process interval, representative of a second time on target; and to process the radar return signals echoed from within said radar cell within a second process interval, representative of a second time on target, to provide at least one of further and refined information relating to said target.

The processing means may be operable: to process the radar return signals echoed from within said radar cell to derive a Doppler spectrum for said return signals; to filter said Doppler spectrum using a median filter whereby to suppress Doppler spectrum associated with a moving source of radar interference (e.g. wind turbines); and to identify from said filtered Doppler spectrum whether said filtered Doppler spectrum comprises a Doppler signal indicative of a target of interest.

The processing means may be operable: to process the radar return signals echoed from within said radar cell to derive a Doppler spectrum for said return signals; to identify based on said Doppler spectrum, sub-wavelength variations in phase (e.g. micro-Doppler variations) arising from sub-wavelength motion of a target; and to determine target related information based on said sub-wavelength variations in phase.

The processing means may be operable: to process the radar return signals echoed from within said radar cell to make a plurality of substantially simultaneous detections of a target, wherein at least one of said detections of said target is in a main receiver beam and another of said detections of said target in a sidelobe to said main receiver beam; and to determine based on the signal amplitude which of said detections is in said sidelobe and which of said detections is in said main receiver beam.

The processing means may be operable: to process the radar return signals echoed from within said radar cell to make a plurality of substantially simultaneous detections of a target, wherein at least one of said detections of said target arises from radar return signals that are received directly from said target and at least one other of said detections of said target arises from radar return signals that are received indirectly from said target (e.g. via at least one multipath); and to determine which of said detections is received directly and which of said detections is received indirectly.

The processing means may be operable to process the radar return signals echoed from within said radar cell within an adaptive process interval that can be adapted depending on target analysis requirements.

The adaptive processing interval may be extendable to allow enhanced analysis of said target. The adaptive processing interval may be reducible to allow faster target detection.

The processing means may be operable: to process the radar return signals echoed from within said radar cell to make at least one detection of a target; to determine at least one of an ambiguous range rate and an ambiguous range for said target; to resolve ambiguity in said at least one of an ambiguous range rate and an ambiguous range based on a phase coding sequence exhibited by said radar return signals.

The processing means may be operable: to process the radar return signals echoed from within said radar cell to make at least one detection of a target, wherein said radar return signals comprise characteristics that represent dynamic target behaviour; to apply at least one branch of a pre-determined multi-branched model representing dynamic target behaviour to said radar return signals to identify a branch that approximates to the dynamic target behaviour represented by said characteristics, wherein each of a plurality of branches of said multi-branched model represents a different respective dynamic target behaviour; and to derive information relating to said target based on said identified branch of said pre-determined multi-branched model.

In one exemplary radar system for providing surveillance, the radar system comprises: at least one radar receiver and a plurality of radar transmitters; wherein each radar transmitter is a static transmitter operable to persistently illuminate a common volume of interest with respective radar signals; and wherein the at least one radar receiver is a static receiver operable to continuously observe said common volume of interest to receive radar return signals echoed from a target within said common volume of interest, as a result of said illumination of said common volume of interest by said radar transmitters; and a processor operable to process the radar return signals echoed from within said volume of interest and received at the at least one radar receiver: to make a first detection of said target, wherein said first detection results from first radar return signals, originating from one of said transmitters, and echoed from said target; to make a second detection of said target, wherein said second detection results from second radar return signals, originating from another of said transmitters, and echoed from said target; to identify, for each of said first and second detections, from which of said transmitters the radar return signals resulting in that respective detection originated; to determine first positional information for said target based on said first radar return signals resulting in said first detection and information on the transmitter identified to be the originator of said first radar return signals; to determine second positional information for said target based on said second radar return signals resulting in said second detection and information on the transmitter identified to be the originator of said second radar return signals; and to determine refined positional information for said target based on said first and second positional information.

The radar signals transmitted by each of said plurality of transmitters may comprise a series of radar pulses at a pre-determined pulse repetition frequency (PRF), wherein each said radar pulse may comprise radio waves of a pre-determined frequency, and wherein said pre-determined frequency of said radio waves may be common to each of said plurality of transmitters.

The processor may be operable to identify, for each of said first and second detections, from which of said transmitters the radar return signals resulting in that respective detection originated, for example by: making a respective presumption as to which of said transmitters the radar return signals resulting in each detection originated from; verifying whether said presumptions result in consistent positional or velocity information; and/or when said presumptions result in consistent positional or velocity information, identifying each transmitter from which the radar return signals resulting in a respective detection originated in accordance with said presumption.

The processor may be operable to verify whether said presumption results in consistent positional information by, for example: determining first hypothetical positional information for said target based on said first radar return signals resulting in said first detection and information on the transmitter that said presumption presumes to be the originator of said first radar return signals; determining second hypothetical positional information for said target based on said second radar return signals resulting in said second detection and information on the transmitter that said presumption presumes to be the originator of said second radar return signals; and/or verifying said presumption when said first hypothetical positional information is consistent with said second hypothetical positional information.

In one exemplary radar system for providing surveillance, the radar system comprises: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest within a first process interval, representative of a first time on target, to detect said target and to provide information relating to said target; to determine based on said information relating to said target a second process interval, of different length to said first process interval, representative of a second time on target; and to process the radar return signals echoed from within said volume within a second process interval, representative of a second time on target, to provide at least one of further and refined information relating to said target.

The second process interval may overlap at least partially in time with the first process interval. The second process interval may be an extended version of the first process interval.

In one exemplary radar system for providing surveillance, the radar system comprises: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from within said volume of interest, as a result of said illumination of said volume of interest by said radar transmitters; and a processor operable: to process the radar return signals echoed from within said volume of interest to derive a Doppler spectrum for said return signals; to filter said Doppler spectrum using a median filter whereby to suppress Doppler spectrum associated with a moving source of radar interference (e.g. wind turbines); and to identify from said filtered Doppler spectrum whether said filtered Doppler spectrum comprises a Doppler signal indicative of a target of interest.

The processor may be operable to identify from said filtered Doppler spectrum whether said filtered Doppler spectrum comprises a Doppler signal indicative of a target of interest by determining whether said filtered Doppler spectrum comprises a Doppler signal that exceeds a predetermined threshold.

The processor may be operable to apply a filter across a plurality of historic Doppler spectrums, for radar return signals, obtained over an extended time period to enhance peaks in the Doppler spectrum that are indicative of a target exhibiting a steady change in Doppler characteristics.

In one exemplary radar system for providing surveillance, the radar system comprises: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to derive a Doppler spectrum for said return signals; to identify based on said Doppler spectrum, sub-wavelength variations in phase (e.g. micro-Doppler variations) arising from sub-wavelength motion of said target; and to determine target related information based on said sub-wavelength variations in phase.

In one exemplary radar system for providing surveillance, the radar system comprises: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make a plurality of substantially simultaneous detections of said target, wherein at least one of said detections of said target is in a main receiver beam and another of said detections of said target in a sidelobe to said main receiver beam; and to discriminate between said detections by determining based on signal amplitude which of said detections is in said sidelobe and which of said detections is in said main receiver beam.

In one exemplary radar system for providing surveillance, the radar system comprises: at least one radar receiver and at least one radar transmitter; wherein the at least one radar transmitter is a static transmitter operable to persistently illuminate a volume of interest with respective radar signals; and wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make a plurality of substantially simultaneous detections of said target, wherein at least one of said detections of said target arises from radar return signals that are received directly from said target and at least one other of said detections of said target arises from radar return signals that are received indirectly from said target (e.g. via at least one multipath); and to discriminate between said detections by determining which of said detections is received directly and which of said detections is received indirectly.

The processor may be operable to process the radar return signals echoed from within said volume of interest within an adaptive process interval that can be adapted depending on target analysis requirements.

The adaptive processing interval may be extendable to allow enhanced analysis of said target. The processor may be operable to discriminate between said detections by processing said radar return signals echoed from within said volume of interest using an extended processing interval. The adaptive processing interval may be reducible to allow faster target detection.

In one exemplary radar system for providing surveillance, the radar system comprises: at least one radar receiver and at least one radar transmitter; wherein the at least one radar transmitter is a static transmitter operable to persistently illuminate a volume of interest with respective radar signals; wherein said radar signals transmitted by each transmitters comprise a series of radar pulses encoded with a pulse to pulse phase coding sequence; wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make at least one detection of said target; to determine at least one of an ambiguous range rate and an ambiguous range for said target; to resolve ambiguity in said at least one of an ambiguous range rate and an ambiguous range based on the phase coding sequence exhibited by said radar return signals.

In one exemplary radar system for providing surveillance, the radar system comprises: at least one radar receiver and at least one radar transmitter; wherein the at least one radar transmitter is a static transmitter operable to persistently illuminate a volume of interest with respective radar signals; wherein the at least one radar receiver is a static receiver operable to continuously observe said volume of interest to receive radar return signals echoed from a target within said volume of interest, as a result of said illumination of said volume of interest by said radar transmitters; and a processor operable: to process the radar return signals echoed from within said volume of interest to make at least one detection of said target, wherein said radar return signals comprise characteristics that represent dynamic target behaviour; to apply at least one branch of a pre-determined multi-branched model representing dynamic target behaviour to said radar return signals to identify a branch that approximates to the dynamic target behaviour represented by said characteristics, wherein each of a plurality of branches of said multi-branched model represents a different respective dynamic target behaviour; and to derive information relating to said target based on said identified branch of said pre-determined multi-branched model.

Each of a plurality of branches of said pre-determined multi-branched model may comprise a different respective set of phase and/or time shifts.

The processor may be operable to apply said branch that approximates to the dynamic target behaviour represented by said characteristics, by applying the respective set of phase and/or time shifts of that branch to modify said radar return signals, in the time domain, to provide modified radar return signals comprising characteristics that represent a simplified (e.g. first or second order) dynamic target behaviour.

The processor may be operable to derive said information relating to said target derived, based on said modified radar return signals.

Each of a plurality of branches of said pre-determined multi-branched model may comprise a different respective set of frequency domain transforms.

The processor may be operable to apply said branch that approximates to the dynamic target behaviour represented by said characteristics, by applying the respective set of individual frequency domain transformations of that branch to said radar return signals, in the frequency domain, and concatenating said frequency domain transformations to provide an extended coherent frequency domain transformation.

Each said individual frequency domain transformation may represent a predetermined frequency (or frequency bin) for a predetermined dwell time.

The characteristics may represent dynamic behaviour comprising at least one of second order, third order and fourth order motion of said target; and wherein said processor is operable to derive said information relating to said target derived, based on said identified branch of said pre-determined multi-branched model, that characterises said at least one of second order, third order and fourth order motion of said target behaviour.

The processor may be operable to derive information relating to said target derived, based on said identified branch of said pre-determined multi-branched model, that identifies at least one of a target classification, target type and target identity for said detected target.

A field of view within a cell may be illuminated by two or more transmitters and observed by two or more receivers; wherein the field of view is determined by an inclusive combination of receiver-determined fields of view for any combination of said two or more receivers.

In one exemplary radar system there is provided a receiver comprising the necessary features for putting a receiver of any of the radar system aspects into effect.

In one exemplary radar system there is provided a transmitter comprising the necessary features for putting a transmitter of any of the radar system aspects into effect.

Various other modifications will be apparent to those skilled in the art and will not be described in further detail here.

The invention claimed is:

1. A radar system for providing information relating to a three-dimensional field of surveillance (FoS) having a volume exceeding one cubic kilometre, the radar system comprising:
at least one of a plurality of radar transmitters operable to persistently illuminate said FoS, without movement of a region of illumination by electronic or mechanical scanning, with a sequence of pulses at a pulse repetition frequency (PRF);
at least one radar receiver arranged to persistently monitor said FoS to receive radar return signals returned from objects within the FoS, as a result of said persistent illumination of said FoS by the at least one radar transmitter, wherein the at least one radar receiver comprises one or more receiver elements; and
at least one processor configured to:
process each radar return signal received within a first time period of predetermined length to acquire respective signal information;
store the acquired signal information for each of at least a majority of radar return signals received from within the entire FoS within the first time period;
wherein for each of the at least a majority of radar return signals received from within the entire FoS within the first time period, the acquired signal information is stored in a memory in association with information identifying at least one of (i) a respective beam in which the respective radar return signal was received, and (ii) a respective one of the one or more receiver elements at which that respective radar return signal was received wherein the respective beam is defined by at least an elevation and azimuth angle of the respective radar return signal;
process each radar return signal received within a second time period of predetermined length, contiguous with said first time period, to acquire respective further signal information;
store the acquired further signal information for each of at least a majority of radar return signals received from within the entire FoS within the second time period;
wherein for each of the at least a majority of radar return signals received from within the entire FoS within the second time period, the acquired further signal information is stored in said memory in association with information identifying at least one of (i) a further respective beam in which the respective radar return signal was received, and (ii) a respective one of the one or more receiver elements at which the respective radar return signal was received, whilst said signal information acquired during said first time period is still retained in said memory, wherein the further respective beam is defined by at least an elevation and azimuth angle of the respective radar return signal; and
analyse the stored signal information and/or further signal information to detect a target and to extract and/or refine target information for said target relating to at least one of a position and a characteristic of said target.

2. The radar system as claimed in claim 1, wherein each said time period has a predetermined length equal to an initial dwell time length for said radar system.

3. The radar system as claimed in claim 2, wherein said at least one process or processor is configured for concatenating signal information acquired within a plurality of said time periods to provide concatenated signal information for a modified dwell time.

4. The radar system as claimed in claim 3, wherein said at least one processor is configured for analysing said concatenated signal information for the modified dwell time and for refining extracted target information for a detected target based on said analysis.

5. The radar system as claimed in claim 1, wherein said at least one processor is configured to perform at least one of the following actions:
store respective signal information acquired for each time period in association with at least one of: information identifying a range of an object from which the return signal that resulted in the acquisition of that signal information was reflected; information identifying a Doppler frequency extracted from the return signal that resulted in the acquisition of that signal information;

and information identifying a time period within which was transmitted a transmitter pulse from which the return signal that resulted in the acquisition of that signal information originated;

analyse the stored signal information to individually detect each of a plurality of targets and to extract and/or refine target information for each said target relating to at least one of a respective position and a respective characteristic of said target, even when each of said plurality of targets share a common range and a common azimuth within a range/azimuth resolution of the radar system, optionally wherein said at least one processor is configured to analyse the stored signal information to individually detect and distinguish between each of the plurality of said targets that share a common range and a common azimuth within a range/azimuth resolution of the radar system based on at least one of a difference in the elevation of said plurality of targets and a difference in range rate of said targets;

analyse the stored signal information to individually detect each of a multitude of targets that are simultaneously located in said FoS, and to extract and/or refine target information for each said target relating to at least one of a respective position and a respective characteristic of said target; and analyse the stored signal information to individually detect each of a plurality of targets that are simultaneously located in said FoS, and to extract and/or refine target information for each said target relating to at least one of a respective position and a respective characteristic of said target, even when each of said plurality of targets are within 3 NM of one another.

6. The radar system as claimed in claim 1, wherein said radar receiver is arranged to receive radar return signals returned from objects within a FoS that extends, relative to the radar receiver, at least one of: 90° or greater in azimuth; 6° or greater in elevation; and 5 km or greater in range.

7. The radar system as claimed in claim 1, wherein said radar system is capable of acquiring and storing signal information for each of at least a majority of radar return signals received from within the entire FoS, wherein the FoS has a volume exceeding 3 cubic km, 5 cubic km, 10 cubic km, 100 cubic km, or even 500 cubic km.

8. The radar system as claimed in claim 1, wherein the at least one processor is configured to perform at least one of the following actions:

respectively process complex radar return signals received within each of a sequence of several contiguous time periods of predetermined length, including said first and second time period, to acquire and store respective signal information for each said time period; optionally wherein said radar system is capable of acquiring and storing complex signal information for each of at least a majority of radar return signals received from within the entire FoS, and for each of said sequence of several contiguous time periods of predetermined length, for a continuous surveillance period exceeding 10 seconds, exceeding 30 seconds, exceeding 1 minute, exceeding 2 minutes, exceeding 5 minutes, or even exceeding 10 minutes; and analyse stored signal information, retrospectively following detection of a target, and for refining extracted target information for a detected target based on signal information stored before a signal frame in which that target was detected, optionally wherein said at least one processor is configured for refining extracted target information for a detected target based on stored signal information acquired following detection of that target.

9. The radar system as claimed in claim 1, wherein the at least one process or processor is configured to respectively process radar return signals received within each of a sequence of several contiguous time periods of predetermined length, including said first and second time period, to acquire and store respective signal information for each said time period; and to analyse the stored respective signal information for each said time period and for an extended time period comprising a plurality of said contiguous time periods to extract and/or refine target information for any detected targets.

10. The radar system as claimed claim 1, wherein said at least one processor is configured to perform at least one of the following actions:

extracting information relating to performance of at least one of a pilot and an aircraft with respect to at least one performance criterion and wherein said radar system is configured for providing said information relating to performance of at least one of a pilot and an aircraft to a user, optionally wherein said at least one processor is configured for extracting information relating to behaviour of at least one of a pilot and an aircraft with respect to at least one behavioural criterion comprising at least one of the following: a flight safety criterion; an Air Traffic Control request compliance criterion; a criterion indicating operation of an automatic pilot facility; a fuel efficiency criterion; a criterion indicating behaviour affected by another airborne object; a criterion indicating compliance, or lack of compliance, with an aviation regulation;

providing target information relating to each of a plurality of detected targets located at a respective three-dimensional real-space position within said FoS for output, via a three-dimensional visualisation system, or at a respective three-dimensional virtual-space position corresponding to the three-dimensional real-space position of that detected target, optionally wherein the radar system further comprises said three-dimensional visualisation system, a receiver for receiving an input from an operator of said three-dimensional visualisation system to move a view of said operator within a virtual representation of said FoS, and a controller for controlling said virtual representation of said FoS based on said input; and extracting target information relating to a detected target using a plurality of different extraction methods, wherein each extraction method is tailored to a different respective surveillance function.

11. The radar system as claimed in claim 10, wherein said plurality of different extraction methods include a respective extraction method tailored to each of at least two of the following different respective surveillance functions: a high frequency (HF) over the horizon surveillance function for surveillance of at least one of aircraft, ships, missiles and sea clutter; an air defence surveillance function for at least one of long range low rate surveillance; and medium range medium rate surveillance; an air defence surveillance function; a weapons control surveillance function; a battlefield radar surveillance function; an air traffic control radar surveillance function; a non-cooperative target recognition surveillance function; an electronic countermeasures surveillance function; a weather radar surveillance function; a surveillance function for detecting dismount and/or docking activities; a surveillance function for detecting disintegration events; a surveillance function for monitoring pilot compliance with one or more behavioural criterion; an overhead airspace monitoring surveillance function; a surveillance function for the detection, tracking and/or analysis of low, small and/or slow targets; and/or an inverse aperture synthesis surveillance function.

12. The radar system as claimed in claim 1, wherein said at least one processor is configured for analysing acquired signal information to extract target information relating to the position or movement of the target within the FoS and separate target information relating to a smaller part of the target.

13. The radar system as claimed in claim 1, wherein said at least one processor is configured for performing at least one of the following actions:

analysing acquired signal information to extract information relating to the rotational movement of a rotating part of the target;

analysing acquired signal information to extract at least one of: the number of moving parts of a particular type, and a characteristic of a moving part; and using said extracted information relating to part of the target in the identification and/or classification of the target.

14. The radar system as claimed in claim 1, wherein said at least one processor is configured for performing at least one of the following actions:

defining a sub-volume of said FoS in which an enhanced surveillance procedure is to be applied, for analysing signal information for radar returns reflected from within said sub-volume of said FoS in accordance with said enhanced surveillance procedure, for analysing signal information for radar returns reflected from outside said sub-volume of said FoS in accordance with another surveillance procedure that is different to said enhanced surveillance procedure; and analysing acquired signal information to extract target information relating to surface targets.

15. The radar system as claimed in claim 1, wherein said radar system is a non-cooperative radar system.

16. The radar receiver configured to perform the function of the radar receiver of the radar system claimed in claim 1.

17. The radar system as claimed in claim 1, wherein the characteristic of said target comprises performance of the target against a criterion related to at least one of motion, behaviour and safety of the target.

18. A method of operating a radar system to provide information relating to a three-dimensional field of surveillance (FoS) having a volume exceeding one cubic kilometre, the method comprising:

persistently illuminating said FoS, without movement of a region of illumination by electronic or mechanical scanning, with a sequence of pulses at a pulse repetition frequency (PRF);

persistently monitoring said FoS with at least one radar receiver to receive radar return signals returned from objects within the FoS, as a result of said persistent illumination of said FoS by the at least one radar transmitter, wherein the at least one radar receiver comprises one or more receiver elements; and processing each radar return signal received within a first time period of predetermined length to acquire respective signal information; storing the acquired signal information for each of at least a majority of radar return signals received from within the entire FoS within the first time period;

wherein for each of the at least a majority of radar return signals received from within the entire FoS within the first time period, the acquired signal information is stored in a memory in association with information identifying at least one of (i) a respective beam in which the respective radar return signal was received and (ii) a respective one of the one or more receiver elements at which the respective radar return signal was received, wherein the respective beam is defined by at least an elevation and azimuth angle of the respective radar return signal;

processing each radar return signal received within a second time period of predetermined length, contiguous with said first time period, to acquire respective further signal information;

storing the acquired further signal information for each of at least a majority of radar return signals received from within the entire FoS within the second time period;

wherein for each of the at least a majority of radar return signals received from within the entire FoS within the second time period, the acquired signal information is stored in said memory in association with information identifying at least one of a respective beam in which the respective radar return signal was received and a respective one of the one or more receiver elements at which the respective radar return signal was received, whilst said signal information acquired during said first time period is still retained in said memory, wherein the respective beam is defined by at least an elevation and an azimuth angle of the respective radar return signal; and analysing the stored signal information and/or further signal information to detect a target and to extract and/or refine target information for said target relating to at least one of a position and a characteristic of said target.

19. The method as claimed in claim 18, wherein each said time period has a predetermined length equal to an initial dwell time length for said radar system.

20. The method as claimed in claim 19, further comprising concatenating signal information acquired within a plurality of said time periods to provide concatenated signal information for a modified dwell time.

21. The method as claimed in claim 20, further comprising analysing said concatenated signal information for the modified dwell time and for refining extracted target information for a detected target based on said analysis.

* * * * *